US012371047B2

United States Patent
Gideon et al.

(10) Patent No.: US 12,371,047 B2
(45) Date of Patent: Jul. 29, 2025

(54) SYSTEMS AND METHODS FOR NAVIGATING A VEHICLE ON A COVERED ROAD

(71) Applicant: Mobileye Vision Technologies Ltd., Jerusalem (IL)

(72) Inventors: Nir Gideon, Givatayim (IL); Osnat Silko, Jerusalem (IL); Daniel Kosteniov, Rishon Le'Zion (IL); Amiel Fisher, Neve Daniel (IL); Yehonatan Goldman, Jerusalem (IL); Emmanuelle Smadja, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 18/456,247

(22) Filed: Aug. 25, 2023

(65) Prior Publication Data
US 2025/0065900 A1    Feb. 27, 2025

(51) Int. Cl.
| | |
|---|---|
| *B60W 50/14* | (2020.01) |
| *B60W 10/11* | (2012.01) |
| *B60W 10/18* | (2012.01) |
| *B60W 60/00* | (2020.01) |
| *G08G 1/0967* | (2006.01) |

(52) U.S. Cl.
CPC ............ *B60W 50/14* (2013.01); *B60W 10/11* (2013.01); *B60W 10/18* (2013.01);
(Continued)

(58) Field of Classification Search
CPC .... B60W 50/14; B60W 60/001; B60W 10/11; B60W 10/18; B60W 2552/00;
(Continued)

(56) References Cited

U.S. PATENT DOCUMENTS

| | | |
|---|---|---|
| 2017/0016740 A1 | 1/2017 | Cui |
| 2018/0079424 A1 | 3/2018 | Myers |
| (Continued) | | |

FOREIGN PATENT DOCUMENTS

| | | |
|---|---|---|
| GB | 2562908 A | 11/2018 |
| JP | 2021152917 A | 9/2021 |
| WO | 2022183415 A1 | 9/2022 |

OTHER PUBLICATIONS

Combined Search and Examination Report for GB Application No. GB2412424.0, issued on Jan. 31, 2025.
(Continued)

*Primary Examiner* — Peter D Nolan
*Assistant Examiner* — Wae L Louie
(74) *Attorney, Agent, or Firm* — Finnegan, Henderson, Farabow, Garrett & Dunner, LLP

(57) ABSTRACT

A system for navigating a host vehicle, includes at least one processor comprising circuitry and a memory, wherein the memory includes instructions that when executed by the circuitry cause the at least one processor to perform operations comprising: receiving from a camera onboard the host vehicle at least one captured image representative of an environment of the host vehicle; detecting, based on analysis of the at least one captured image, a presence of a road covering material on a road segment surface; determining, based on analysis of the at least one captured image, a distance between the camera onboard the host vehicle and the road covering material; and determining a thickness profile of the road covering material based on the determined distance between the camera onboard the host vehicle and the road covering material, and also based on stored three-dimensional profile information associated with the road segment surface.

22 Claims, 53 Drawing Sheets

(52) U.S. Cl.
CPC ......... *B60W 60/001* (2020.02); *G08G 1/0967* (2013.01); *B60W 2420/403* (2013.01); *B60W 2552/00* (2020.02); *B60W 2555/20* (2020.02); *B60W 2556/50* (2020.02)

(58) Field of Classification Search
CPC ......... B60W 2556/50; B60W 2555/20; B60W 2420/42; G08G 1/0967
See application file for complete search history.

(56) References Cited

U.S. PATENT DOCUMENTS

| | | | |
|---|---|---|---|
| 2020/0189463 A1 | 6/2020 | Kunz et al. | |
| 2021/0303875 A1 | 9/2021 | Bangalore Ramaiah | |
| 2021/0381848 A1* | 12/2021 | Schwartz | G01C 21/3837 |
| 2021/0381849 A1* | 12/2021 | Aviel | G01C 21/3889 |
| 2022/0242457 A1* | 8/2022 | Ratner | B60W 60/00184 |
| 2022/0253061 A1 | 8/2022 | Han | |
| 2022/0281456 A1* | 9/2022 | Giovanardi | B60W 30/09 |
| 2022/0340171 A1* | 10/2022 | Halder | G05D 1/0274 |
| 2023/0003548 A1* | 1/2023 | Schwartz | G01C 21/3881 |

OTHER PUBLICATIONS

National Search Report and Written Opinion issued by the Dutch Patent Office in Dutch Patent Application No. 2038491, dated Feb. 17, 2025 (7 pages).

* cited by examiner

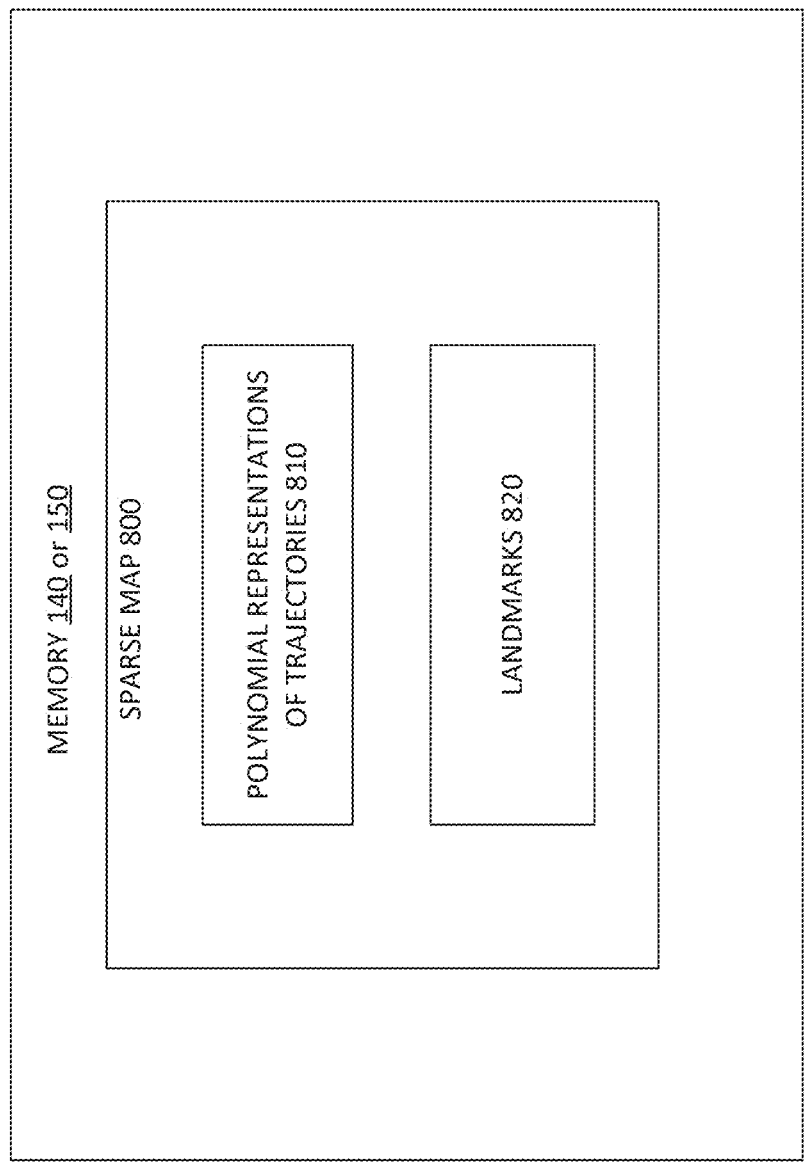

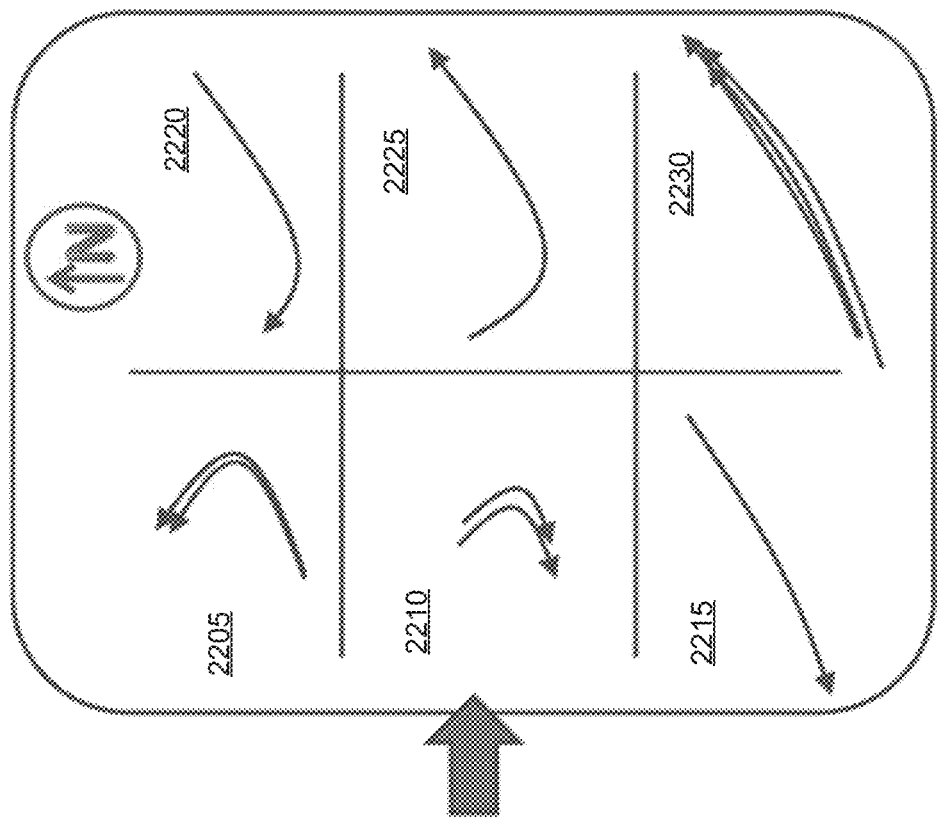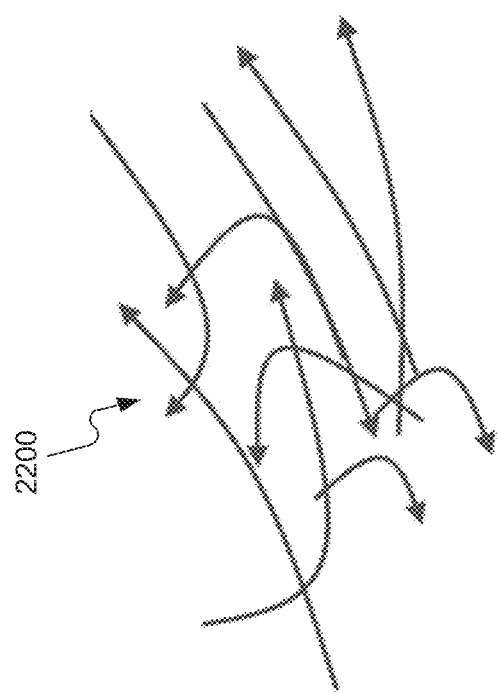
FIG. 22

SYSTEMS AND METHODS FOR NAVIGATING A VEHICLE ON A COVERED ROAD

BACKGROUND

Technical Field

The present disclosure relates generally to autonomous vehicle navigation. In particular, the disclosure relates to navigating a vehicle in the presence of a road covering material on a road segment, systems and methods for navigating a vehicle in the presence of accumulated water on a road segment, and systems and methods for collecting and distributing information relative to the presence of accumulated water on a road segment for use in navigation by a host vehicle.

Background Information

As technology continues to advance, the goal of a fully autonomous vehicle that is capable of navigating on roadways is on the horizon. Autonomous vehicles may take into account a variety of factors and make appropriate decisions based on those factors to safely and accurately reach an intended destination. For example, an autonomous vehicle may process and interpret visual information (e.g., information captured from a camera), information from radar or lidar, and may also use information obtained from other sources e.g., from a GPS device, a speed sensor, an accelerometer, a suspension sensor, etc.). At the same time, in order to navigate to a destination, an autonomous vehicle may also identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation. Moreover, the navigational system may adhere to certain imposed constraints. In some cases, those constraints may relate to interactions between a host vehicle and one or more other objects, such as other vehicles, pedestrians, etc. In other cases, the constraints may relate to liability rules to be followed in implementing one or more navigational actions for a host vehicle.

Weather and climatic conditions play an important role in the navigational actions that a vehicle may undertake during its operations. Indeed, the condition of a road surface may be strongly modified during or after certain weather events. A particular example may correspond to a situation wherein a road segment surface is covered with snow, water, mud or any other covering material. Another example may occur after heavy rainfall with the presence of accumulated water on a road such as a puddle or a pothole filled with water. In these situations, the adherence properties of one or more vehicle components (e.g., tires) are likely to be impacted. For example, a modified or altered surface may cause the tires to lose their grip, or be locked, preventing any response to the vehicle's instructions, including braking, causing a dangerous situation that increases the risk of an accident. In addition to the potential risk to vehicle occupants and third parties, damage to the vehicle may also occur. For example, in the case of a muddy road, a vehicle can get stuck in the mud, and the mud may penetrate the intake or exhaust pipes, increasing the risk of corrosion of vehicle parts. Therefore, it is important for an autonomous vehicle to be able to detect when the surface of a road segment is modified (e.g., covered) with water, mud, snow, etc. due to weather events or otherwise and to implement appropriate navigational operations.

The present disclosure describes solutions to alleviate or overcome one or more of the above-stated problems, among other problems.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The disclosed systems may also provide for constructing and navigating with a crowdsourced sparse map. Other disclosed systems may use relevant analysis of images to perform localization that may supplement navigation with a sparse map. The navigational response may also take into account other data including, for example, global positioning system (GPS) data, sensor data (e.g., from an accelerometer, a speed sensor, a suspension sensor, etc.), and/or other map data.

A system for navigating a host vehicle, includes at least one processor comprising circuitry and a memory, wherein the memory includes instructions that when executed by the circuitry cause the at least one processor to perform operations comprising: receiving from a camera onboard the host vehicle at least one captured image representative of an environment of the host vehicle; detecting, based on analysis of the at least one captured image, a presence of a road covering material on a road segment surface; determining, based on analysis of the at least one captured image, a distance between the camera onboard the host vehicle and the road covering material; and determining a thickness profile of the road covering material based on the determined distance between the camera onboard the host vehicle and the road covering material, and also based on stored three-dimensional profile information associated with the road segment surface.

In another embodiment, a method for navigating a host vehicle is disclosed. The method may comprise: receiving from a camera onboard the host vehicle at least one captured image representative of an environment of the host vehicle; detecting, based on analysis of the at least one captured image, a presence of a road covering material on a road segment; determining, based on analysis of the at least one captured image, a distance between the camera onboard the host vehicle and the road covering material; and determining a thickness profile of the road covering material based on the determined distance between the camera onboard the host vehicle and the road covering material and also based on stored three-dimensional profile information associated with the road segment surface.

In another embodiment, a system for navigating a host vehicle is disclosed. The system may comprise at least one processor comprising circuitry and a memory, wherein the memory includes instructions that when executed by the circuitry cause the at least one processor to perform operations comprising: receiving from a camera onboard the host vehicle at least one captured image representative of an environment of the host vehicle; detecting, based on analysis of the at least one captured image, a presence of accumulated water on a road segment; detecting, based on analysis of the at least one captured image, a location of an edge of the accumulated water relative to at least one road feature associated with the road segment; determining a depth profile for the accumulated water, based on the detected location of the edge of the accumulated water relative to the at least one road feature and also based on stored three-dimensional profile information associated with the at least one road feature; and causing the host vehicle to take at least one navigational action based on the determined depth profile for the accumulated water.

In another embodiment a method for navigating a host vehicle is disclosed. The method may comprise: receiving from a camera onboard the host vehicle at least one captured image representative of an environment of the host vehicle; detecting, based on analysis of the at least one captured image, a presence of accumulated water on a road segment; detecting, based on analysis of the at least one captured image, a location of an edge of the accumulated water relative to at least one road feature associated with the road segment; determining a depth profile for the accumulated water, based on the detected location of the edge of the accumulated water relative to the at least one road feature and also based on stored three-dimensional profile information associated with the at least one road feature; and causing the vehicle to take at least one navigational action based on the determined depth profile for the accumulated water. In another embodiment, a system for collecting and distributing information related to the presence of accumulated water on a road segment is disclosed. The system may comprise at least one processor comprising circuitry and a memory, wherein the memory includes instructions that when executed by the circuitry cause the at least one processor to perform operations comprising: receiving drive information collected from each of a first plurality of vehicles that traversed the road segment, wherein the drive information indicates one or more characteristics of the accumulated water; generating aggregated accumulated water information by aggregating the drive information received from the first plurality of vehicles; and distributing the aggregated accumulated water information to a second plurality of vehicles.

In another embodiment, a method for collecting and distributing information relative to the presence of accumulated water on a road segment is disclosed. The method may comprise: receiving drive information collected from each of a first plurality of vehicles that traversed the road segment, wherein the drive information indicates one or more characteristics of the accumulated water; generating aggregated accumulated water information by aggregating the drive information received from the first plurality of vehicles; and distributing the aggregated accumulated water information to a second plurality of vehicles.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 8 shows a sparse map for providing autonomous vehicle navigation, consistent with the disclosed embodiments.

FIG. 22 illustrates a process of clustering vehicle trajectories associated with vehicles, consistent with the disclosed embodiments.

DETAILED DESCRIPTION

Figure 1:
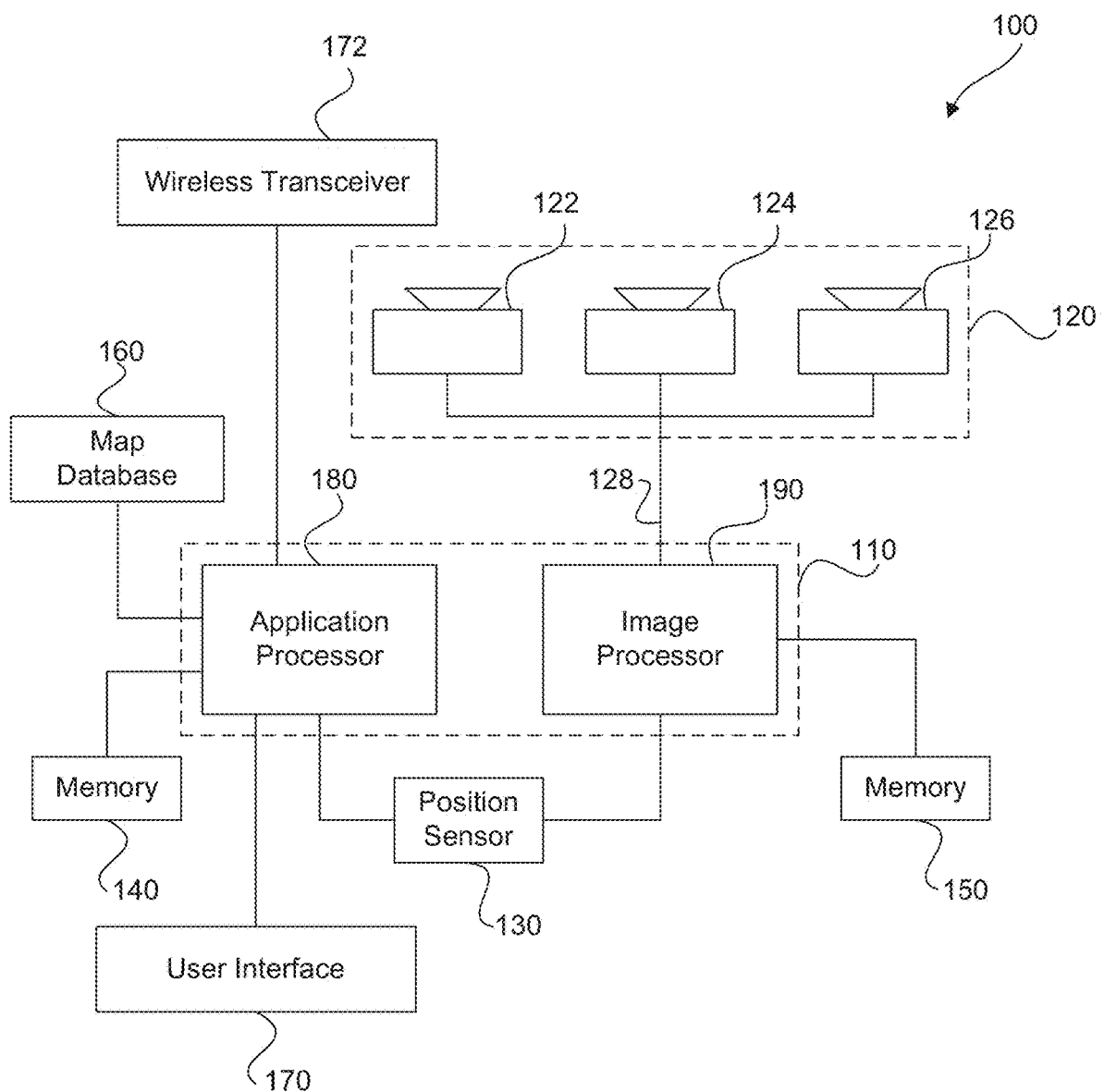
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
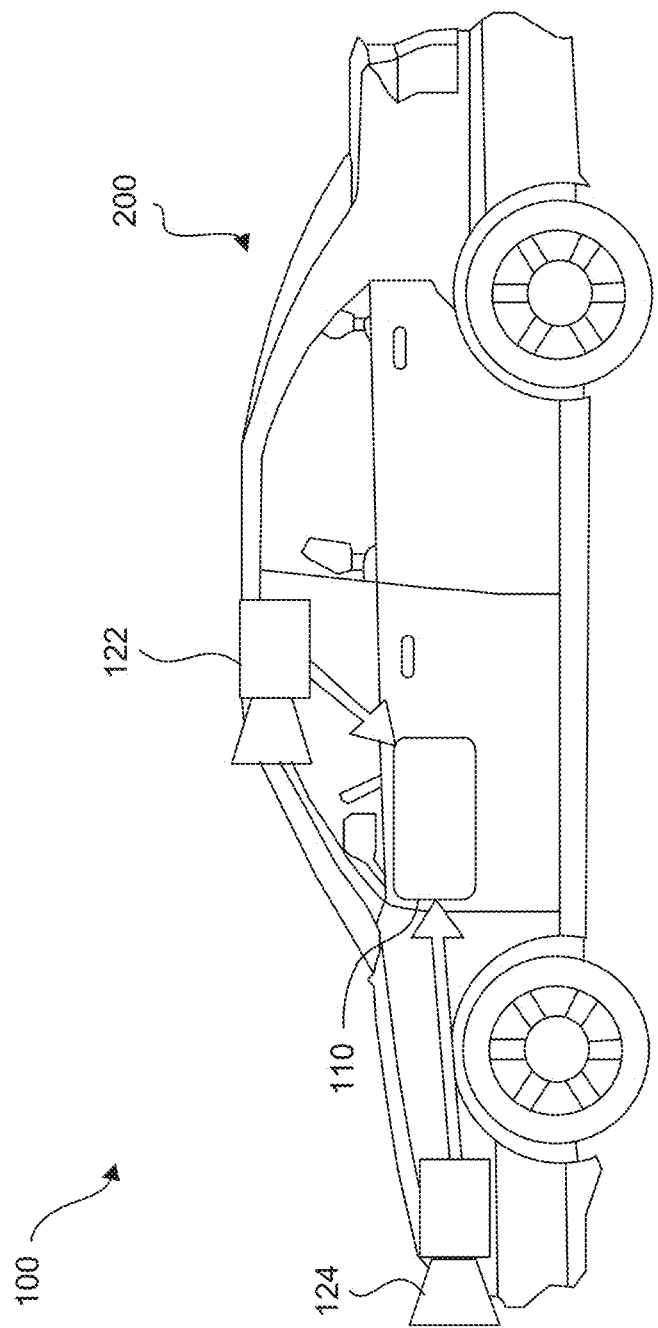
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
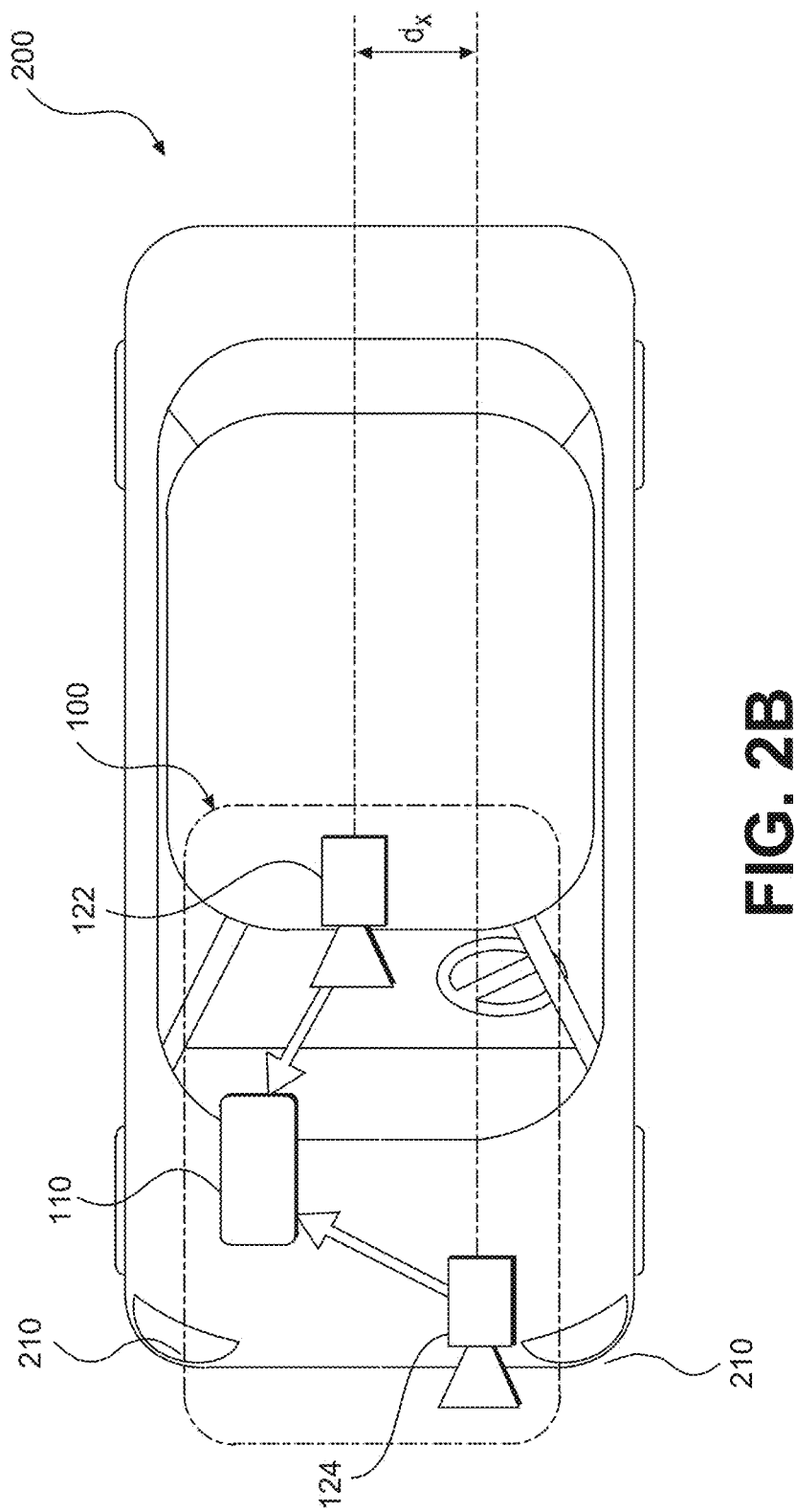
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
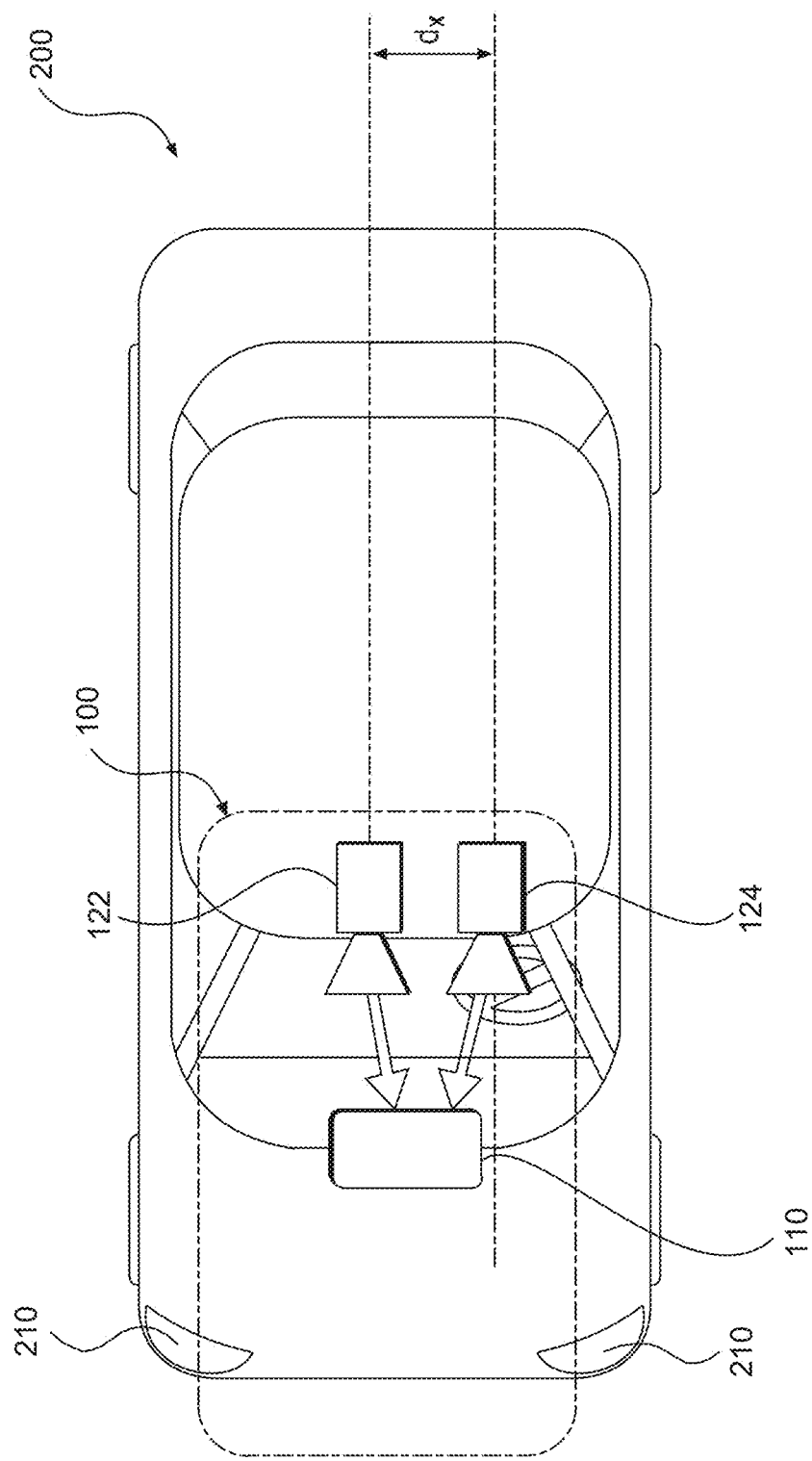
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
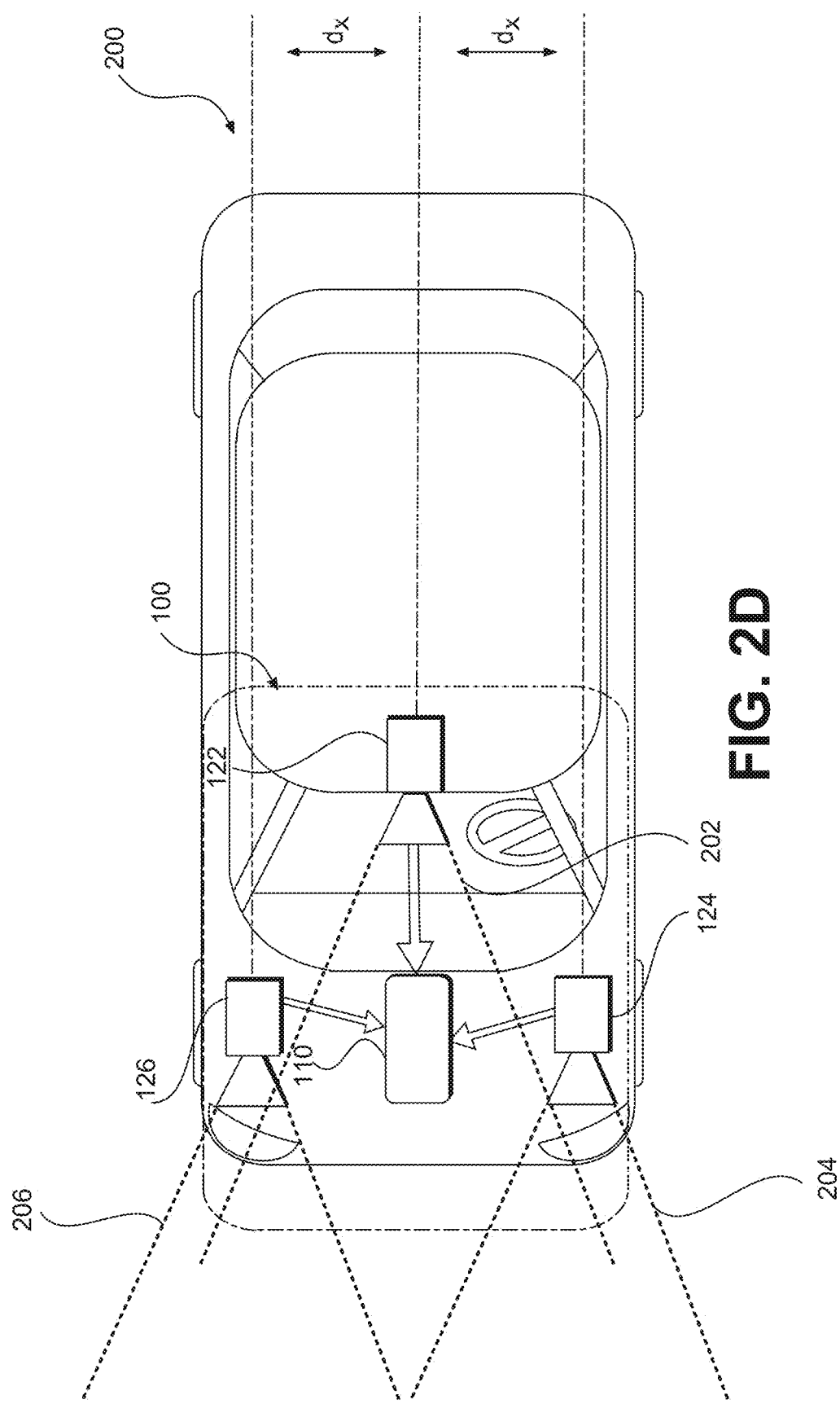
FIG. 2D is a diagrammatic top view representation of yet another embodiment of a vehicle including a system consistent with the disclosed embodiments.
Figure 2E:
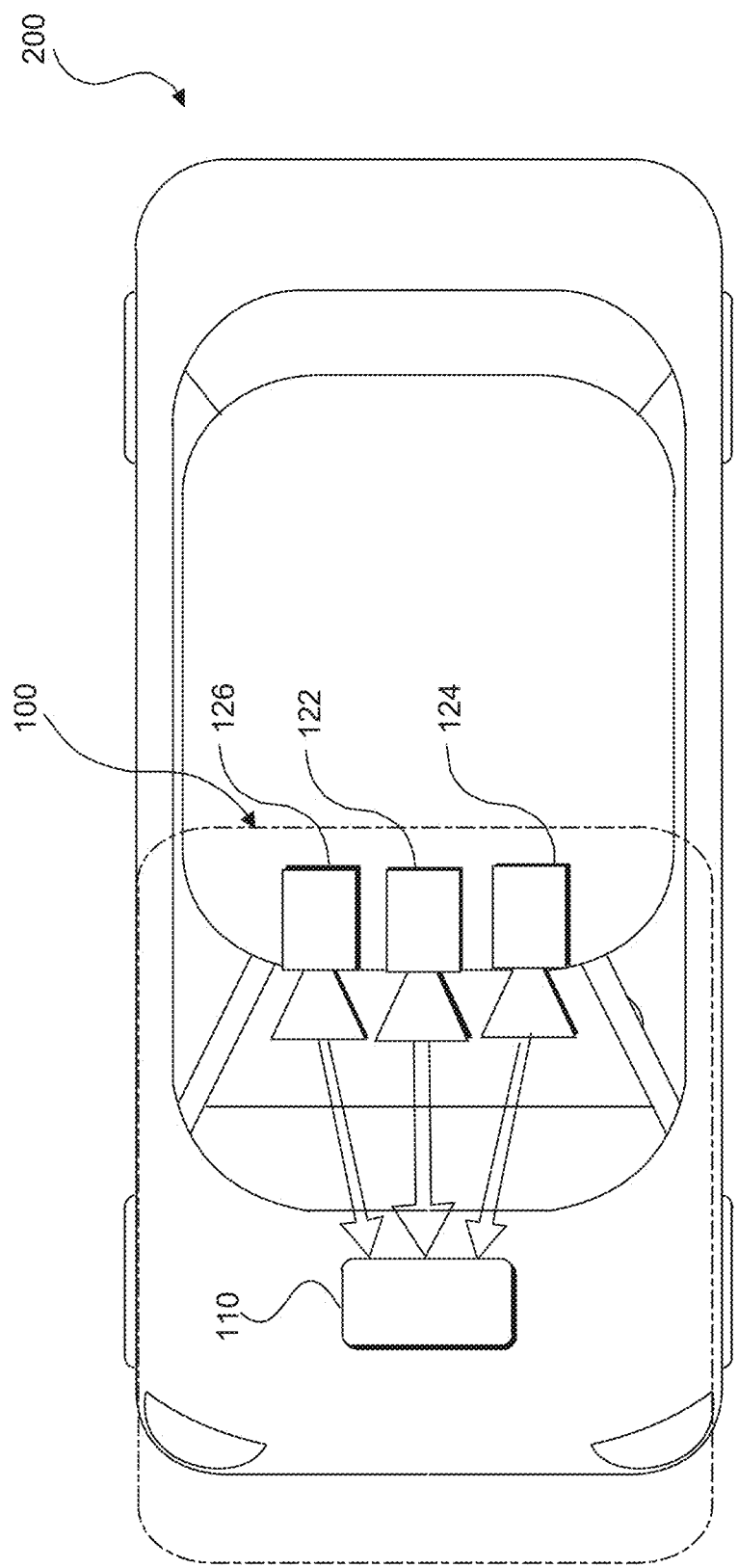
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree fOV, 50 degree fOV, 52 degree fOV, or greater. Alternatively, image capture device 122 may be configured to have a narrow FOV in the range of 23 to 40 degrees, such as a 28 degree fOV or 36 degree fOV. In addition, image capture device 122 may be configured to have a wide FOV in the range of 100 to 180 degrees. In some embodiments, image capture device 122 may include a wide angle bumper camera or one with up to a 180 degree fOV. In some embodiments, image capture device 122 may be a 7.2M pixel image capture device with an aspect ratio of about 2:1 (e.g., HxV=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by dx, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
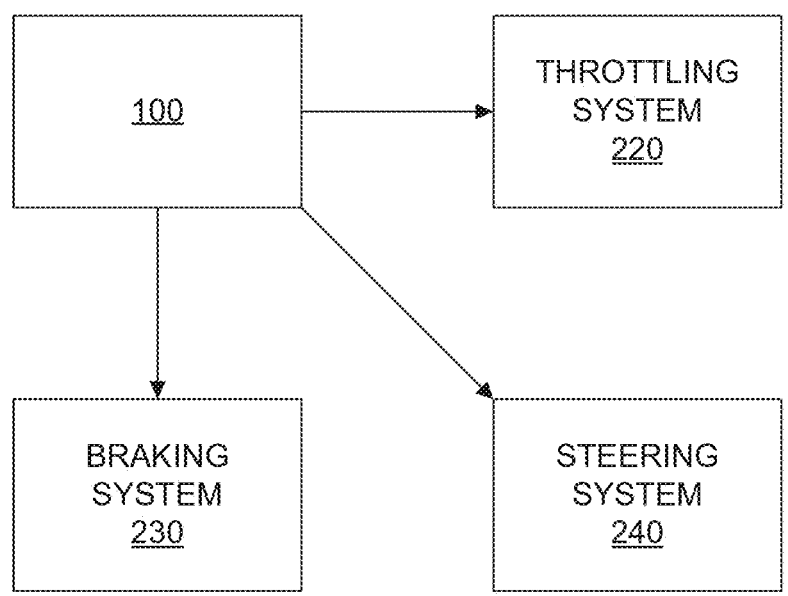
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
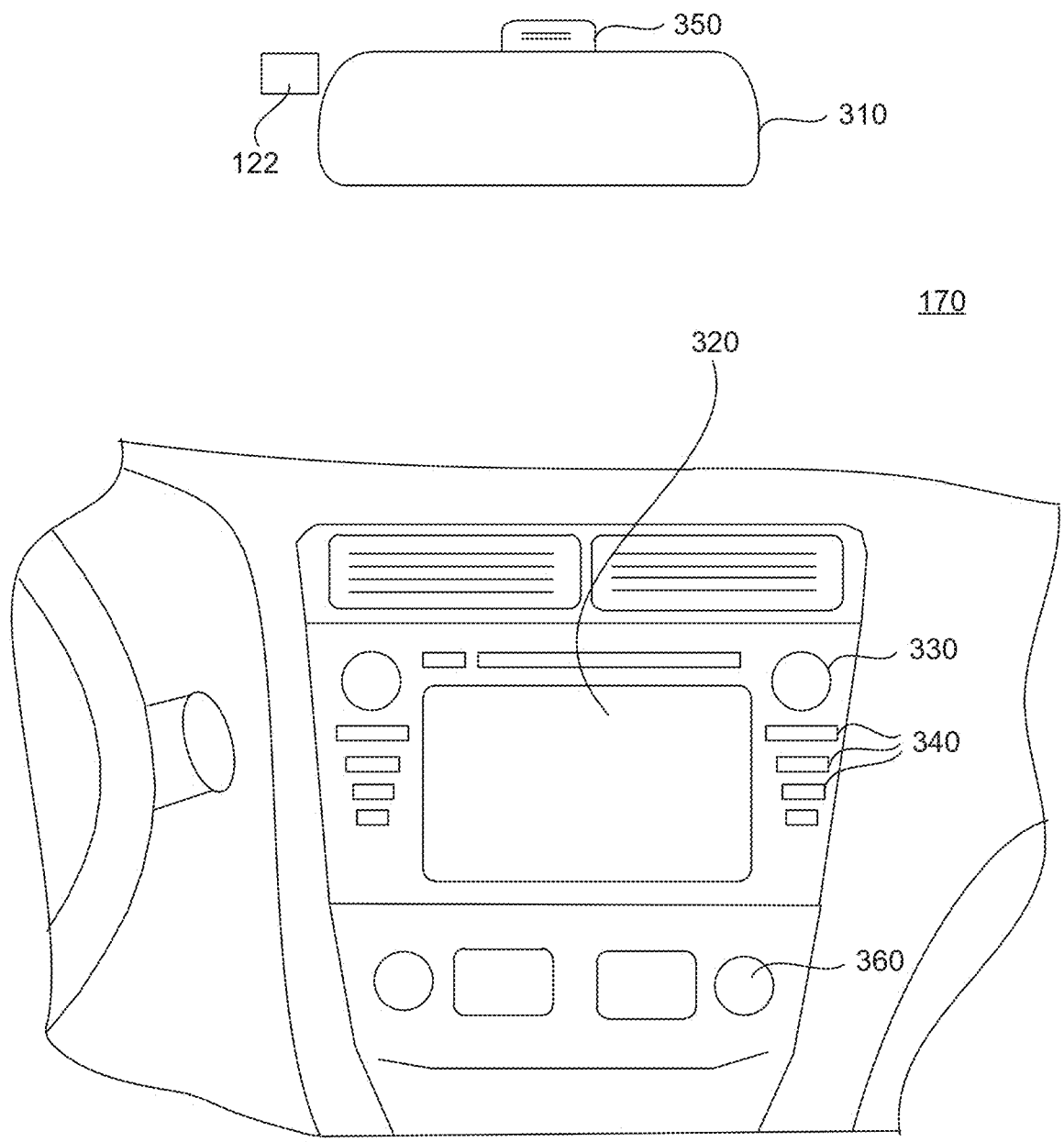
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
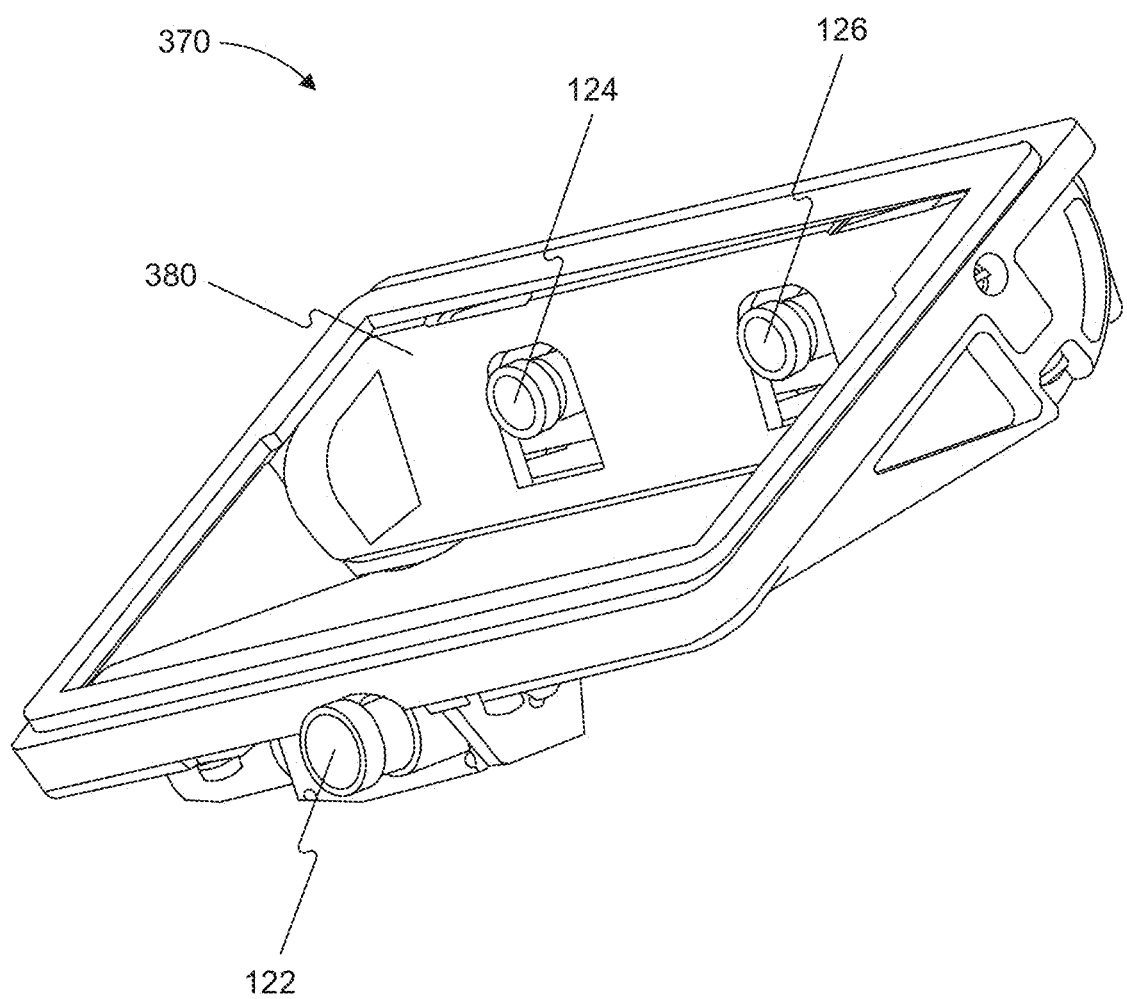
FIG. 3B is an illustration of an example of a camera mount that is configured to be positioned behind a rearview mirror and against a vehicle windshield consistent with the disclosed embodiments.
Figure 3C:
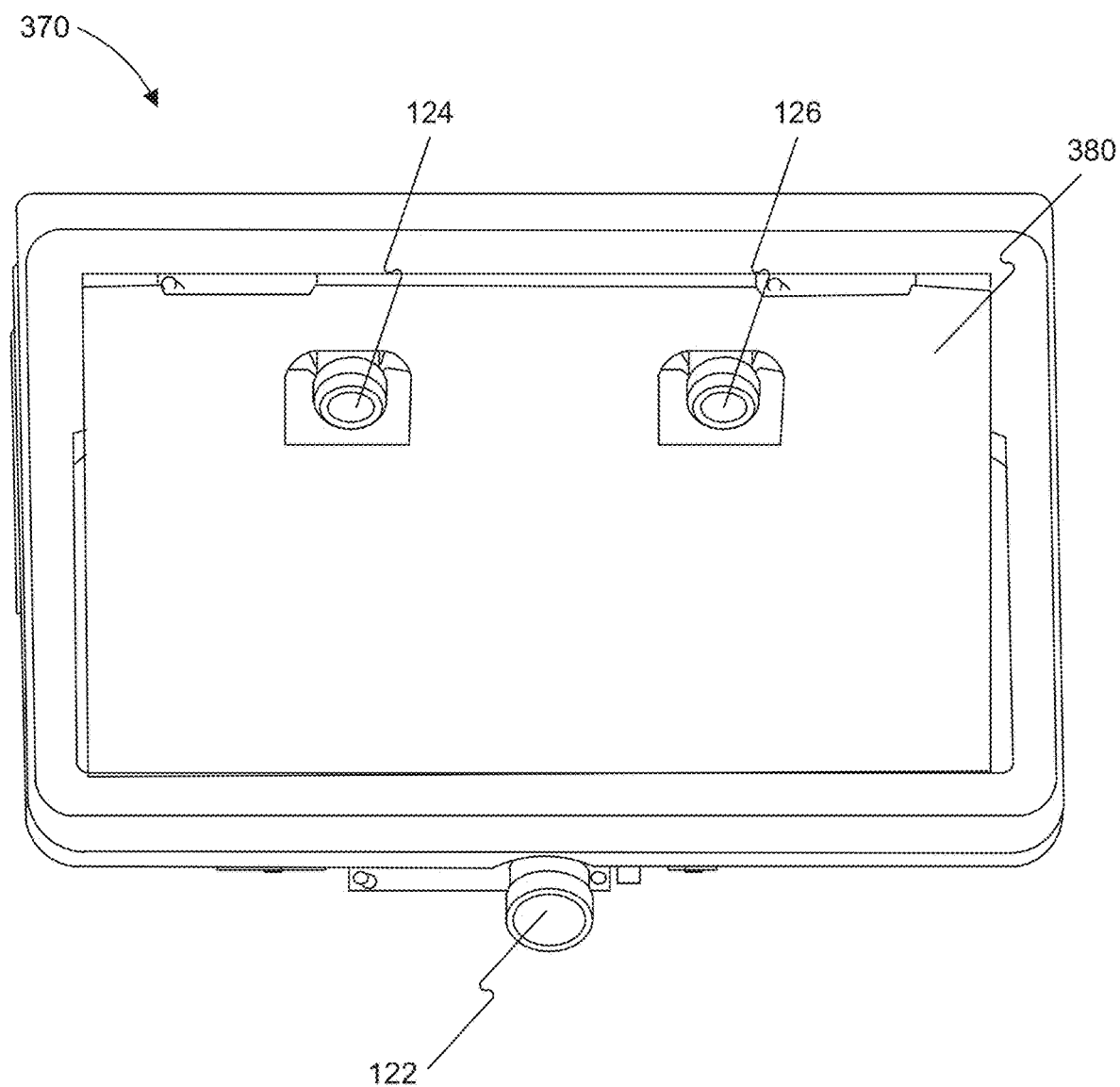
FIG. 3C is an illustration of the camera mount shown in FIG. 3B from a different perspective consistent with the disclosed embodiments.
Figure 3D:
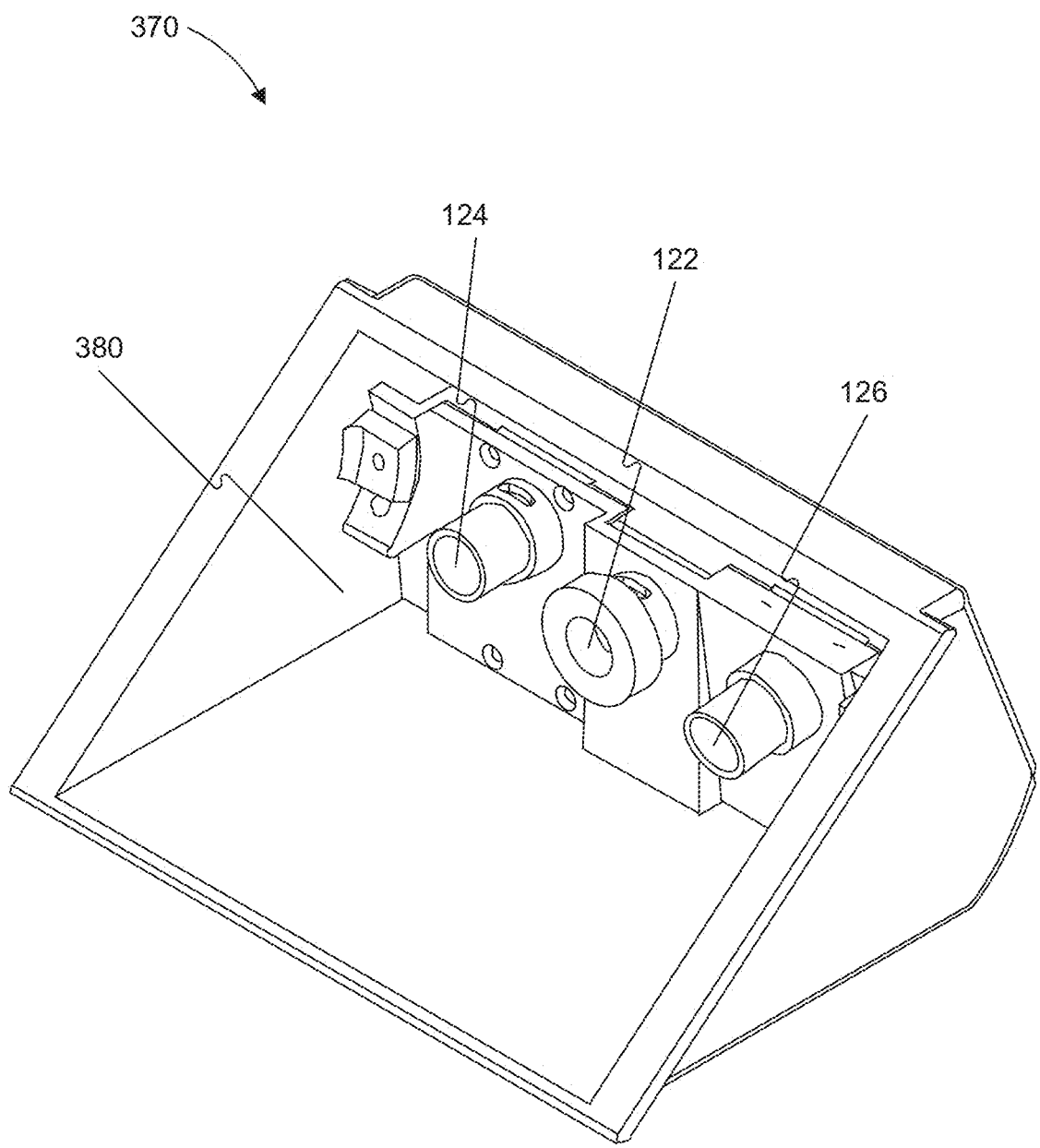
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
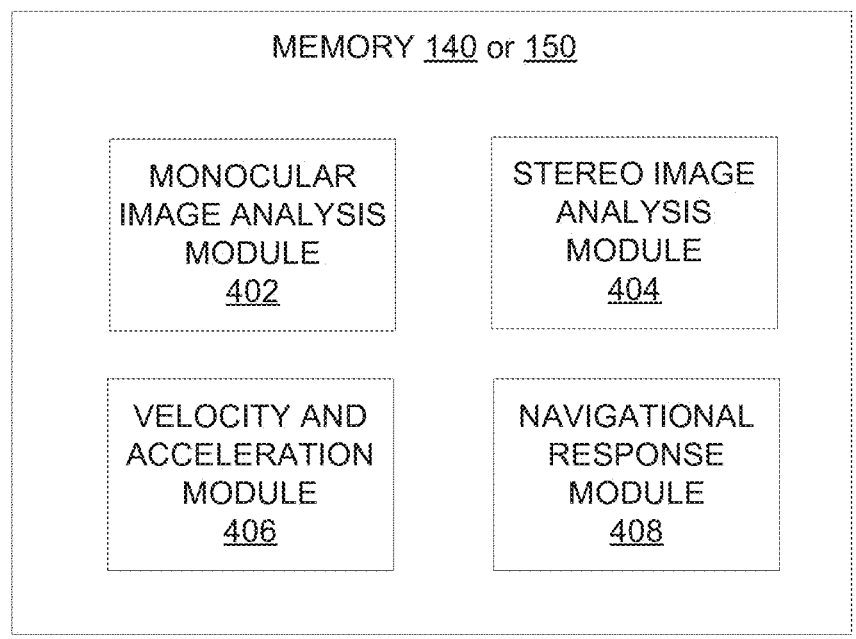
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or casing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
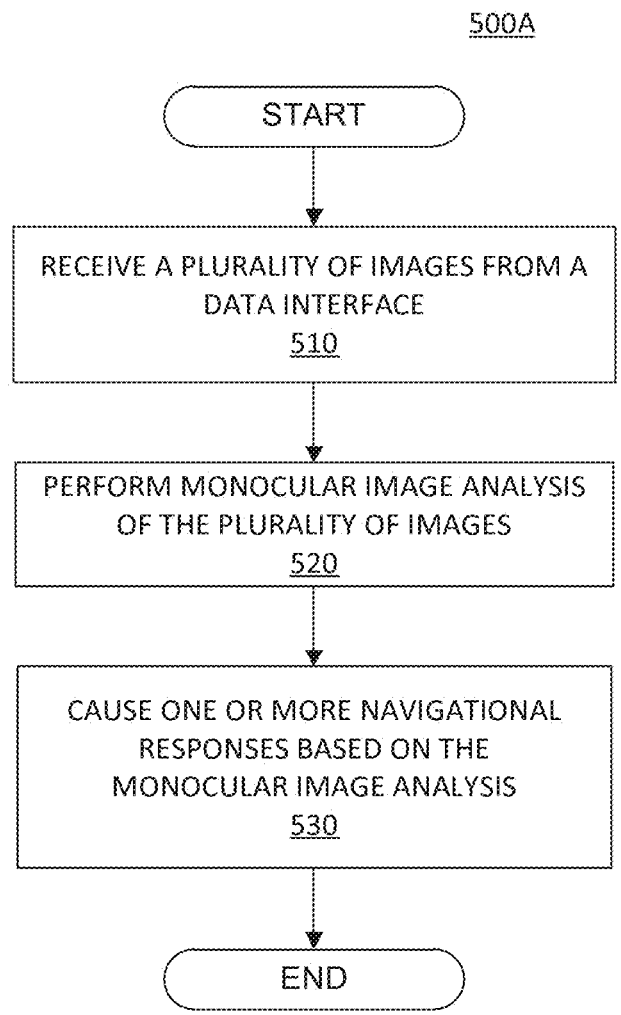
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
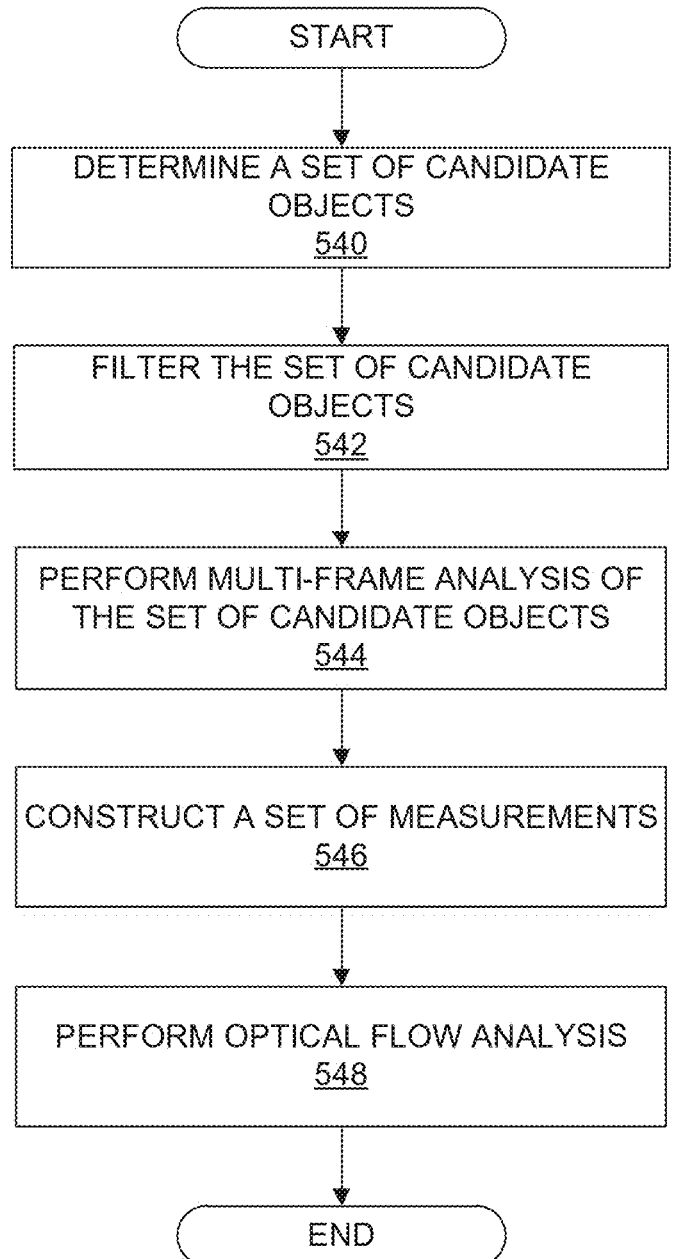
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
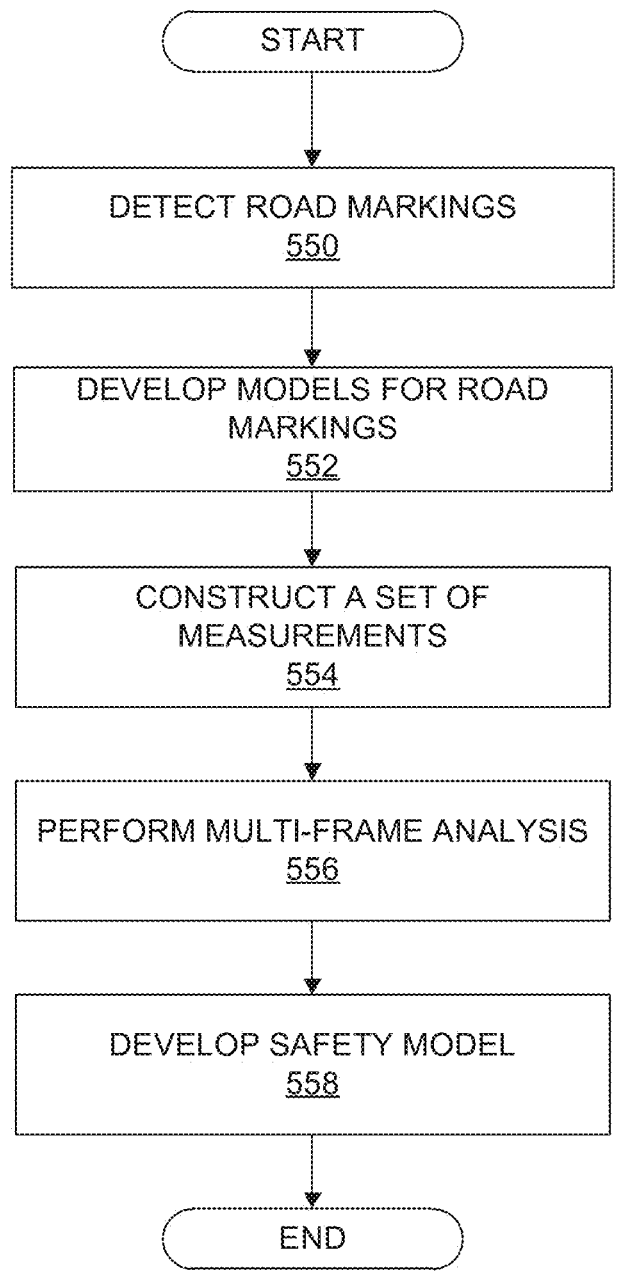
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
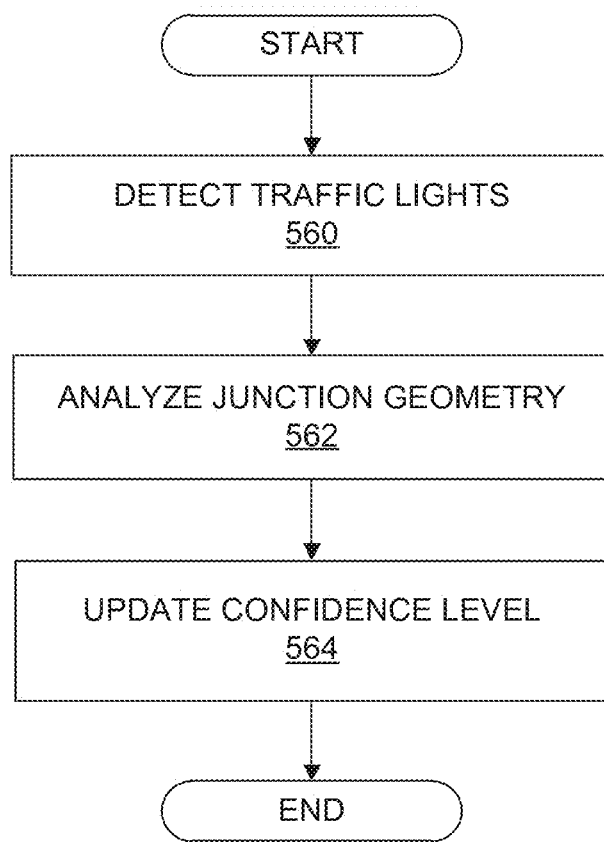
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
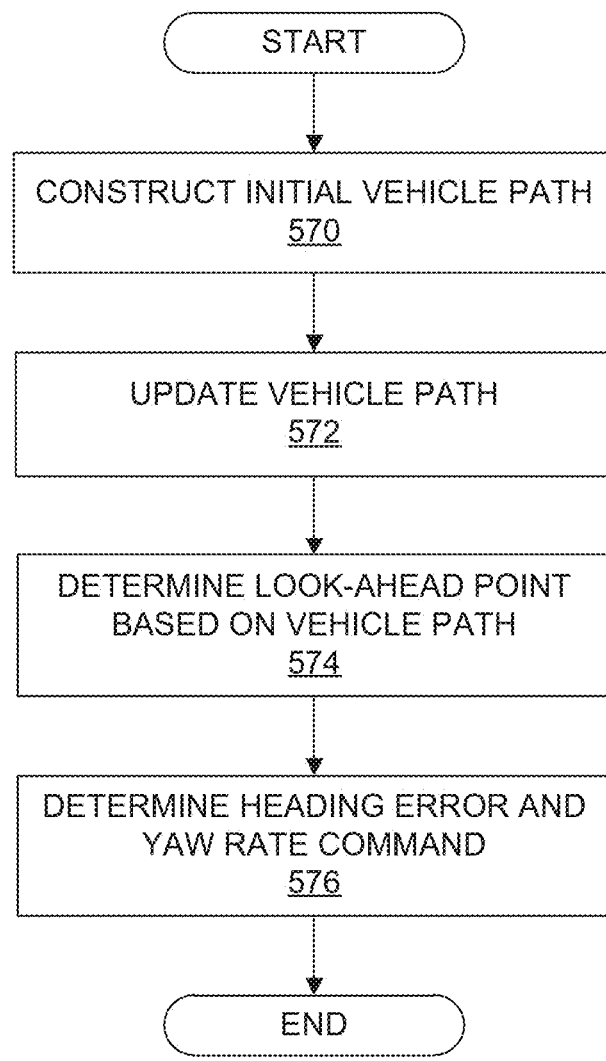
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_1, z_1)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_1/z_1)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
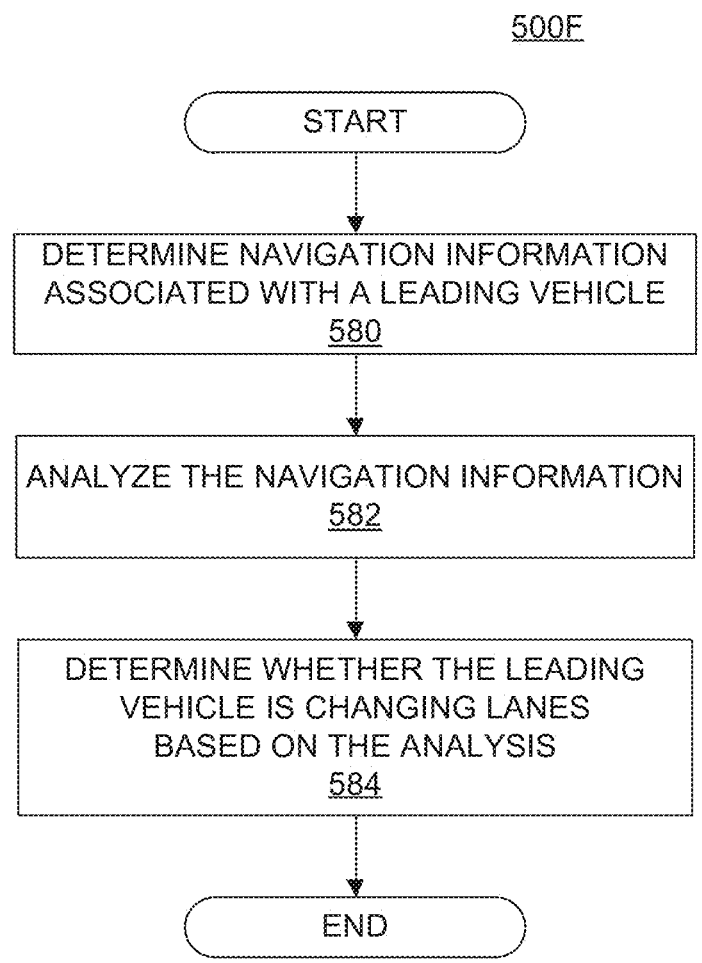
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
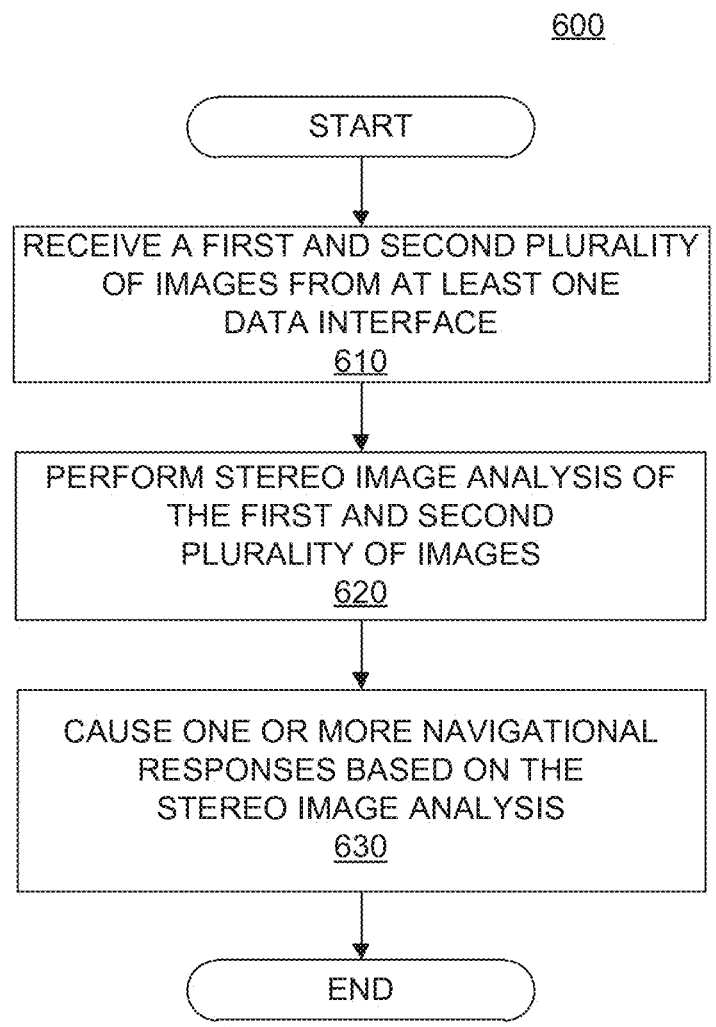
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
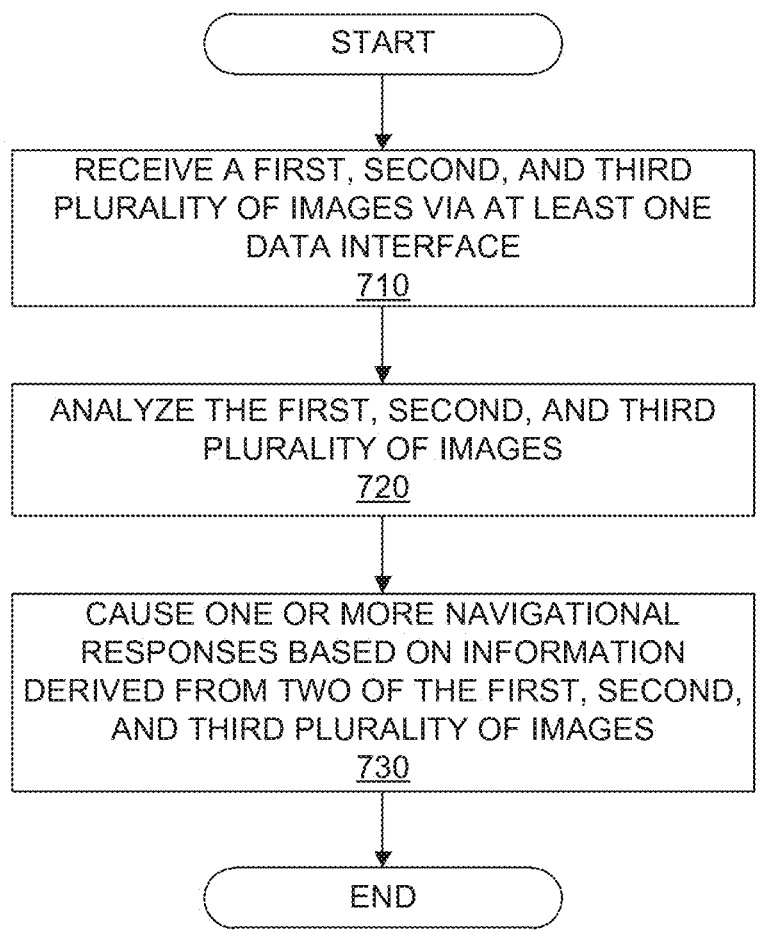
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Analysis of captured images may allow for the generation and use of a sparse map model for autonomous vehicle navigation. In addition, analysis of captured images may allow for the localization of an autonomous vehicle using identified lane markings. Embodiments for detection of particular characteristics based on one or more particular analyses of captured images and for navigation of an autonomous vehicle using a sparse map model will be discussed below with reference to FIGS. 8-26.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Generating a Sparse Map

In some embodiments, a sparse map may include at least one line representation of a road surface feature extending along a road segment and a plurality of landmarks associated with the road segment. In certain aspects, the sparse map may be generated via "crowdsourcing." for example, through image analysis of a plurality of images acquired as one or more vehicles traverse the road segment.

FIG. 8 shows a sparse map 800 that one or more vehicles, e.g., vehicle 200 (which may be an autonomous vehicle), may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as the vehicle traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remove server and may execute the data for guiding the autonomous driving of vehicle 200. In such embodiments, the remote server may store all of sparse map 800 or only a portion thereof. Accordingly, the storage device or computer-readable medium provided onboard vehicle 200 and/or onboard one or more additional vehicles may store the remaining portion(s) of sparse map 800.

Furthermore, in such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps that may be used in navigating a vehicle. Such sub-maps may be referred to as local maps, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

Collection of data and generation of sparse map 800 is covered in greater detail below, for example, with respect to FIG. 19. In general, however, sparse map 800 may be generated based on data collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, road conditions, etc. Using the collected information, sparse map 800 may be generated and distributed (e.g., for local storage or via on-the-fly data transmission) for use in navigating one or more autonomous vehicles. However, in some embodiments, map generation may not end upon initial generation of the map. As will be discussed in greater detail below, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations may be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 KB per kilometer of roads, or less than 100 KB per kilometer of roads. In some embodiments, the data density of sparse map 800 may be less than 10 kB per kilometer of roads or even less than 2 KB per kilometer of roads (e.g., 1.6 kB per kilometer), or no more than 10 kB per kilometer of roads, or no more than 20 kB per kilometer of roads. In some embodiments, most, if not all, of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment, for example, as discussed with respect to FIG. 29. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in greater detail below, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart.

Between landmarks, and therefore between determinations of vehicle position relative to a target trajectory, the vehicle may navigate based on dead reckoning in which the vehicle uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Moreover, in some embodiments, lane markings may be used for localization of the vehicle during landmark spacings. By using lane markings during landmark spacings, the accumulation of during navigation by dead reckoning may be minimized. In particular, such localization is discussed below with respect to FIG. 35.

Figure 9A:
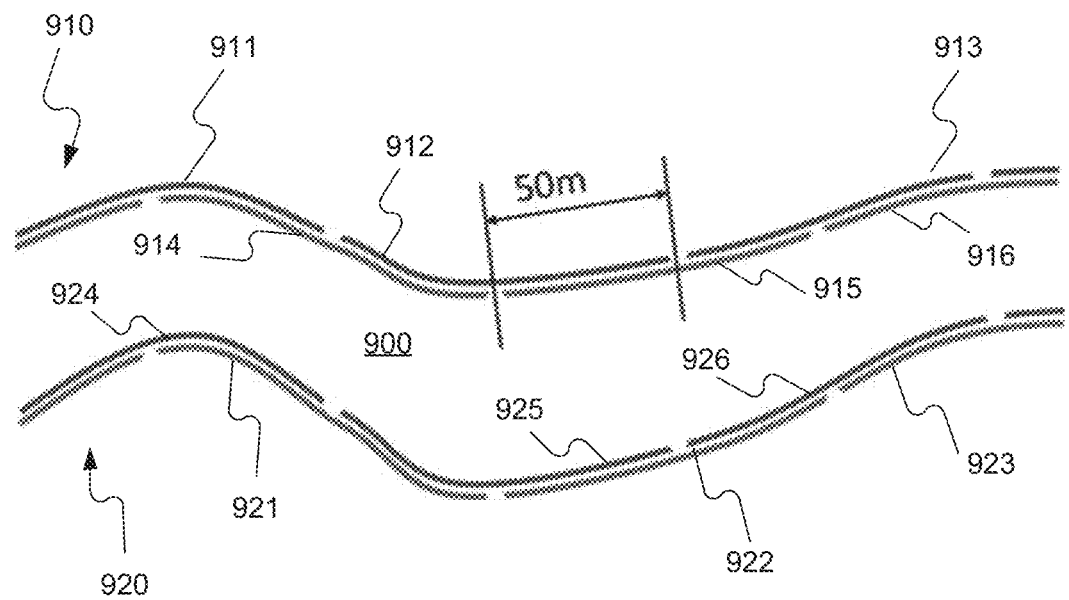
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. As depicted in FIG. 9A, lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913. The second group includes polynomial segments 914, 915, and 916. The two groups, while substantially parallel to each other, follow the locations of their respective sides of the road. Polynomial segments 911, 912, 913, 914, 915, and 916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 9A, right side 920 of lane 900 is further represented by a first group having polynomial segments 921, 922, and 923 and a second group having polynomial segments 924, 925, and 926.

Figure 9B:
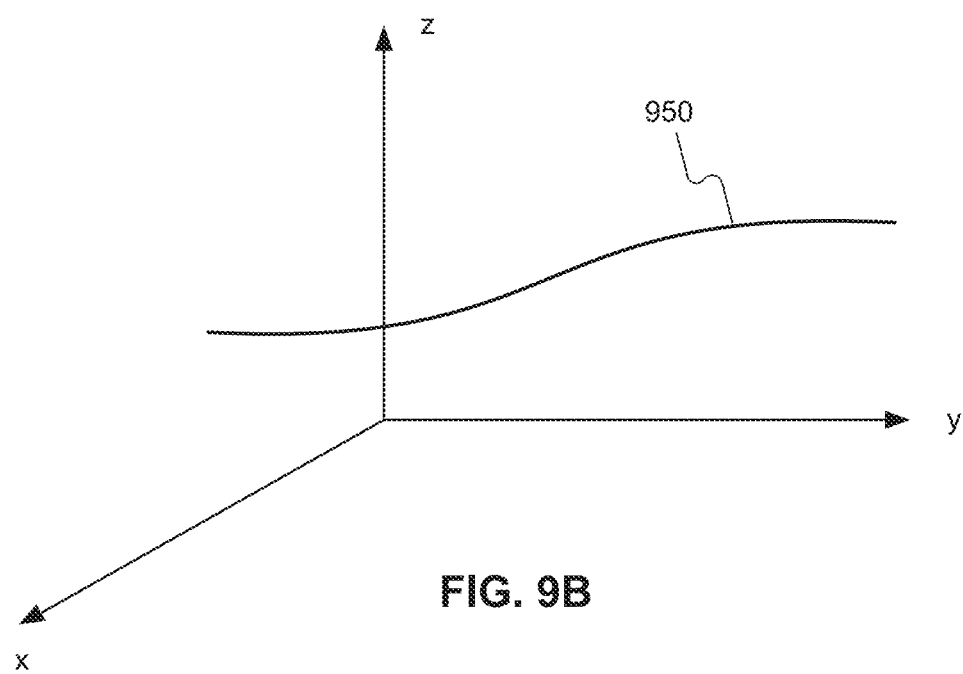
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may still include sufficient information for describing or identifying the landmarks along a road. Storing data describing characteristics of landmarks, rather than the actual images of landmarks, may reduce the size of sparse map 800.

Figure 10:
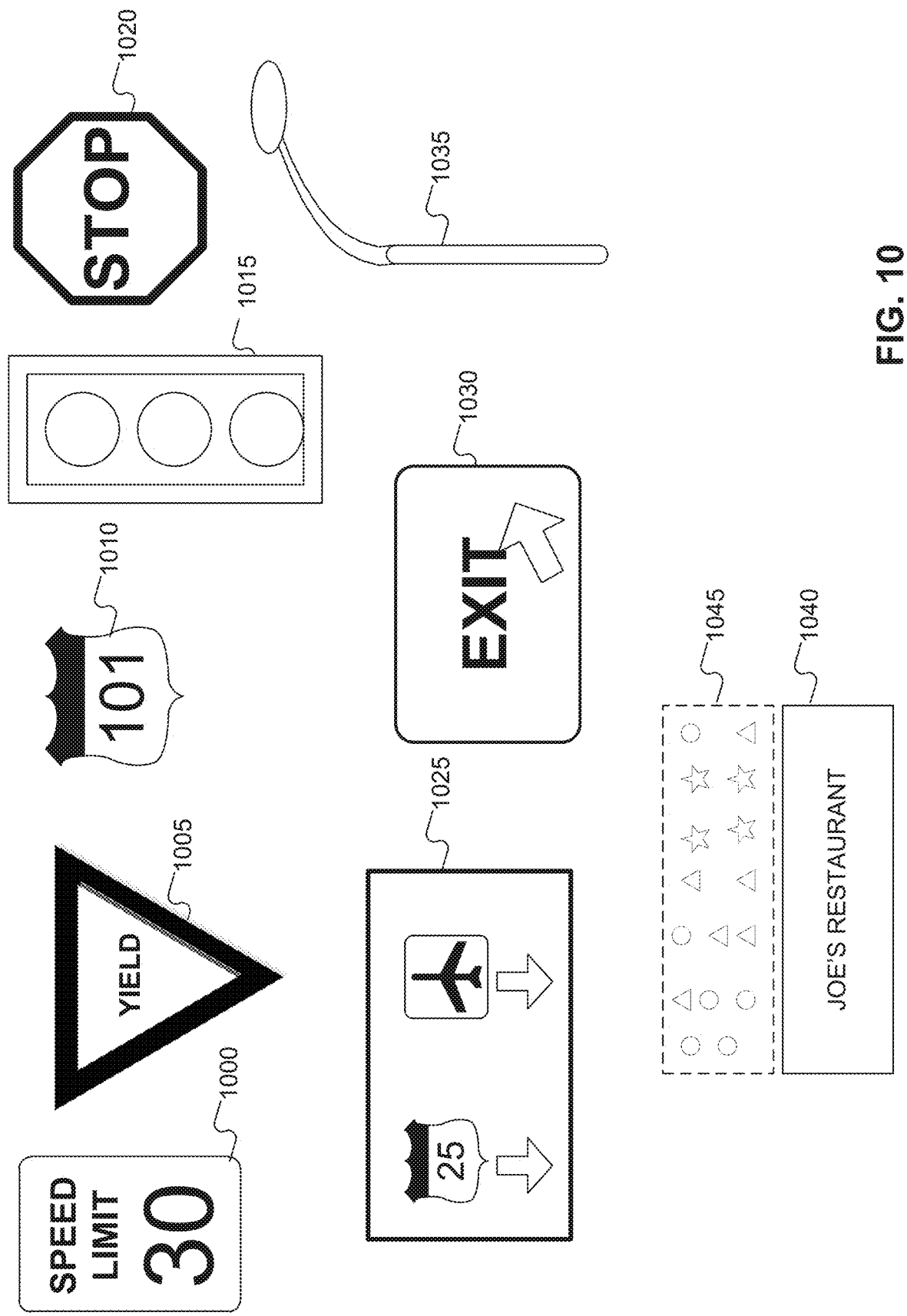
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc. Accordingly, at least one of the plurality of landmarks may include a road sign.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type-what type of directional sign, traffic sign, etc.), a GPS coordinate (e.g., to support global localization), and any other suitable parameters. Each parameter may be associated with a data size. For example, a landmark size may be stored using 8 bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used.

Representing landmarks in sparse map 800 in this manner may offer a lean solution for efficiently representing landmarks in the database. In some embodiments, signs may be referred to as semantic signs and non-semantic signs. A semantic sign may include any class of signs for which there's a standardized meaning (e.g., speed limit signs, warning signs, directional signs, etc.). A non-semantic sign may include any sign that is not associated with a standardized meaning (e.g., general advertising signs, signs identifying business establishments, etc.). For example, each semantic sign may be represented with 38 bytes of data (e.g., 8 bytes for size; 12 bytes for distance to previous landmark, lateral offset, and height; 2 bytes for a type code; and 16 bytes for GPS coordinates). Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr.

In some embodiments, a generally rectangular object, such as a rectangular sign, may be represented in sparse map 800 by no more than 100 byte of data. The representation of the generally rectangular object (e.g., general sign 1040) in sparse map 800 may include a condensed image signature (e.g., condensed image signature 1045) associated with the generally rectangular object. This condensed image signature may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040.

For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Accordingly, the plurality of landmarks may be identified through image analysis of the plurality of images acquired as one or more vehicles traverse the road segment. As explained below with respect to "crowdsourcing," in some embodiments, the image analysis to identify the plurality of landmarks may include accepting potential landmarks when a ratio of images in which the landmark does appear to images in which the landmark does not appear exceeds a threshold. Furthermore, in some embodiments, the image analysis to identify the plurality of landmarks may include rejecting potential landmarks when a ratio of images in which the landmark does not appear to images in which the landmark does appear exceeds a threshold.

Figure 11A:
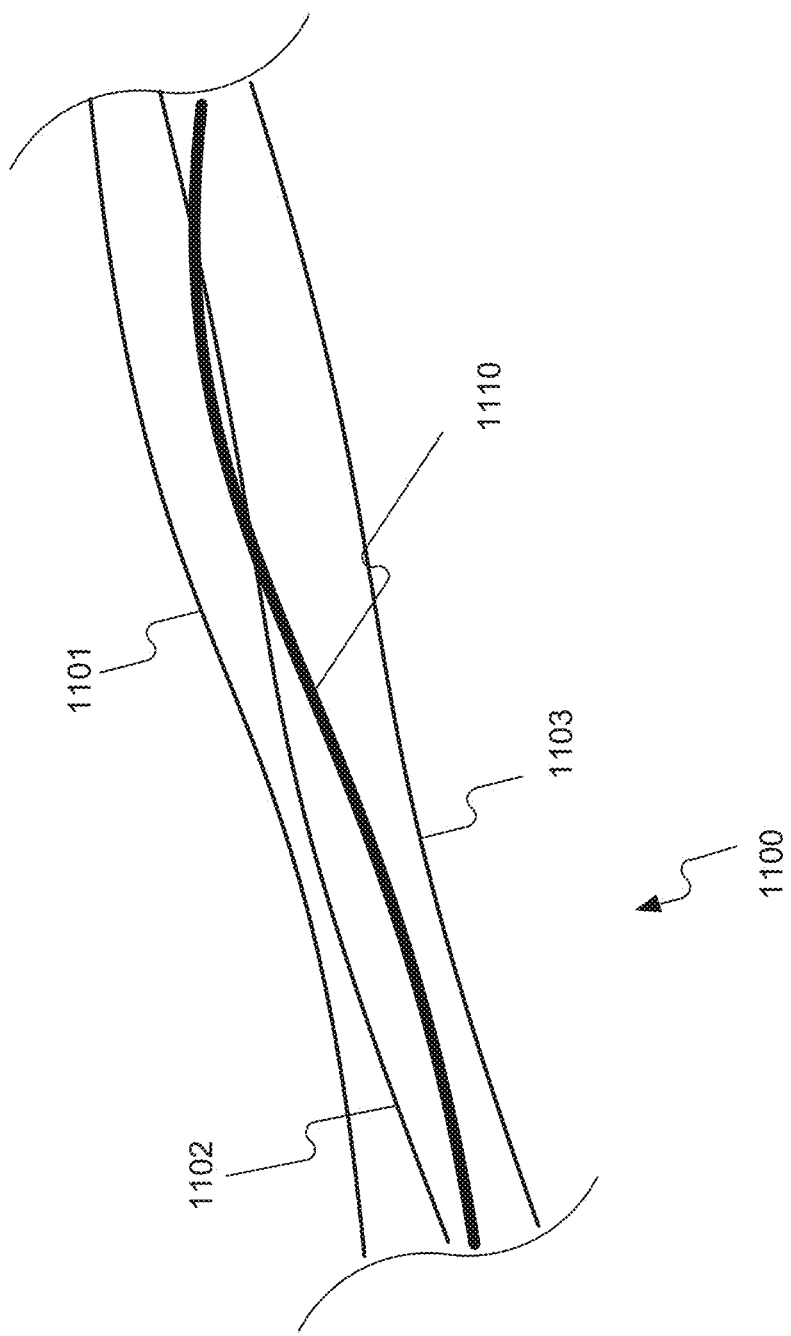
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 11A, a road segment 1100 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories. Aligning drive data to construct trajectories is further discussed below with respect to FIG. 29.

Figure 11B:
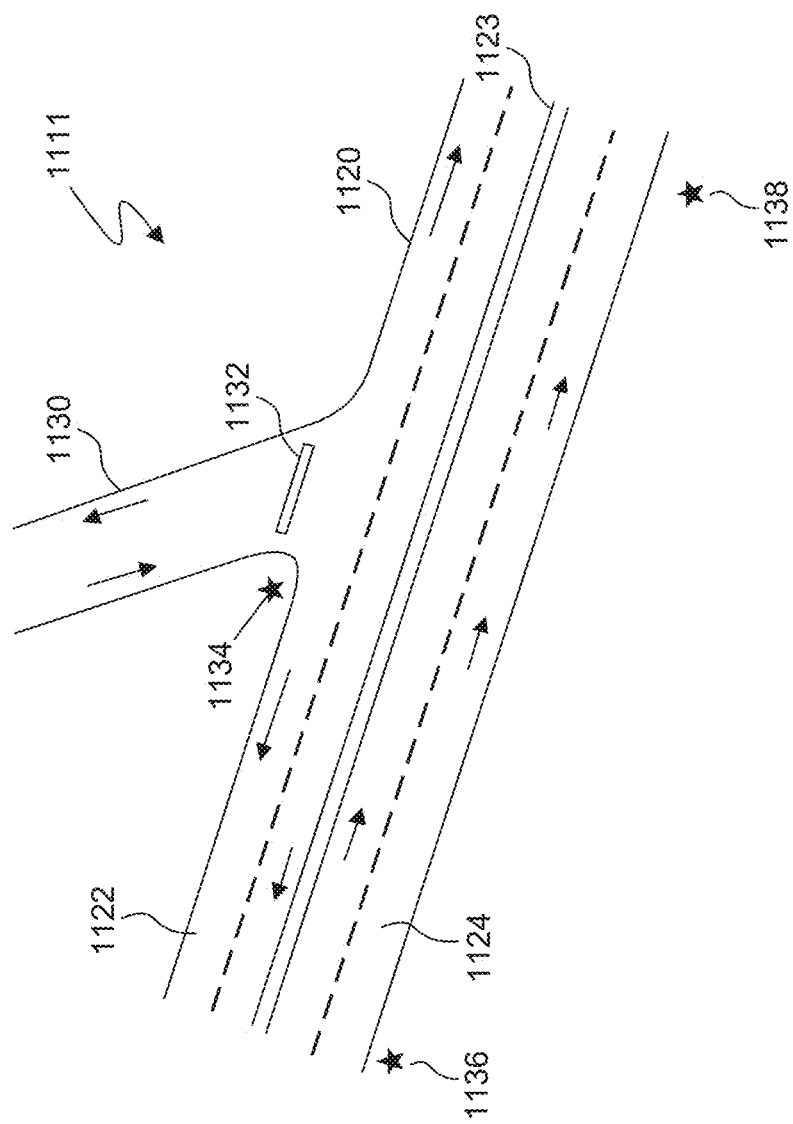
FIGS. 11B and 11C show target trajectories along a multi-lane road consistent with disclosed embodiments.
Figure 11C:
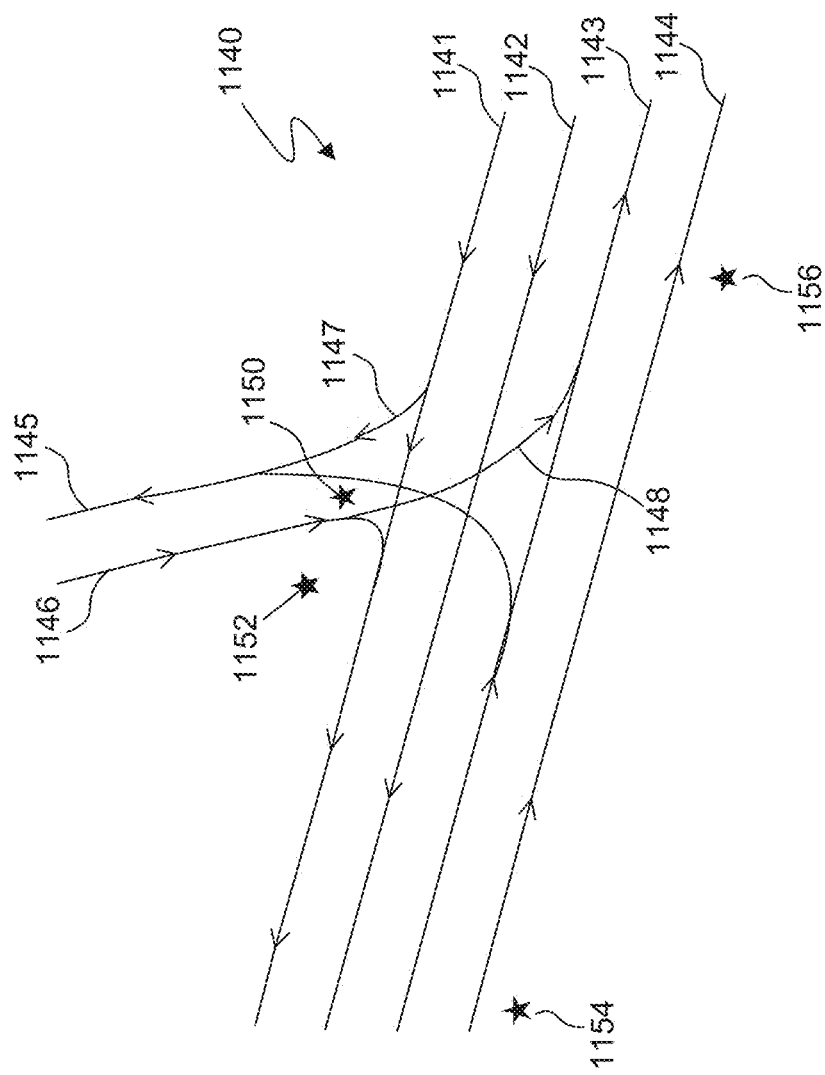

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 11C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location. Navigating using landmarks from a sparse map is further discussed below with respect to FIG. 26.

Figure 11D:
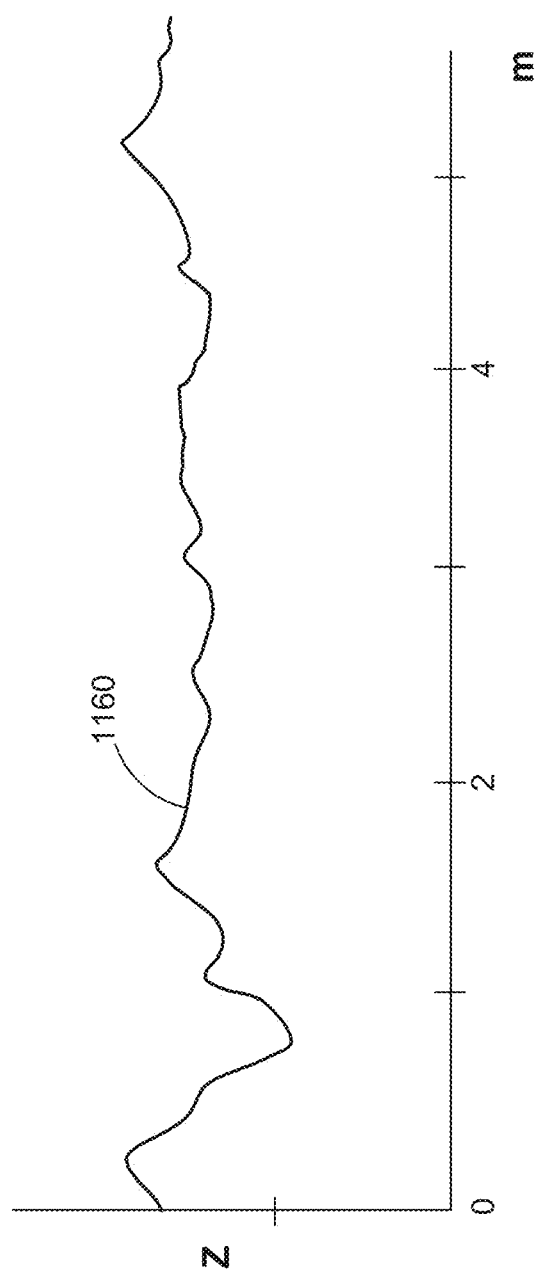
FIG. 11D shows an example road signature profile consistent with disclosed embodiments.

In some embodiments, sparse may 800 may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment.

Alternatively or concurrently, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowdsourcing a Sparse Map

In some embodiments, the disclosed systems and methods may generate a sparse for autonomous vehicle navigation. For example, disclosed systems and methods may use crowdsourced data for generation of a sparse that one or more autonomous vehicles may use to navigate along a system of roads. As used herein, "crowdsourcing" means that data are received from various vehicles (e.g., autonomous vehicles) travelling on a road segment at different times, and such data are used to generate and/or update the road model. The model may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation). An example of alignment of crowdsourced data for generating target trajectories is discussed below with respect to FIG. 29.

The vehicle trajectory data that a vehicle may upload to a server may correspond with the actual reconstructed trajectory for the vehicle or may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as the vehicle travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign.

The vehicle may determine a distance from the vehicle to the landmark based on the analysis of the one or more images. In some embodiments, the distance may be determined based on analysis of images of the landmark using a suitable image analysis method, such as a scaling method and/or an optical flow method. In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, other vehicles may capture an image of the landmark, process the image (e.g., using a classifier), and compare the result from processing the image to the indication stored in the server with regard to the type of landmark. There may be various types of landmarks, and different types of landmarks may be associated with different types of data to be uploaded to and stored in the server, different processing onboard the vehicle may detects the landmark and communicate information about the landmark to the server, and the system onboard the vehicle may receive the landmark data from the server and use the landmark data for identifying a landmark in autonomous navigation.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. For example, as discussed below with respect to FIG. 19, the server may generate a sparse map having the unified road model using the uploaded curves and landmarks.

The server may also distribute the model to clients (e.g., vehicles). For example, as discussed below with respect to FIG. 24, the server may distribute the sparse map to one or more vehicles. The server may continuously or periodically update the model when receiving new data from the vehicles. For example, the server may process the new data to evaluate whether the data includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before the vehicle reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment. For example, as discussed with respect to FIG. 29 below, the remote server may align the trajectories to generate a crowdsourced sparse map from the collected trajectories.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral portion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation. For example, as discussed further below, the server may use crowdsourced data to filter out "ghost" landmarks detected by vehicles.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Figure 12:
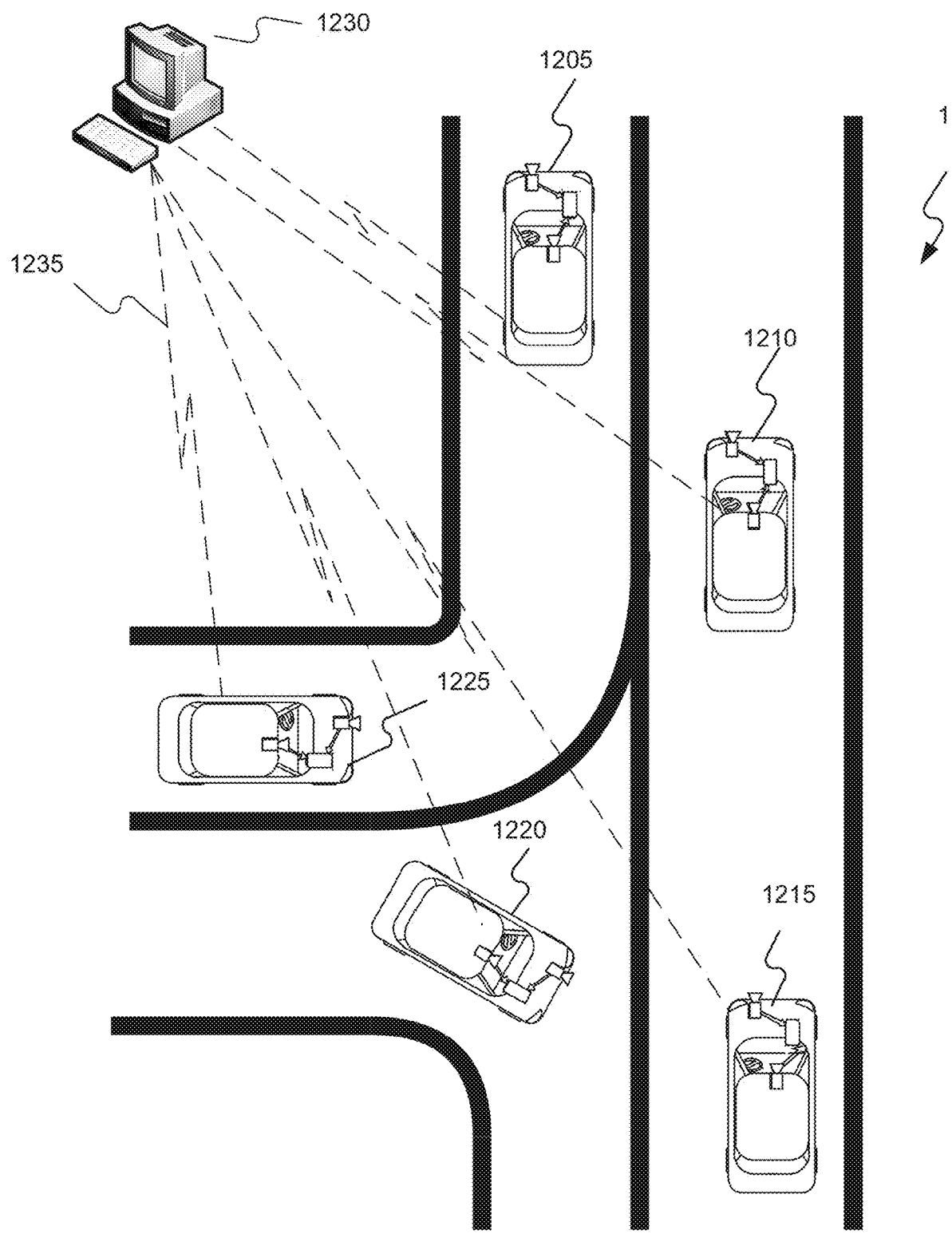
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowdsourced to generate a sparse map (as well as distribute and navigate using a crowdsourced sparse map). FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205, 1210, 1215, 1220, and 1225 may be an autonomous vehicle. For simplicity of the present example, all of the vehicles 1205, 1210, 1215, 1220, and 1225 are presumed to be autonomous vehicles.

Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205, 1210, 1215, 1220, and 1225 travel on road segment 1200, navigation information collected (e.g., detected, sensed, or measured) by vehicles 1205, 1210, 1215, 1220, and 1225 may be transmitted to server 1230. In some embodiments, the navigation information may be associated with the common road segment 1200. The navigation information may include a trajectory associated with each of the vehicles 1205, 1210, 1215, 1220, and 1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205, 1210, 1215, 1220, and 1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205, 1210, 1215, 1220, and 1225 to server 1230 may include data regarding the road surface, the road geometry, or the road profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205, 1210, 1215, 1220, and 1225 and may store the model as a portion of a sparse map. Server 1230 may determine a trajectory associated with each lane based on crowdsourced data (e.g., navigation information) received from multiple vehicles (e.g., 1205, 1210, 1215, 1220, and 1225) that travel on a lane of road segment at different times. Server 1230 may generate the autonomous vehicle road navigation model or a portion of the model (e.g., an updated portion) based on a plurality of trajectories determined based on the crowd sourced navigation data. As explained in greater detail below with respect to FIG. 24, server 1230 may transmit the model or the updated portion of the model to one or more of autonomous vehicles 1205, 1210, 1215, 1220, and 1225 traveling on road segment 1200 or any other autonomous vehicles that travel on road segment at a later time for updating an existing autonomous vehicle road navigation model provided in a navigation system of the vehicles. As explained in greater detail below with respect to FIG. 26, the autonomous vehicle road navigation model may be used by the autonomous vehicles in autonomously navigating along the common road segment 1200.

As explained above, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205, 1210, 1215, 1220, and 1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

As explained above, the autonomous vehicle road navigation model included in the sparse map may include other information, such as identification of at least one landmark along road segment 1200. The landmark may be visible within a field of view of a camera (e.g., camera 122) installed on each of vehicles 1205, 1210, 1215, 1220, and 1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205, 1210, 1215, 1220, and 1225. In some embodiments, the position of the landmark may be determined by averaging the position measurements detected, collected, or received by sensor systems on different vehicles 1205, 1210, 1215, 1220, and 1225 through multiple drives. For example, vehicles 1205, 1210, 1215, 1220, and 1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time.

When the physical size of the landmark is known, the distance to the landmark may also be determined based on the following equation: $Z=f*W/\omega$, where f is the focal length, W is the size of the landmark (e.g., height or width), $\omega$ is the number of pixels when the landmark leaves the image. From the above equation, a change in distance Z may be calculated using $\Delta Z=f*W*\Delta\omega/\omega^2+f*\Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z=f*W*\Delta\omega/\omega2+f*\Delta W/\omega$. However, $\Delta W$ decays to zero by averaging; hence $\Delta Z$ is determined by $\Delta w$ (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
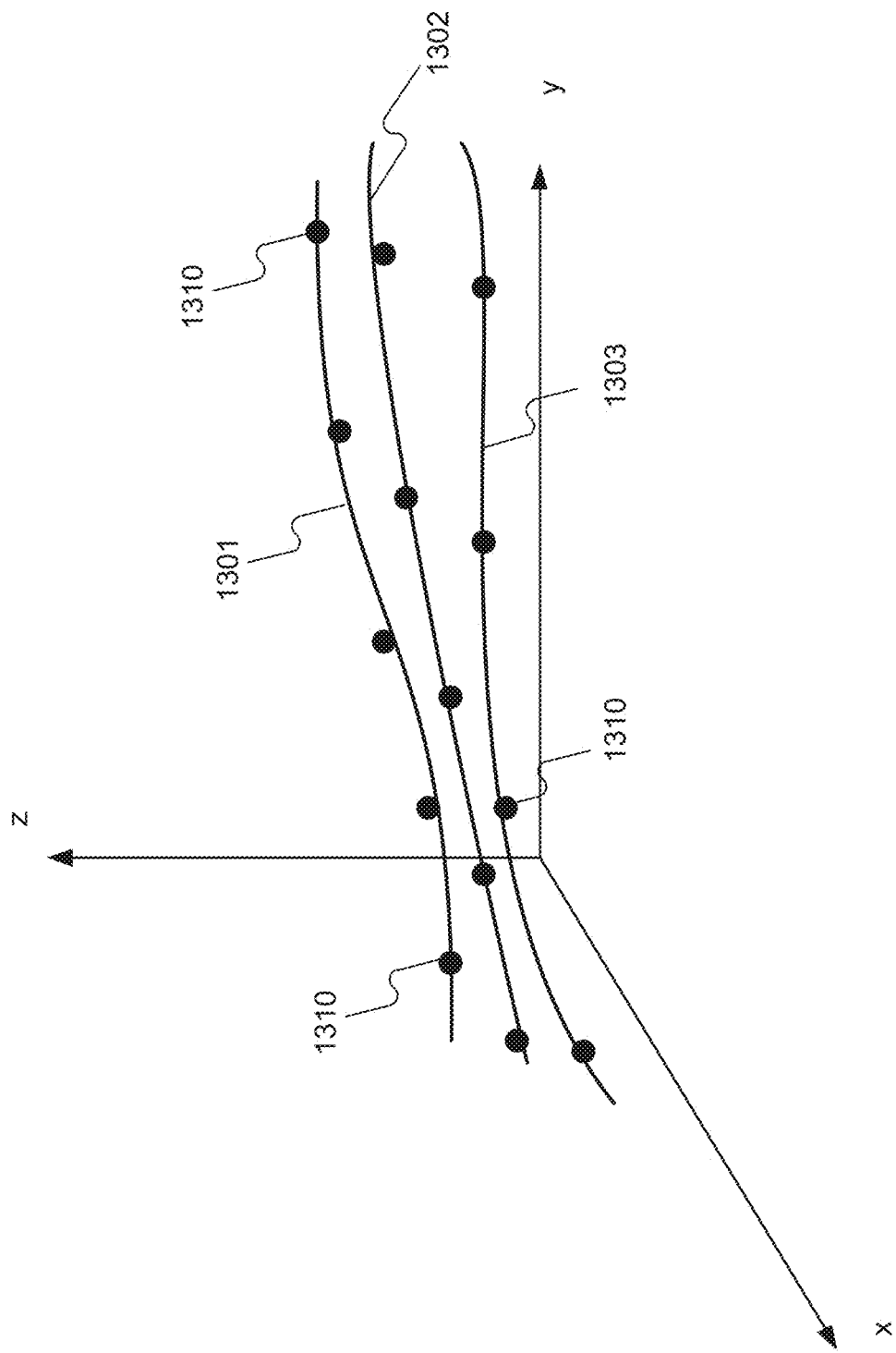
FIG. 13 illustrates an example autonomous vehicle road navigation model represented by a plurality of three dimensional splines, consistent with the disclosed embodiments.

FIG. 13 illustrates an example autonomous vehicle road navigation model represented by a plurality of three dimensional splines 1301, 1302, and 1303. The curves 1301, 1302, and 1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205, 1210, 1215, 1220, and 1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
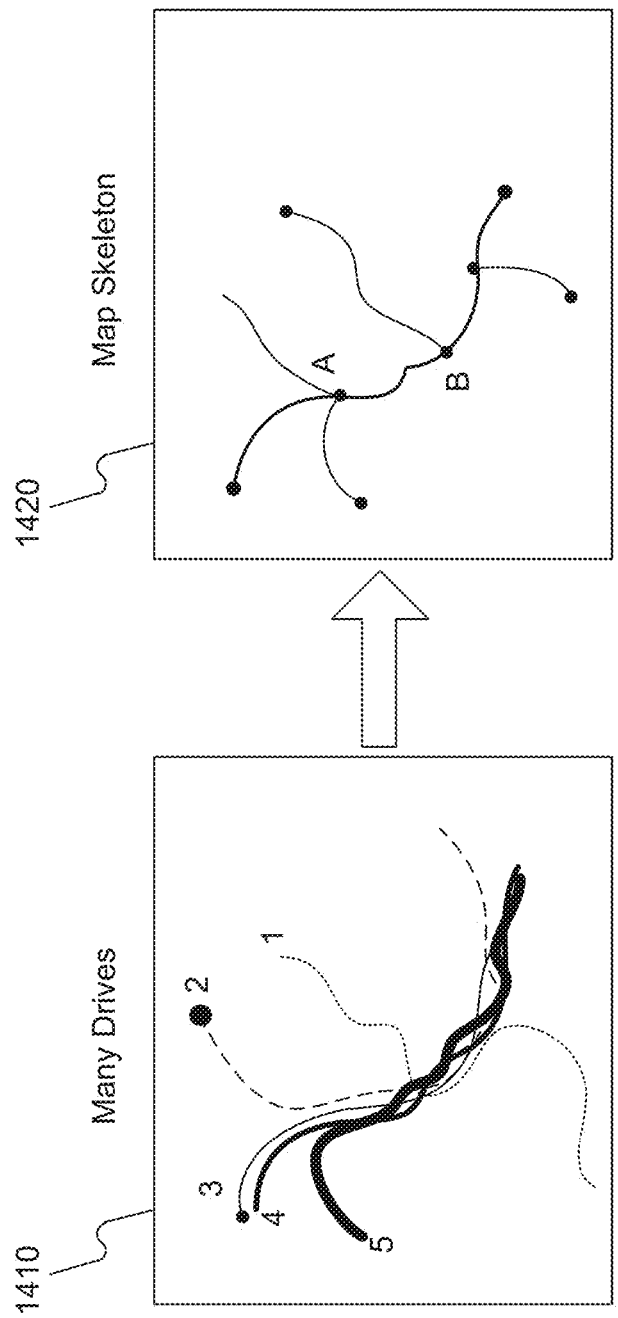
FIG. 14 shows a map skeleton generated from combining location information from many drives, consistent with the disclosed embodiments.

FIG. 14 illustrates raw location data 1410 (e.g., GPS data) received from five separate drives. One drive may be separate from another drive if it was traversed by separate vehicles at the same time, by the same vehicle at separate times, or by separate vehicles at separate times. To account for errors in the location data 1410 and for differing locations of vehicles within the same lane (e.g., one vehicle may drive closer to the left of a lane than another), server 1230 may generate a map skeleton 1420 using one or more statistical techniques to determine whether variations in the raw location data 1410 represent actual divergences or statistical errors. Each path within skeleton 1420 may be linked back to the raw data 1410 that formed the path. For example, the path between A and B within skeleton 1420 is linked to raw data 1410 from drives 2, 3, 4, and 5 but not from drive 1. Skeleton 1420 may not be detailed enough to be used to navigate a vehicle (e.g., because it combines drives from multiple lanes on the same road unlike the splines described above) but may provide useful topological information and may be used to define intersections.

Figure 15:
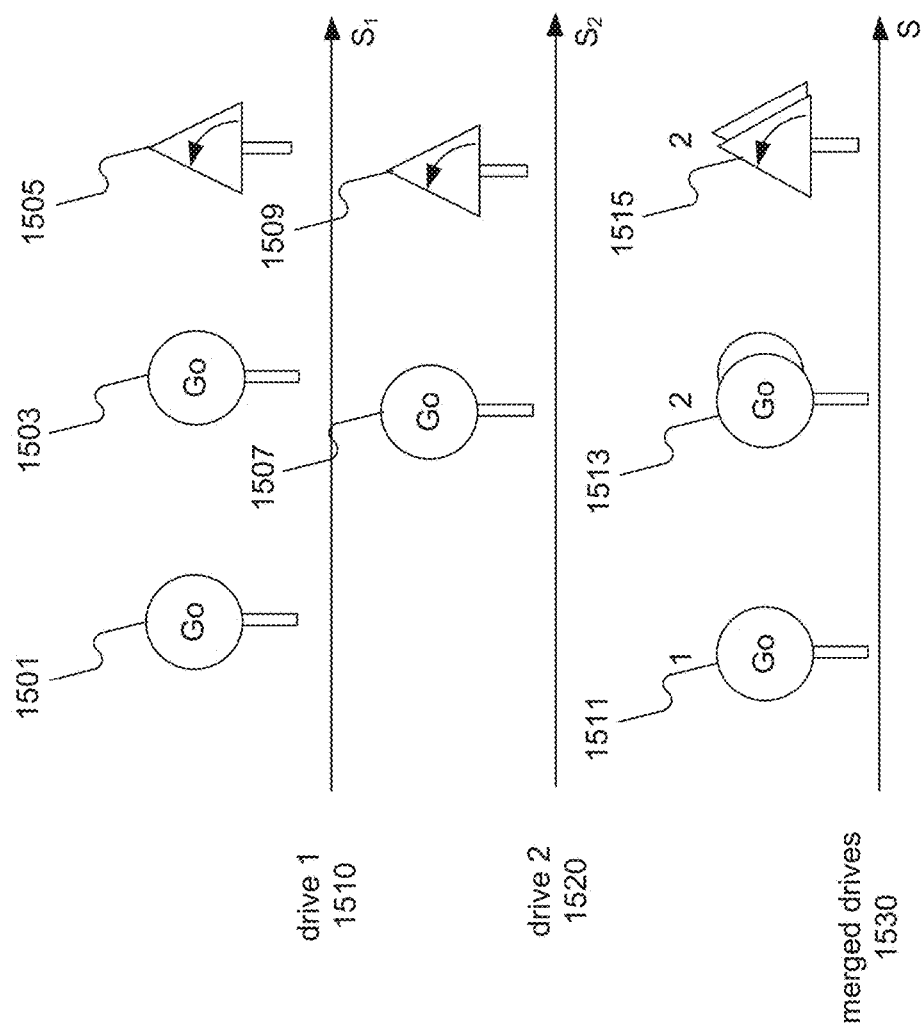
FIG. 15 shows an example of a longitudinal alignment of two drives with example signs as landmarks, consistent with the disclosed embodiments.

FIG. 15 illustrates an example by which additional detail may be generated for a sparse map within a segment of a map skeleton (e.g., segment A to B within skeleton 1420). As depicted in FIG. 15, the data (e.g. ego-motion data, road markings data, and the like) may be shown as a function of position S (or $S_1$ or $S_2$) along the drive. Server 1230 may identify landmarks for the sparse map by identifying unique matches between landmarks 1501, 1503, and 1505 of drive 1510 and landmarks 1507 and 1509 of drive 1520. Such a matching algorithm may result in identification of landmarks 1511, 1513, and 1515. One skilled in the art would recognize, however, that other matching algorithms may be used. For example, probability optimization may be used in lieu of or in combination with unique matching. As described in further detail below with respect to FIG. 29, server 1230 may longitudinally align the drives to align the matched landmarks. For example, server 1230 may select one drive (e.g., drive 1520) as a reference drive and then shift and/or elastically stretch the other drive(s) (e.g., drive 1510) for alignment.

Figure 16:
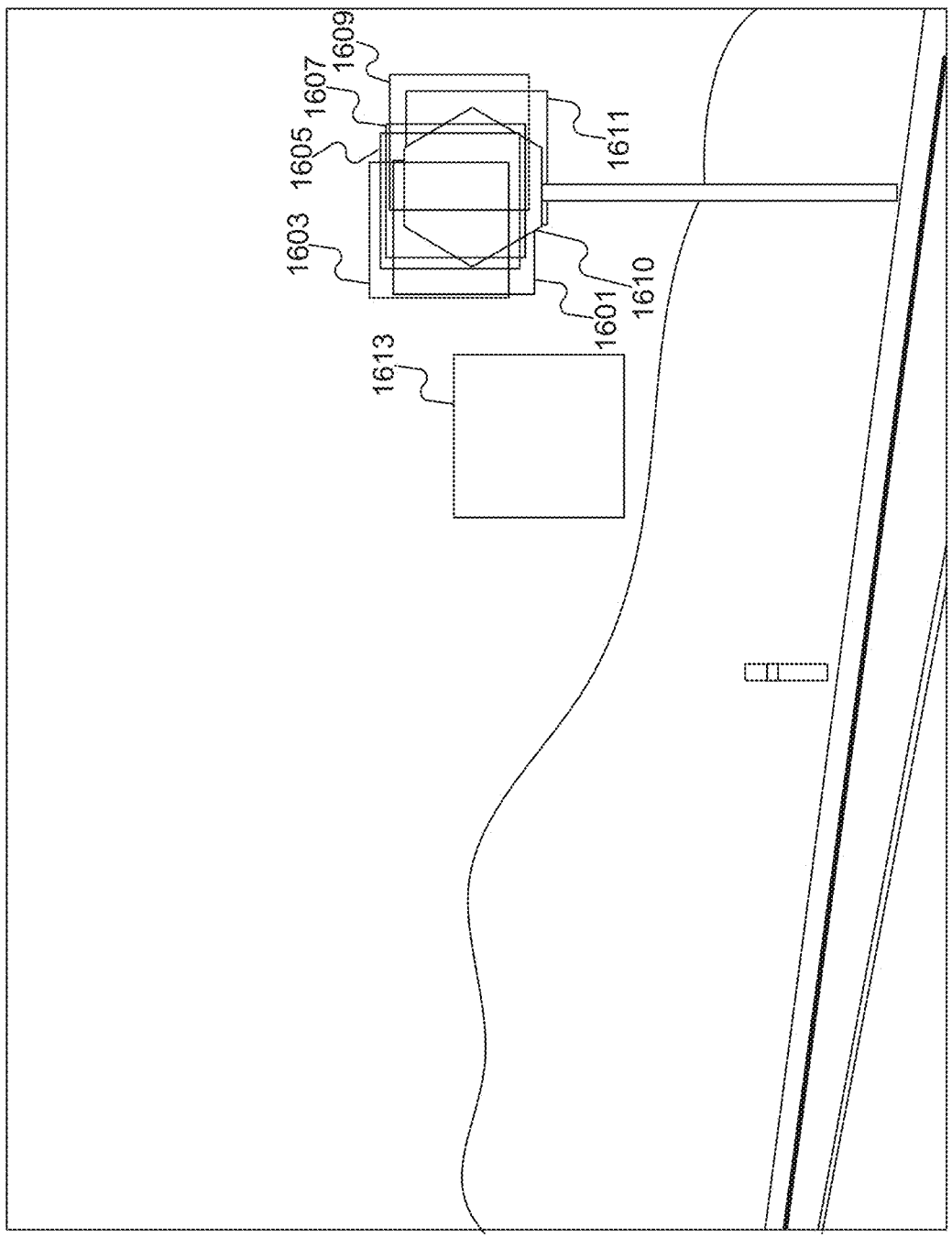
FIG. 16 shows an example of a longitudinal alignment of many drives with an example sign as a landmark, consistent with the disclosed embodiments.

FIG. 16 shows an example of aligned landmark data for use in a sparse map. In the example of FIG. 16, landmark 1610 comprises a road sign. The example of FIG. 16 further depicts data from a plurality of drives 1601, 1603, 1605, 1607, 1609, 1611, and 1613. In the example of FIG. 16, the data from drive 1613 consists of a "ghost" landmark, and the server 1230 may identify it as such because none of drives 1601, 1603, 1605, 1607, 1609, and 1611 include an identification of a landmark in the vicinity of the identified landmark in drive 1613. Accordingly, server 1230 may accept potential landmarks when a ratio of images in which the landmark does appear to images in which the landmark does not appear exceeds a threshold and/or may reject potential landmarks when a ratio of images in which the landmark does not appear to images in which the landmark does appear exceeds a threshold.

Figure 17:
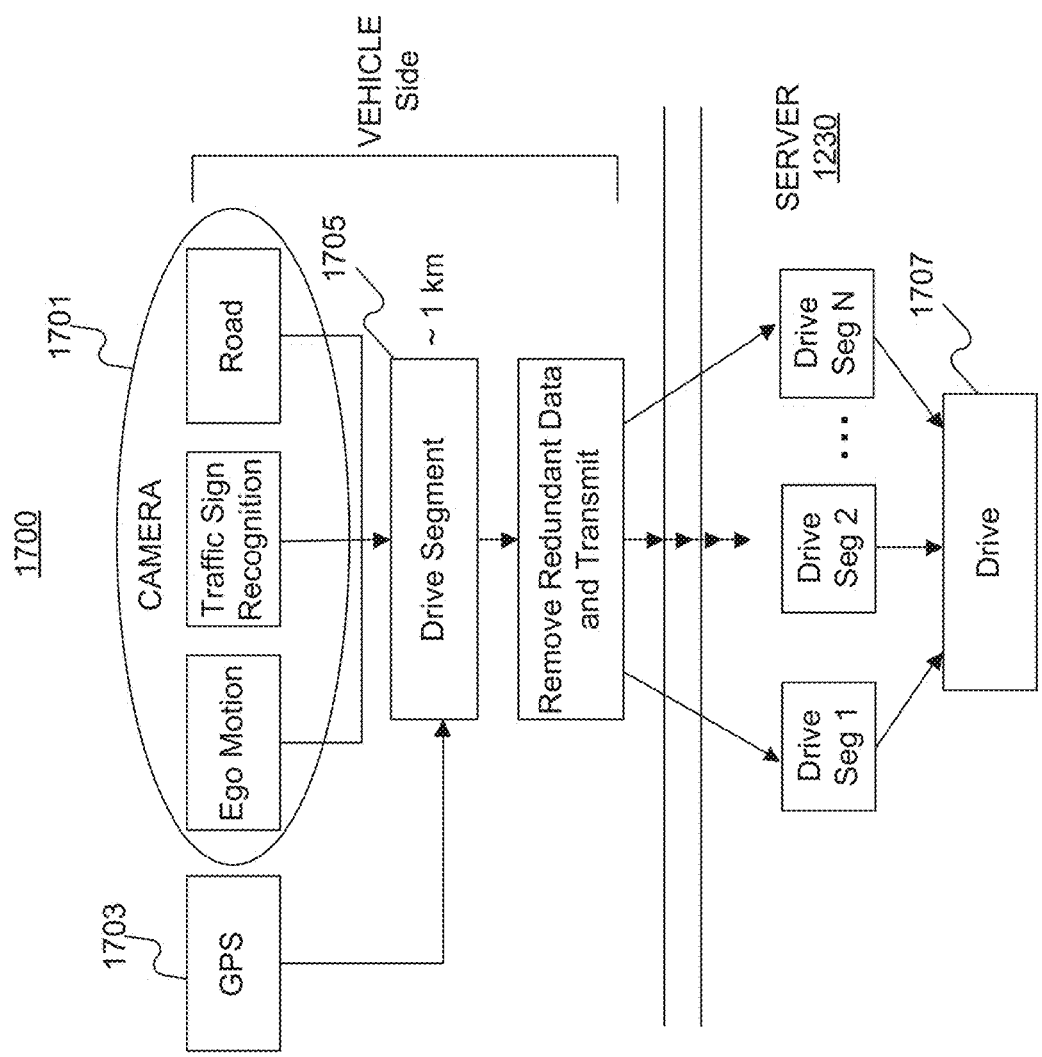
FIG. 17 is a schematic illustration of a system for generating drive data using a camera, a vehicle, and a server, consistent with the disclosed embodiments.

FIG. 17 depicts a system 1700 for generating drive data, which may be used to crowdsource a sparse map. As depicted in FIG. 17, system 1700 may include a camera 1701 and a locating device 1703 (e.g., a GPS locator). Camera 1701 and locating device 1703 may be mounted on a vehicle (e.g., one of vehicles 1205, 1210, 1215, 1220, and 1225). Camera 1701 may produce a plurality of data of multiple types, e.g., ego motion data, traffic sign data, road data, or the like. The camera data and location data may be segmented into drive segments 1705. For example, drive segments 1705 may each have camera data and location data from less than 1 km of driving.

In some embodiments, system 1700 may remove redundancies in drive segments 1705. For example, if a landmark appears in multiple images from camera 1701, system 1700 may strip the redundant data such that the drive segments 1705 only contain one copy of the location of and any metadata relating to the landmark. By way of further example, if a lane marking appears in multiple images from camera 1701, system 1700 may strip the redundant data such that the drive segments 1705 only contain one copy of the location of and any metadata relating to the lane marking.

System 1700 also includes a server (e.g., server 1230). Server 1230 may receive drive segments 1705 from the vehicle and recombine the drive segments 1705 into a single drive 1707. Such an arrangement may allow for reduce bandwidth requirements when transferring data between the vehicle and the server while also allowing for the server to store data relating to an entire drive.

Figure 18:
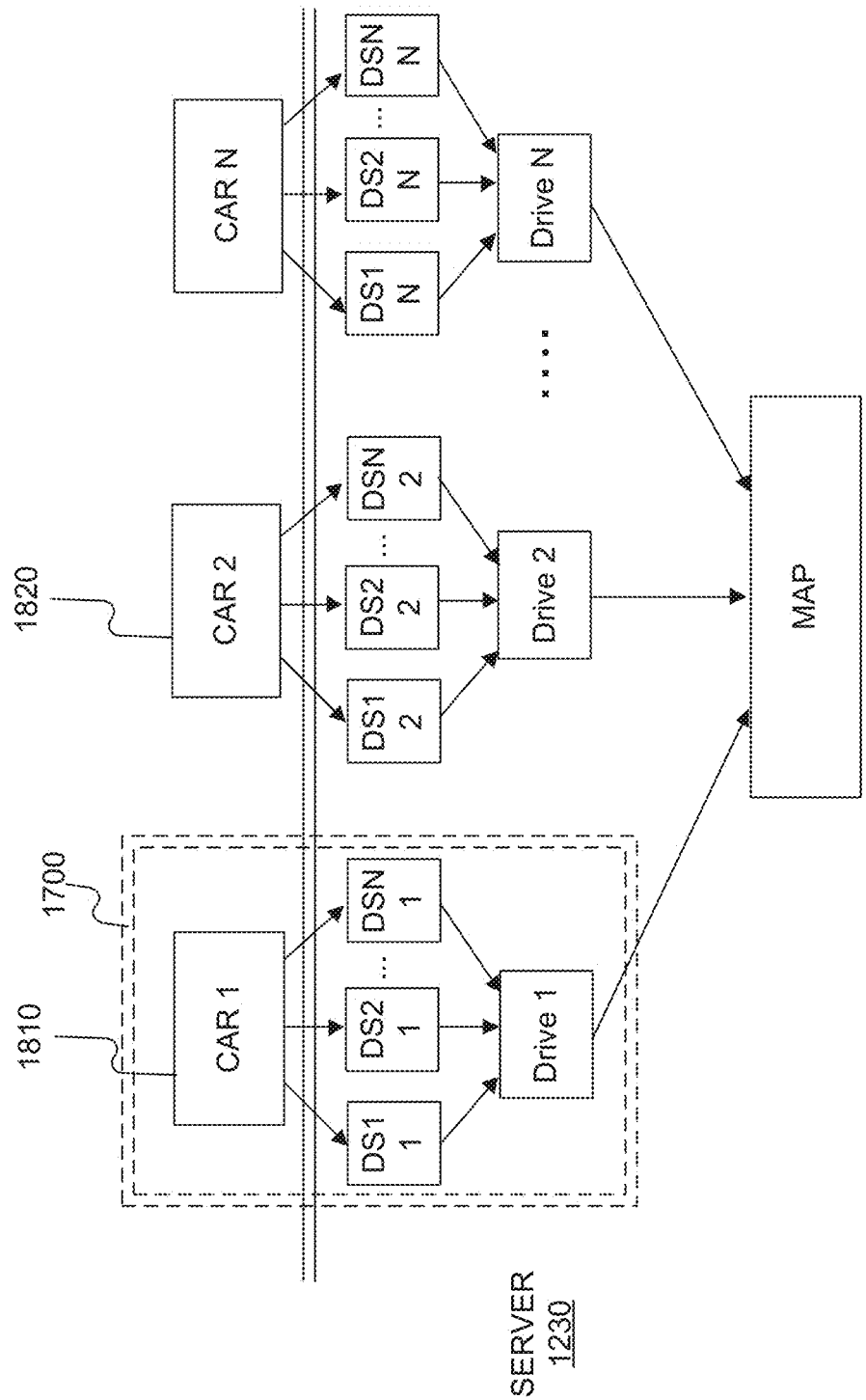
FIG. 18 is a schematic illustration of a system for crowdsourcing a sparse map, consistent with the disclosed embodiments.

FIG. 18 depicts system 1700 of FIG. 17 further configured for crowdsourcing a sparse map. As in FIG. 17, system 1700 includes vehicle 1810, which captures drive data using, for example, a camera (which produces, e.g., ego motion data, traffic sign data, road data, or the like) and a locating device (e.g., a GPS locator). As in FIG. 17, vehicle 1810 segments the collected data into drive segments (depicted as "DS1 1," "DS2 1," "DSN 1" in FIG. 18). Server 1230 then receives the drive segments and reconstructs a drive (depicted as "Drive 1" in FIG. 18) from the received segments.

As further depicted in FIG. 18, system 1700 also receives data from additional vehicles. For example, vehicle 1820 also captures drive data using, for example, a camera (which produces, e.g., ego motion data, traffic sign data, road data, or the like) and a locating device (e.g., a GPS locator). Similar to vehicle 1810, vehicle 1820 segments the collected data into drive segments (depicted as "DS1 2," "DS2 2," "DSN 2" in FIG. 18). Server 1230 then receives the drive segments and reconstructs a drive (depicted as "Drive 2" in FIG. 18) from the received segments. Any number of additional vehicles may be used. For example, FIG. 18 also includes "CAR N" that captures drive data, segments it into drive segments (depicted as "DS1 N," "DS2 N." "DSN N" in FIG. 18), and sends it to server 1230 for reconstruction into a drive (depicted as "Drive N" in FIG. 18).

As depicted in FIG. 18, server 1230 may construct a sparse map (depicted as "MAP") using the reconstructed drives (e.g., "Drive 1," "Drive 2," and "Drive N") collected from a plurality of vehicles (e.g., "CAR 1" (also labeled vehicle 1810), "CAR 2" (also labeled vehicle 1820), and "CAR N").

Figure 19:
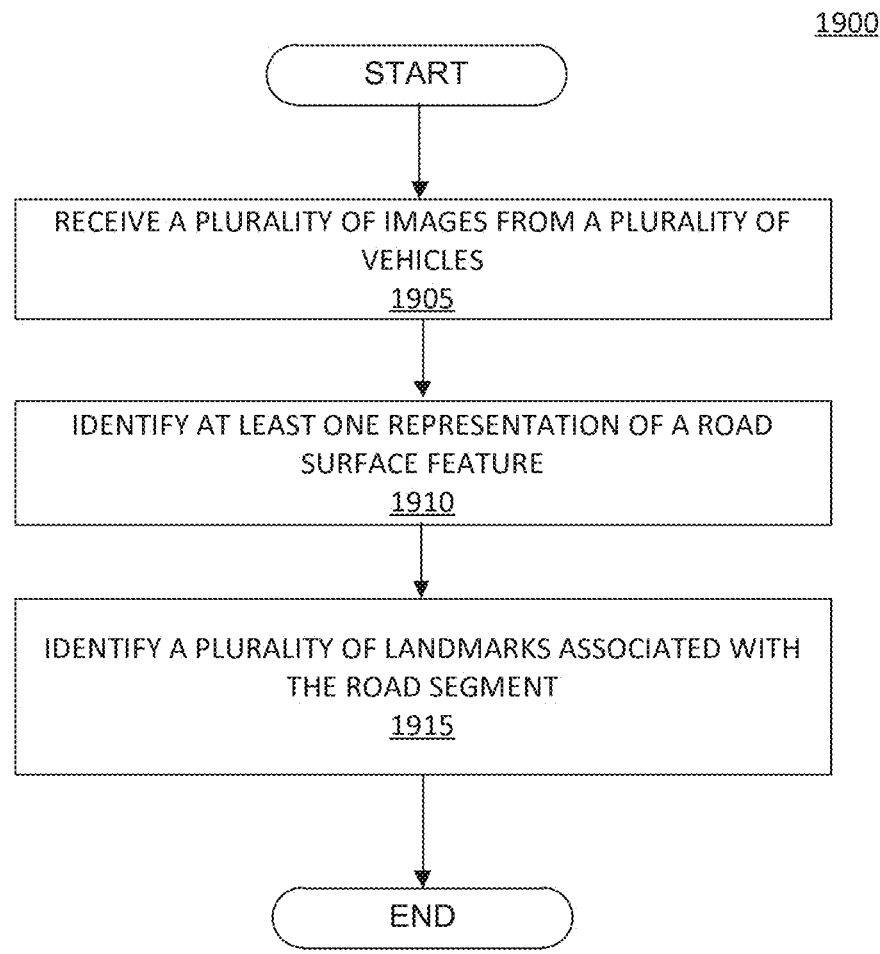
FIG. 19 is a flowchart showing an exemplary process for generating a sparse map for autonomous vehicle navigation along a road segment, consistent with the disclosed embodiments.

FIG. 19 is a flowchart showing an example process 1900 for generating a sparse map for autonomous vehicle navigation along a road segment. Process 1900 may be performed by one or more processing devices included in server 1230.

Process 1900 may include receiving a plurality of images acquired as one or more vehicles traverse the road segment (step 1905). Server 1230 may receive images from cameras included within one or more of vehicles 1205, 1210, 1215, 1220, and 1225. For example, camera 122 may capture one or more images of the environment surrounding vehicle 1205 as vehicle 1205 travels along road segment 1200. In some embodiments, server 1230 may also receive stripped down image data that has had redundancies removed by a processor on vehicle 1205, as discussed above with respect to FIG. 17.

Process 1900 may further include identifying, based on the plurality of images, at least one line representation of a road surface feature extending along the road segment (step 1910). Each line representation may represent a path along the road segment substantially corresponding with the road surface feature. For example, server 1230 may analyze the environmental images received from camera 122 to identify a road edge or a lane marking and determine a trajectory of travel along road segment 1200 associated with the road edge or lane marking. In some embodiments, the trajectory (or line representation) may include a spline, a polynomial representation, or a curve. Server 1230 may determine the trajectory of travel of vehicle 1205 based on camera ego motions (e.g., three dimensional translation and/or three dimensional rotational motions) received at step 1905.

Process 1900 may also include identifying, based on the plurality of images, a plurality of landmarks associated with the road segment (step 1910). For example, server 1230 may analyze the environmental images received from camera 122 to identify one or more landmarks, such as road sign along road segment 1200. Server 1230 may identify the landmarks using analysis of the plurality of images acquired as one or more vehicles traverse the road segment. To enable crowdsourcing, the analysis may include rules regarding accepting and rejecting possible landmarks associated with the road segment. For example, the analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold.

Process 1900 may include other operations or steps performed by server 123. For example, the navigation information may include a target trajectory for vehicles to travel along a road segment, and process 1900 may include clustering, by server 1230, vehicle trajectories related to multiple vehicles travelling on the road segment and determining the target trajectory based on the clustered vehicle trajectories, as discussed in further detail below. Clustering vehicle trajectories may include clustering, by server 1230, the multiple trajectories related to the vehicles travelling on the road segment into a plurality of clusters based on at least one of the absolute heading of vehicles or lane assignment of the vehicles. Generating the target trajectory may include averaging, by server 1230, the clustered trajectories.

By way of further example, process 1900 may include aligning data received in step 1905, as discussed in further detail below with respect to FIG. 29. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle may determine its position and orientation relative to the map. It seems natural to use a GPS device on board, in order to position the vehicle on the map and in order to find the rotation transformation between the body reference frame and the world reference frame (e.g., North, East and Down). Once the body reference frame is aligned with the map reference frame, then the desired route may be expressed in the body reference frame and the steering commands may be computed or generated.

However, one possible issue with this strategy is that current GPS technology does not usually provide the body location and position with sufficient accuracy and availability. To overcome this problem, landmarks whose world coordinates are known may be used to construct very detailed maps (called High Definition or HD maps), that contain landmarks of different kinds. Accordingly, a vehicle equipped with a sensor may detect and locate the landmarks in its own reference frame. Once the relative position between the vehicle and the landmarks is found, the landmarks' world coordinates may be determined from the HD map, and the vehicle may use them to compute its own location and position.

This method may nevertheless use the global world coordinate system as a mediator that establishes the alignment between the map and the body reference frames. Namely, the landmarks may be used in order to compensate for the limitations of the GPS device onboard the vehicles. The landmarks, together with an HD map, may enable to compute the precise vehicle position in global coordinates, and hence the map-body alignment problem is solved.

In the disclosed systems and methods, instead of using one global map of the world, many map pieces or local maps may be used for autonomous navigation. Each piece of a map or each local map may define its own coordinate frame. These coordinate frames may be arbitrary. The vehicle's coordinates in the local maps may not need to indicate where the vehicle is located on the surface of earth. Moreover, the local maps may not be required to be accurate over large scales, meaning there may be no rigid transformation that can embed a local map in the global world coordinate system.

There are two main processes associated with this representation of the world, one relates to the generation of the maps and the other relates to using them. With respect to map generation, this type of representation may be created and maintained by crowdsourcing. There may be no need to apply sophisticated survey equipment, because the use of HD maps is limited, and hence crowd sourcing becomes feasible. With respect to usage, an efficient method to align the local map with the body reference frame without going through a standard world coordinate system may be employed. Hence there may be no need, at least in most scenarios and circumstances, to have a precise estimation of the vehicle location and position in global coordinates. Further, the memory footprint of the local maps may be kept very small.

The principle underlying the maps generation is the integration of ego motion. The vehicles may sense the motion of the camera in space (3D translation and 3D rotation). The vehicles or the server may reconstruct the trajectory of the vehicle by integration of ego motion over time, and this integrated path may be used as a model for the road geometry. This process may be combined with sensing of close range lane marks, and then the reconstructed route may reflect the path that a vehicle should follow, and not the particular path that the vehicle did follow. In other words, the reconstructed route or trajectory may be modified based on the sensed data relating to close range lane marks, and the modified reconstructed trajectory may be used as a recommended trajectory or target trajectory, which may be saved in the road model or sparse map for use by other vehicles navigating the same road segment.

In some embodiments, the map coordinate system may be arbitrary. A camera reference frame may be selected at an arbitrary time, and used as the map origin. The integrated trajectory of the camera may be expressed in the coordinate system of that particular chosen frame. The value of the route coordinates in the map may not directly represent a location on earth.

The integrated path may accumulate errors. This may be due to the fact that the sensing of the ego motion may not be absolutely accurate. The result of the accumulated error is that the local map may diverge, and the local map may not be regarded as a local copy of the global map. The larger the size of the local map piece, the larger the deviation from the "true" geometry on earth.

The arbitrariness and the divergence of the local maps may not be a consequence of the integration method, which may be applied in order to construct the maps in a crowdsourcing manner (e.g., by vehicles traveling along the roads). However, vehicles may successfully use the local maps for steering.

The map may diverge over long distances. Since the map is used to plan a trajectory in the immediate vicinity of the vehicle, the effect of the divergence may be acceptable. At any time instance, the system (e.g., server 1230 or vehicle 1205) may repeat the alignment procedure, and use the map to predict the road location (in the camera coordinate frame) some 1.3 seconds ahead (or any other seconds, such as 1.5 seconds, 1.0 second, 1.8 seconds, etc.). As long as the accumulated error over that distance is small enough, then the steering command provided for autonomous driving may be used.

In some embodiments, a local map may focus on a local area, and may not cover a too large area. This means that a vehicle that is using a local map for steering in autonomous driving, may arrive at some point to the end of the map and may have to switch to another local piece or section of a map. The switching may be enabled by the local maps overlapping each other. Once the vehicle enters the area that is common to both maps, the system (e.g., server 1230 or vehicle 1205) may continue to generate steering commands based on a first local map (the map that is being used), but at the same time the system may localize the vehicle on the other map (or second local map) that overlaps with the first local map. In other words, the system may simultaneously align the present coordinate frame of the camera both with the coordinate frame of the first map and with the coordinate frame of the second map. When the new alignment is established, the system may switch to the other map and plan the vehicle trajectory there.

The disclosed systems may include additional features, one of which is related to the way the system aligns the coordinate frames of the vehicle and the map. As explained above that landmarks may be used for alignment, assuming the vehicle may measure its relative position to them. This is useful in autonomous driving, but sometimes it may result in a demand for a large number of landmarks and hence a large memory footprint. The disclosed systems may therefore use an alignment procedure that addresses this problem. In the alignment procedure, the system may compute a 1D estimator for the location of the vehicle along the road, using sparse landmarks and integration of ego speed. The system may use the shape of the trajectory itself to compute the rotation part of the alignment, using a tail alignment method discussed in details below in other sections. Accordingly, the vehicle may reconstruct its own trajectory while driving the "tail" and computes a rotation around its assumed position along the road, in order to align the tail with the map. Such an alignment procedure is distinct from the alignment of the crowdsourced data discussed below with respect to FIG. 29.

In the disclosed systems and methods, a GPS device may still be used. Global coordinates may be used for indexing the database that stores the trajectories and/or landmarks. The relevant piece of local map and the relevant landmarks in the vicinity of the vehicles may be stored in memory and retrieved from the memory using global GPS coordinates. However, in some embodiments, the global coordinates may not be used for path planning, and may not be accurate. In one example, the usage of global coordinates may be limited for indexing of the information.

In situations where "tail alignment" cannot function well, the system may compute the vehicle's position using a larger number of landmarks. This may be a rare case, and hence the impact on the memory footprint may be moderate. Road intersections are examples of such situations.

The disclosed systems and methods may use semantic landmarks (e.g., traffic signs), since they can be reliably detected from the scene and matched with the landmarks stored in the road model or sparse map. In some cases, the disclosed systems may use non-semantic landmarks (e.g., general purpose signs) as well, and in such cases the non-semantic landmarks may be attached to an appearance signature, as discussed above. The system may use a learning method for the generation of signatures that follows the "same or not-same" recognition paradigm.

For example, given many drives with GPS coordinates along them, the disclosed systems may produce the underlying road structure junctions and road segments, as discussed above with respect to FIG. 14. The roads are assumed to be far enough from each other to be able to differentiate them using the GPS. In some embodiments, only a coarse grained map may be needed. To generate the underlying road structure graph, the space may be divided into a lattice of a given resolution (e.g., 50 m by 50 m). Every drive may be seen as an ordered list of lattice sites. The system may color every lattice site belonging to a drive to produce an image of the merged drives. The colored lattice points may be represented as nodes on the merged drives. The drives passing from one node to another may be represented as links. The system may fill small holes in the image, to avoid differentiating lanes and correct for GPS errors. The system may use a suitable thinning algorithm (e.g., an algorithm named "Zhang-Suen" thinning algorithm) to obtain the skeleton of the image. This skeleton may represent the underlying road structure, and junctions may be found using a mask (e.g., a point connected to at least three others). After the junctions are found, the segments may be the skeleton parts that connect them. To match the drives back to the skeleton, the system may use a Hidden Markov Model. Every GPS point may be associated with a lattice site with a probability inverse to its distance from that site. Use a suitable algorithm (e.g., an algorithm named the "Viterbi" algorithm) to match GPS points to lattice sites, while not allowing consecutive GPS points to match to non-neighboring lattice sites.

A plurality of methods may be used for mapping the drives back to the map. For example, a first solution may include keeping track during the thinning process. A second solution may use proximity matching. A third solution may use hidden Markov model. The hidden Markov model assumes an underlying hidden state for every observation, and assigns probabilities for a given observation given the state, and for a state given the previous state. A Viterbi algorithm may be used to find the most probable states given a list of observations.

The disclosed systems and methods may include additional features. For example, the disclosed systems and methods may detect highway entrances/exits. Multiple drives in the same area may be merged using GPS data to the same coordinate system. The system may use visual feature points for mapping and localization.

In some embodiments, generic visual features may be used as landmarks for the purpose of registering the position and orientation of a moving vehicle, in one drive (localization phase), relative to a map generated by vehicles traversing the same stretch of road in previous drives (mapping phase). These vehicles may be equipped with calibrated cameras imaging the vehicle surroundings and GPS receivers. The vehicles may communicate with a central server (e.g., server 1230) that maintains an up-to-date map including these visual landmarks connected to other significant geometric and semantic information (e.g. lane structure, type and position of road signs, type and position of road marks, shape of nearby drivable ground area delineated by the position of physical obstacles, shape of previously driven vehicle path when controlled by human driver, etc.). The total amount of data that may be communicated between the central server and vehicles per length of road is small, both in a mapping and localization phases.

In a mapping phase, disclosed systems (e.g., autonomous vehicles and/or one or more servers) may detect feature points (FPs). Feature points may comprise one or more points that are used to track an associated object such as a landmark. For example, the eight points comprising the corners of a stop sign may be feature points. Disclosed systems may further compute descriptors associated with the FPs (e.g., using the features from the accelerated segment test (FAST) detector, the binary robust invariant scalable keypoints (BRISK) detector, the binary robust independent elementary features (BRIEF) detector, and/or the oriented FAST and rotated BRIEF (ORB) detector or using a detector/descriptor pair that was trained using a training library). The system may track FPs between frames in which they appear using their motion in the image plane and by matching the associated descriptors using, for example, Euclidean or Hamming distance in descriptor space. The system may use tracked FPs to estimate camera motion and world positions of objects on which FPs were detected and tracked. For example, tracked FPs may be used to estimate the motion of the vehicle and/or the position of a landmark on which the FPs were initially detected.

The system may further classify FPs as ones that will likely be detected in future drives or not (e.g., FPs detected on momentarily moving objects, parked cars, and shadow texture will likely not reappear in future drives). This classification may be referred to as a reproducibility classification (RC) and may be a function of the intensities of the light in a region of a pyramid surrounding the detected FP, the motion of the tracked FP in the image plane, and/or the extent of viewpoints in which it was successfully detected and tracked. In some embodiments, the vehicles may send descriptors associated with an FP, estimated 3D position relative to the vehicle of the FP, and momentary vehicle GPS coordinates at the time of detecting/tracking the FP, to server 1230.

During a mapping phase, when communication bandwidth between mapping vehicles and a central server is limited, the vehicles may send FPs to the server at a high frequency when the presence of FPs or other semantic landmarks in the map (such as road signs and lane structure) is limited and insufficient for the purpose of localization. Moreover, although vehicles in the mapping phase may generally send FPs to the server at a low spatial frequency, the FPs may be agglomerated in the server. Detection of reoccurring FPs may also be performed by the server and the server may store the set of reoccurring FPs and/or disregard FPs that do not reoccur. Visual appearance of landmarks may, at least in some cases, be sensitive to the time of day or the season in which they were captured. Accordingly, to increase reproducibility probability of FPs, the receive FPs may be binned by the server into time-of-day bins, season bins, and the like. In some embodiments, the vehicles may also send the server other semantic and geometric information associated with the FPs (e.g., lane shape, structure of road plane, 3D position of obstacles, free space in mapping clip momentary coordinate system, path driven by human driver in a setup drive to a parking location, etc.).

In a localization phase, the server may send a map containing landmarks in the form of FP positions and descriptors to one or more vehicles. Feature points (FPs) may be detected and tracked by the vehicles in near real time within a set of current consecutive frames. Tracked FPS may be used to estimate camera motion and/or positions of associated objects such as landmarks. Detected FP descriptors may be searched to match a list of FPs included in the map and having GPS coordinates within an estimated finite GPS uncertainty radius from the current GPS reading of the vehicle. Matching may be done by searching all pairs of current and mapping FPs that minimize an Euclidean or Hamming distance in descriptor space. Using the FP matches and their current and map positions, the vehicle may rotate and/or translate between the momentary vehicle position and the local map coordinate system.

The disclosed systems and methods may include a method for training a reproducibility classifier. Training may be performed in one of the following schemes in order of growing labeling cost and resulting classifier accuracy.

In the first scheme, a database including a large number of clips recorded by vehicle cameras with matching momentary vehicle GPS position may be collected. This database may include a representative sample of drives (with respect to various properties: e.g., time of day, season, weather condition, type of roadway). Feature points (FPs) extracted from frames of different drives at a similar GPS position and heading may be potentially matched within a GPS uncertainty radius. Unmatched FPs may be labeled unreproducible and those matched may be labeled reproducible. A classifier may then be trained to predict the reproducibility label of an FP given its appearance in the image pyramid, its momentary position relative to the vehicle and the extent of viewpoints positions in which it was successfully tracked.

In the second scheme, FP pairs extracted from the clip database described in the first scheme may also be labeled by a human responsible for annotating FP matches between clips.

In a third scheme, a database augmenting that of the first scheme with precise vehicle position, vehicle orientation and image pixel depth using Light Detection And Ranging (LIDAR) measurements may be used to accurately match world positions in different drives. Feature point descriptors may then be computed at the image region corresponding to these world points at different viewpoints and drive times. The classifier may then be trained to predict the average distance in descriptor space a descriptor is located from its matched descriptors. In this case reproducibility may be measured by likely having a low descriptor distance.

Consistent with disclosed embodiments, the system may generate an autonomous vehicle road navigation model based on the observed trajectories of vehicles traversing a common road segment (e.g., which may correspond to the trajectory information forwarded to a server by a vehicle). The observed trajectories, however, may not correspond to actual trajectories taken by vehicles traversing a road segment. Rather, in certain situations, the trajectories uploaded to the server may be modified with respect to actual reconstructed trajectories determined by the vehicles. For example, a vehicle system, while reconstructing a trajectory actually taken, may use sensor information (e.g., analysis of images provided by a camera) to determine that its own trajectory may not be the preferred trajectory for a road segment. For example, the vehicle may determine based on image data from onboard cameras that it is not driving in a center of a lane or that it crossed over a lane boundary for a determined period of time. In such cases, among others, a refinement to the vehicle's reconstructed trajectory (the actual path traversed) may be made based on information derived from the sensor output. The refined trajectory, not the actual trajectory, may then be uploaded to the server for potential use in building or updating sparse data map 800.

In some embodiments, then, a processor included in a vehicle (e.g., vehicle 1205) may determine an actual trajectory of vehicle 1205 based on the outputs from the one or more sensors. For example, based on analysis of images output from camera 122, the processor may identify landmarks along road segment 1200. Landmarks may include traffic signs (e.g., speed limit signs), directional signs (e.g., highway directional signs pointing to different routes or places), and general signs (e.g., a rectangular business sign that is associated with a unique signature, such as a color pattern). The identified landmark may be compared with the landmark stored in sparse map 800. When a match is found, the location of the landmark stored in sparse map 800 may be used as the location of the identified landmark. The location of the identified landmark may be used for determining the location of the vehicle 1205 along a target trajectory. In some embodiments, the processor may also determine the location of vehicle 1205 based on GPS signals output by GPS unit 1710.

The processor may also determine a target trajectory for transmitting to server 1230. The target trajectory may be the same as the actual trajectory determined by the processor based on the sensor outputs. In some embodiments, though, the target trajectory may be different from the actual trajectory determined based on the sensor outputs. For example, the target trajectory may include one or more modifications to the actual trajectory.

In one example, if data from camera 122 includes a barrier, such as a temporary lane shifting barrier 100 meters ahead of vehicle 1250 that changes the lanes (e.g., when lanes are temporarily shifted due to constructions or an accident ahead), the processor may detect the temporary lane shifting barrier from the image, and select a lane different from a lane corresponding to the target trajectory stored in the road model or sparse map in compliance to the temporary lane shift. The actual trajectory of vehicle may reflect this change of lanes. However, if the lane shifting is temporary and may be cleared in the next 10, 15, or 30 minutes, for example, vehicle 1205 may thus modify the actual trajectory (i.e., the shift of lanes) vehicle 1205 has taken to reflect that a target trajectory should be different from the actual trajectory vehicle 1205 has taken. For example, the system may recognize that the path traveled differs from a preferred trajectory for the road segment. Thus, the system may adjust a reconstructed trajectory prior to uploading the trajectory information to the servers.

In other embodiments, the actual reconstructed trajectory information may be uploaded, by one or more recommended trajectory refinements (e.g., a size and direction of a translation to be made to at least a portion of the reconstructed trajectory) may also be uploaded. In some embodiments, processor 1715 may transmit a modified actual trajectory to server 1230. Server 1230 may generate or update a target trajectory based on the received information and may transmit the target trajectory to other autonomous vehicles that later travel on the same road segment, as discussed in further detail below with respect to FIG. 24.

As another example, the environmental image may include an object, such as a pedestrian suddenly appearing in road segment 1200. The processor may detect the pedestrian, and vehicle 1205 may change lanes to avoid a collision with the pedestrian. The actual trajectory vehicle 1205 reconstructed based on sensed data may include the change of lanes. However, the pedestrian may soon leave the roadway. So, vehicle 1205 may modify the actual trajectory (or determine a recommended modification) to reflect that the target trajectory should be different from the actual trajectory taken (as the appearance of the pedestrian is a temporary condition that should not be accounted for in the target trajectory determination. In some embodiments, the vehicle may transmit to the server data indicating a temporary deviation from the predetermined trajectory, when the actual trajectory is modified. The data may indicate a cause of the deviation, or the server may analyze the data to determine a cause of the deviation. Knowing the cause of the deviation may be useful. For example, when the deviation is due to the driver noticing an accident that has recently occurred and, in response steering the wheel to avoid collision, the server may plan a more moderate adjustment to the model or a specific trajectory associated with the road segment based on the cause of deviation. As another example, when the cause of deviation is a pedestrian crossing the road, the server may determine that there is no need to change the trajectory in the future.

By way of further example, the environmental image may include a lane marking indicating that vehicle 1205 is driving slightly outside of a lane, perhaps under the control of a human driver. The processor may detect the lane marking from the captured images and may modify the actual trajectory of vehicle 1205 to account for the departure from the lane. For example, a translation may be applied to the reconstructed trajectory so that it falls within the center of an observed lane.

Distributing Crowdsourced Sparse Maps

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include a sparse map having the geometry of the road, its lane structure, and landmarks that may be used to determine the location or position of vehicles along a trajectory included in the model. As discussed above, generation of the sparse map may be performed by a remote server that communicates with vehicles travelling on the road and that receives data from the vehicles. The data may include sensed data, trajectories reconstructed based on the sensed data, and/or recommended trajectories that may represent modified reconstructed trajectories. As discussed below, the server may transmit the model back to the vehicles or other vehicles that later travel on the road to aid in autonomous navigation.

Figure 20:
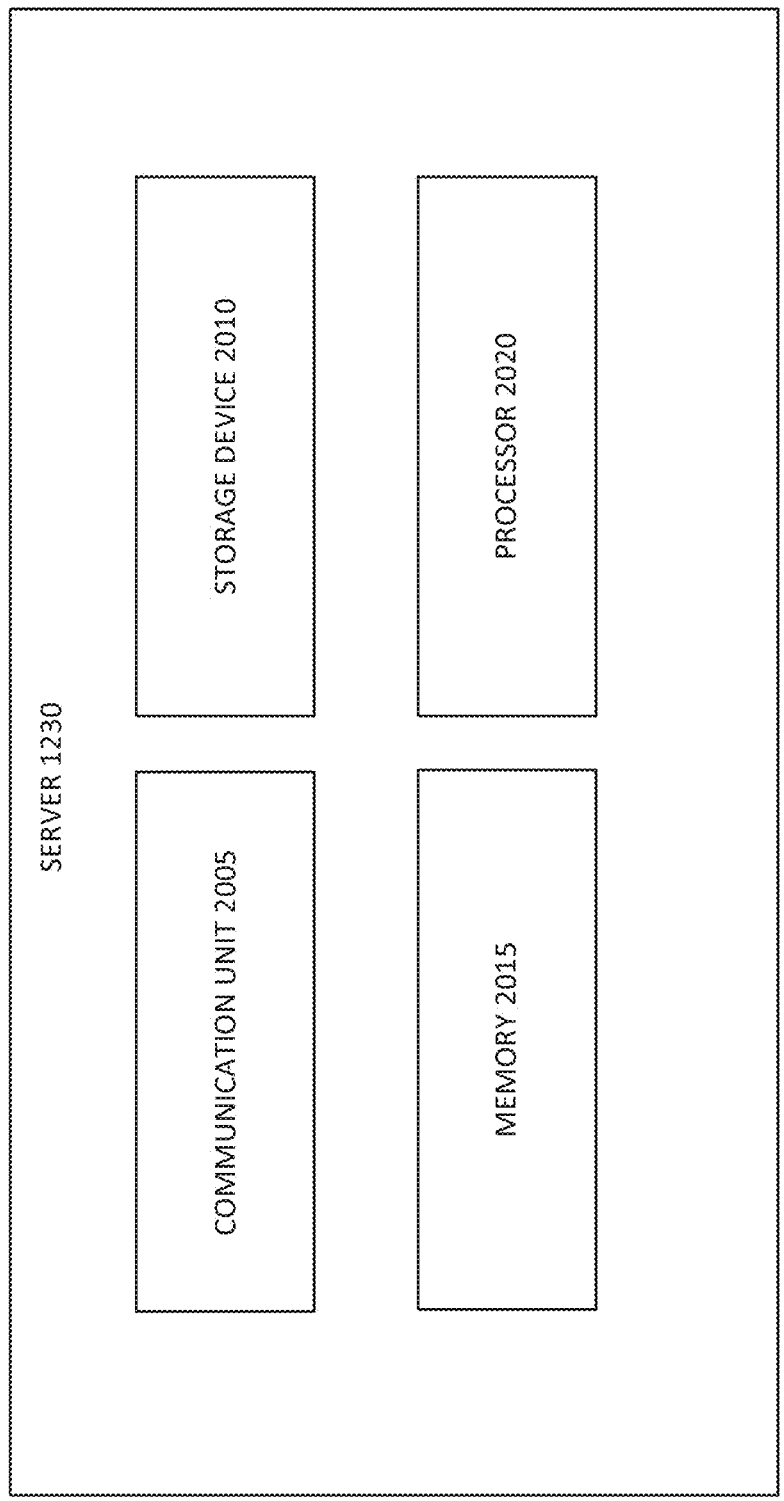
FIG. 20 illustrates a block diagram of a server consistent with the disclosed embodiments.

FIG. 20 illustrates a block diagram of server 1230. Server 1230 may include a communication unit 2005, which may include both hardware components (e.g., communication control circuits, switches, and antenna), and software components (e.g., communication protocols, computer codes). For example, communication unit 2005 may include at least one network interface. Server 1230 may communicate with vehicles 1205, 1210, 1215, 1220, and 1225 through communication unit 2005. For example, server 1230 may receive, through communication unit 2005, navigation information transmitted from vehicles 1205, 1210, 1215, 1220, and 1225. Server 1230 may distribute, through communication unit 2005, the autonomous vehicle road navigation model to one or more autonomous vehicles.

Server 1230 may include at least one non-transitory storage medium 2010, such as a hard drive, a compact disc, a tape, etc. Storage device 1410 may be configured to store data, such as navigation information received from vehicles 1205, 1210, 1215, 1220, and 1225 and/or the autonomous vehicle road navigation model that server 1230 generates based on the navigation information. Storage device 2010 may be configured to store any other information, such as a sparse map (e.g., sparse map 800 discussed above with respect to FIG. 8).

In addition to or in place of storage device 2010, server 1230 may include a memory 2015. Memory 2015 may be similar to or different from memory 140 or 150. Memory 2015 may be a non-transitory memory, such as a flash memory, a random access memory, etc. Memory 2015 may be configured to store data, such as computer codes or instructions executable by a processor (e.g., processor 2020), map data (e.g., data of sparse map 800), the autonomous vehicle road navigation model, and/or navigation information received from vehicles 1205, 1210, 1215, 1220, and 1225.

Server 1230 may include at least one processing device 2020 configured to execute computer codes or instructions stored in memory 2015 to perform various functions. For example, processing device 2020 may analyze the navigation information received from vehicles 1205, 1210, 1215, 1220, and 1225, and generate the autonomous vehicle road navigation model based on the analysis. Processing device 2020 may control communication unit 1405 to distribute the autonomous vehicle road navigation model to one or more autonomous vehicles (e.g., one or more of vehicles 1205, 1210, 1215, 1220, and 1225 or any vehicle that travels on road segment 1200 at a later time). Processing device 2020 may be similar to or different from processor 180, 190, or processing unit 110.

Figure 21:
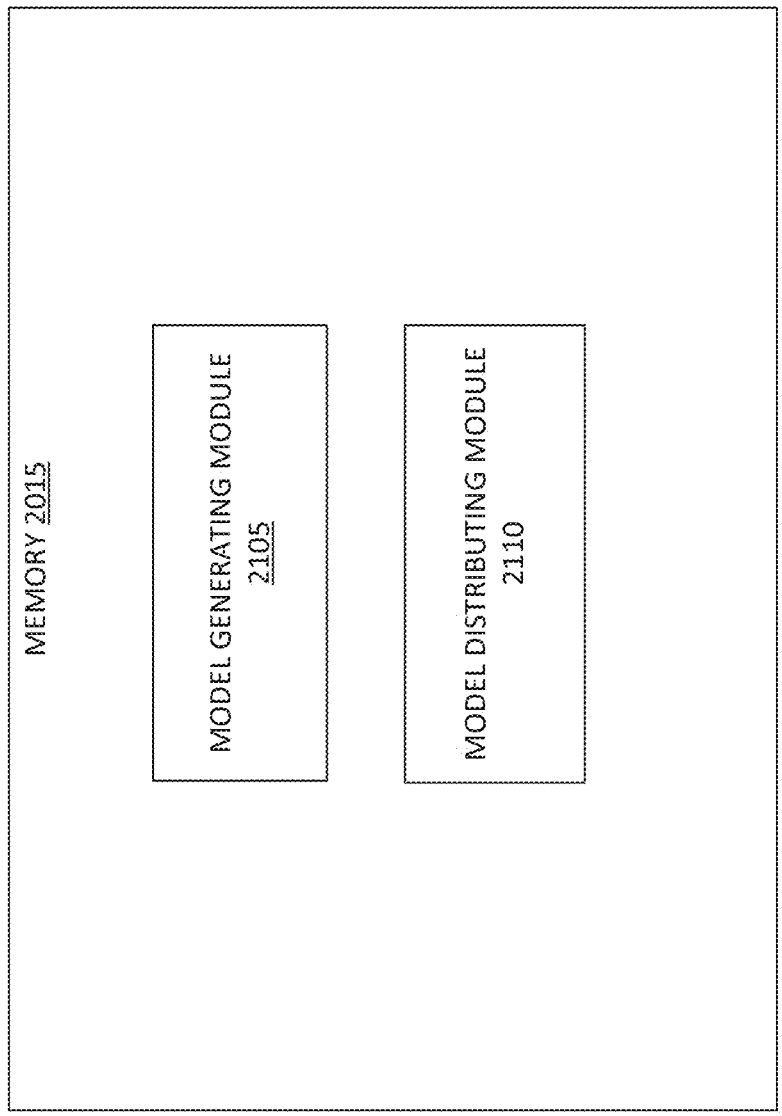
FIG. 21 illustrates a block diagram of a memory consistent with the disclosed embodiments.

FIG. 21 illustrates a block diagram of memory 2015, which may store computer code or instructions for performing one or more operations for generating a road navigation model for use in autonomous vehicle navigation. As shown in FIG. 21, memory 2015 may store one or more modules for performing the operations for processing vehicle navigation information. For example, memory 2015 may include a model generating module 2105 and a model distributing module 2110. Processor 2020 may execute the instructions stored in any of modules 2105 and 2110 included in memory 2015.

Model generating module 2105 may store instructions which, when executed by processor 2020, may generate at least a portion of an autonomous vehicle road navigation model for a common road segment (e.g., road segment 1200) based on navigation information received from vehicles 1205, 1210, 1215, 1220, and 1225. For example, in generating the autonomous vehicle road navigation model, processor 2020 may cluster vehicle trajectories along the common road segment 1200 into different clusters. Processor 2020 may determine a target trajectory along the common road segment 1200 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 1200.

The autonomous vehicle road navigation model may include a plurality of target trajectories each associated with a separate lane of the common road segment 1200. In some embodiments, the target trajectory may be associated with the common road segment 1200 instead of a single lane of the road segment 1200. The target trajectory may be represented by a three dimensional spline. In some embodiments, the spline may be defined by less than 10 kilobytes per kilometer, less than 20 kilobytes per kilometer, less than 100 kilobytes per kilometer, less than 1 megabyte per kilometer, or any other suitable storage size per kilometer. Model distributing module 2110 may then distribute the generated model to one or more vehicle, e.g., as discussed below with respect to FIG. 24.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 1230. Various vehicles travelling along the same road segment at multiple drives may have different trajectories. Server 1230 may identify routes or trajectories associated with each lane from the trajectories received from vehicles through a clustering process.

FIG. 22 illustrates a process of clustering vehicle trajectories associated with vehicles 1205, 1210, 1215, 1220, and 1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205, 1210, 1215, 1220, and 1225 traveling along road segment 1200 may transmit a plurality of trajectories 2200 to server 1230. In some embodiments, server 1230 may generate trajectories based on landmark, road geometry, and vehicle motion information received from vehicles 1205, 1210, 1215, 1220, and 1225. To generate the autonomous vehicle road navigation model, server 1230 may cluster vehicle trajectories 1600 into a plurality of clusters 2205, 2210, 2215, 2220, 2225, and 2230, as shown in FIG. 22.

Clustering may be performed using various criteria. In some embodiments, all drives in a cluster may be similar with respect to the absolute heading along the road segment 1200. The absolute heading may be obtained from GPS signals received by vehicles 1205, 1210, 1215, 1220, and 1225. In some embodiments, the absolute heading may be obtained using dead reckoning. Dead reckoning, as one of skill in the art would understand, may be used to determine the current position and hence heading of vehicles 1205, 1210, 1215, 1220, and 1225 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 2205, 2210, 2215, 2220, 2225, and 2230, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, . . . , Cn), server 1230 may find a rigid transformation that maps Ci to C0, where i=1, 2, . . . , n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205, 1210, 1215, 1220, and 1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an Extended Kalman Filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model and/or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 23:
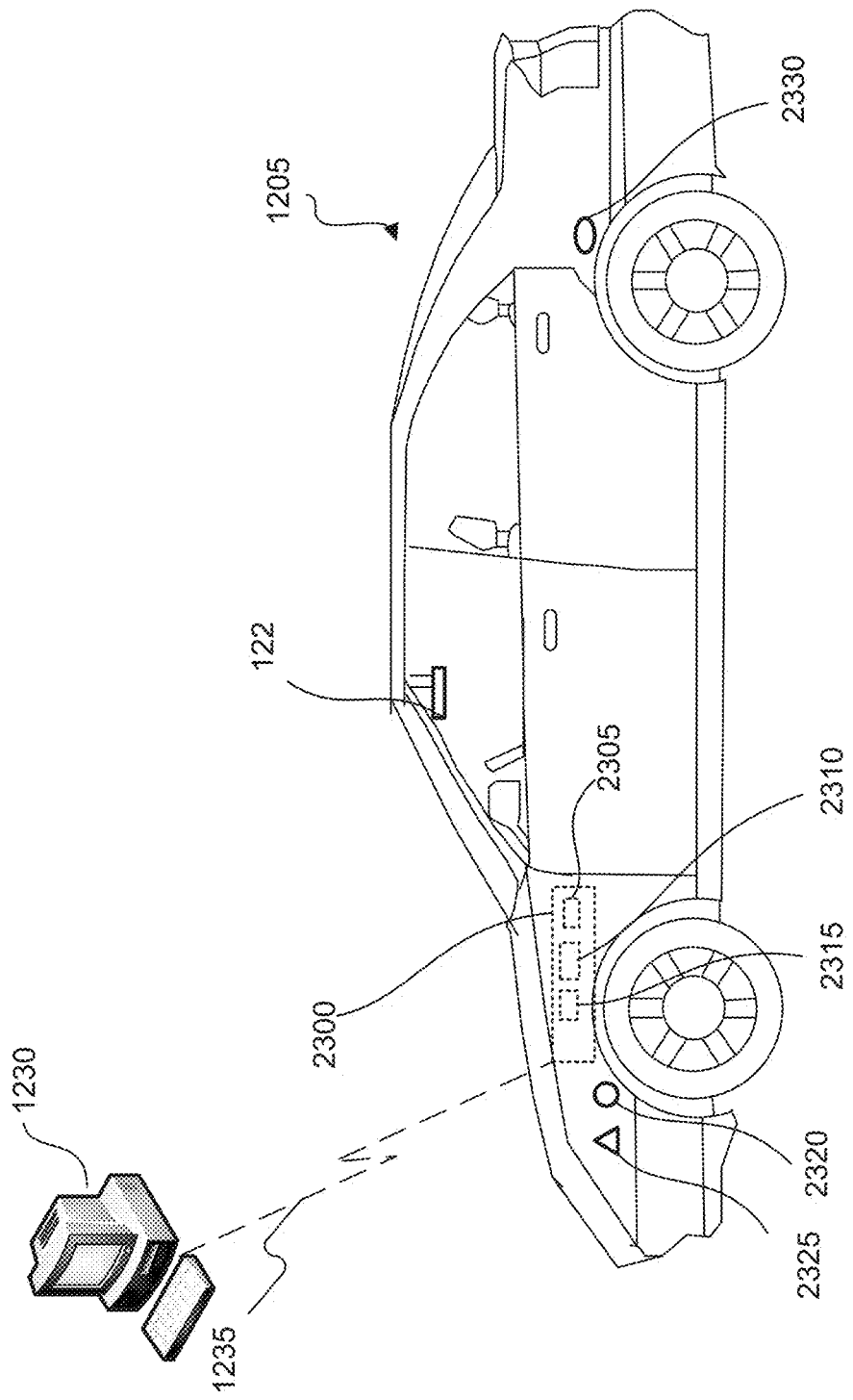
FIG. 23 illustrates a navigation system for a vehicle, which may be used for autonomous navigation, consistent with the disclosed embodiments.

FIG. 23 illustrates a navigation system for a vehicle, which may be used for autonomous navigation using a crowdsourced sparse map. For illustration, the vehicle is referenced as vehicle 1205. The vehicle shown in FIG. 23 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 2300 configured for providing navigation guidance for vehicle 1205 to travel on a road (e.g., road segment 1200). Vehicle 1205 may also include other sensors, such as a speed sensor 2320 and an accelerometer 2325. Speed sensor 2320 may be configured to detect the speed of vehicle 1205. Accelerometer 2325 may be configured to detect an acceleration or deceleration of vehicle 1205. Vehicle 1205 shown in FIG. 23 may be an autonomous vehicle, and the navigation system 2300 may be used for providing navigation guidance for autonomous driving. Alternatively, vehicle 1205 may also be a non-autonomous, human-controlled vehicle, and navigation system 2300 may still be used for providing navigation guidance.

Navigation system 2300 may include a communication unit 2305 configured to communicate with server 1230 through communication path 1235. Navigation system 2300 may also include a GPS unit 2310 configured to receive and process GPS signals. Navigation system 2300 may further include at least one processor 2315 configured to process data, such as GPS signals, map data from sparse map 800 (which may be stored on a storage device provided onboard vehicle 1205 and/or received from server 1230), road geometry sensed by a road profile sensor 2330, images captured by camera 122, and/or autonomous vehicle road navigation model received from server 1230. The road profile sensor 2330 may include different types of devices for measuring different types of road profile, such as road surface roughness, road width, road elevation, road curvature, etc. For example, the road profile sensor 2330 may include a device that measures the motion of a suspension of vehicle 2305 to derive the road roughness profile. In some embodiments, the road profile sensor 2330 may include radar sensors to measure the distance from vehicle 1205 to road sides (e.g., barrier on the road sides), thereby measuring the width of the road. In some embodiments, the road profile sensor 2330 may include a device configured for measuring the up and down elevation of the road. In some embodiment, the road profile sensor 2330 may include a device configured to measure the road curvature. For example, a camera (e.g., camera 122 or another camera) may be used to capture images of the road showing road curvatures. Vehicle 1205 may use such images to detect road curvatures.

The at least one processor 2315 may be programmed to receive, from camera 122, at least one environmental image associated with vehicle 1205. The at least one processor 2315 may analyze the at least one environmental image to determine navigation information related to the vehicle 1205. The navigation information may include a trajectory related to the travel of vehicle 1205 along road segment 1200. The at least one processor 2315 may determine the trajectory based on motions of camera 122 (and hence the vehicle), such as three dimensional translation and three dimensional rotational motions. In some embodiments, the at least one processor 2315 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 2315 may also be programmed to transmit the navigation information from vehicle 1205 to server 1230. In some embodiments, the navigation information may be transmitted to server 1230 along with road information. The road location information may include at least one of the GPS signal received by the GPS unit 2310, landmark information, road geometry, lane information, etc. The at least one processor 2315 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 2315 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 2315 may be configured to communicate with various sensors and components included in vehicle 1205, including communication unit 1705, GPS unit 2315, camera 122, speed sensor 2320, accelerometer 2325, and road profile sensor 2330. The at least one processor 2315 may collect information or data from various sensors and components, and transmit the information or data to server 1230 through communication unit 2305. Alternatively or additionally, various sensors or components of vehicle 1205 may also communicate with server 1230 and transmit data or information collected by the sensors or components to server 1230.

In some embodiments, vehicles 1205, 1210, 1215, 1220, and 1225 may communicate with each other, and may share navigation information with each other, such that at least one of the vehicles 1205, 1210, 1215, 1220, and 1225 may generate the autonomous vehicle road navigation model using crowdsourcing, e.g., based on information shared by other vehicles. In some embodiments, vehicles 1205, 1210, 1215, 1220, and 1225 may share navigation information with each other and each vehicle may update its own the autonomous vehicle road navigation model provided in the vehicle. In some embodiments, at least one of the vehicles 1205, 1210, 1215, 1220, and 1225 (e.g., vehicle 1205) may function as a hub vehicle. The at least one processor 2315 of the hub vehicle (e.g., vehicle 1205) may perform some or all of the functions performed by server 1230. For example, the at least one processor 2315 of the hub vehicle may communicate with other vehicles and receive navigation information from other vehicles. The at least one processor 2315 of the hub vehicle may generate the autonomous vehicle road navigation model or an update to the model based on the shared information received from other vehicles. The at least one processor 2315 of the hub vehicle may transmit the autonomous vehicle road navigation model or the update to the model to other vehicles for providing autonomous navigation guidance.

Figure 24:
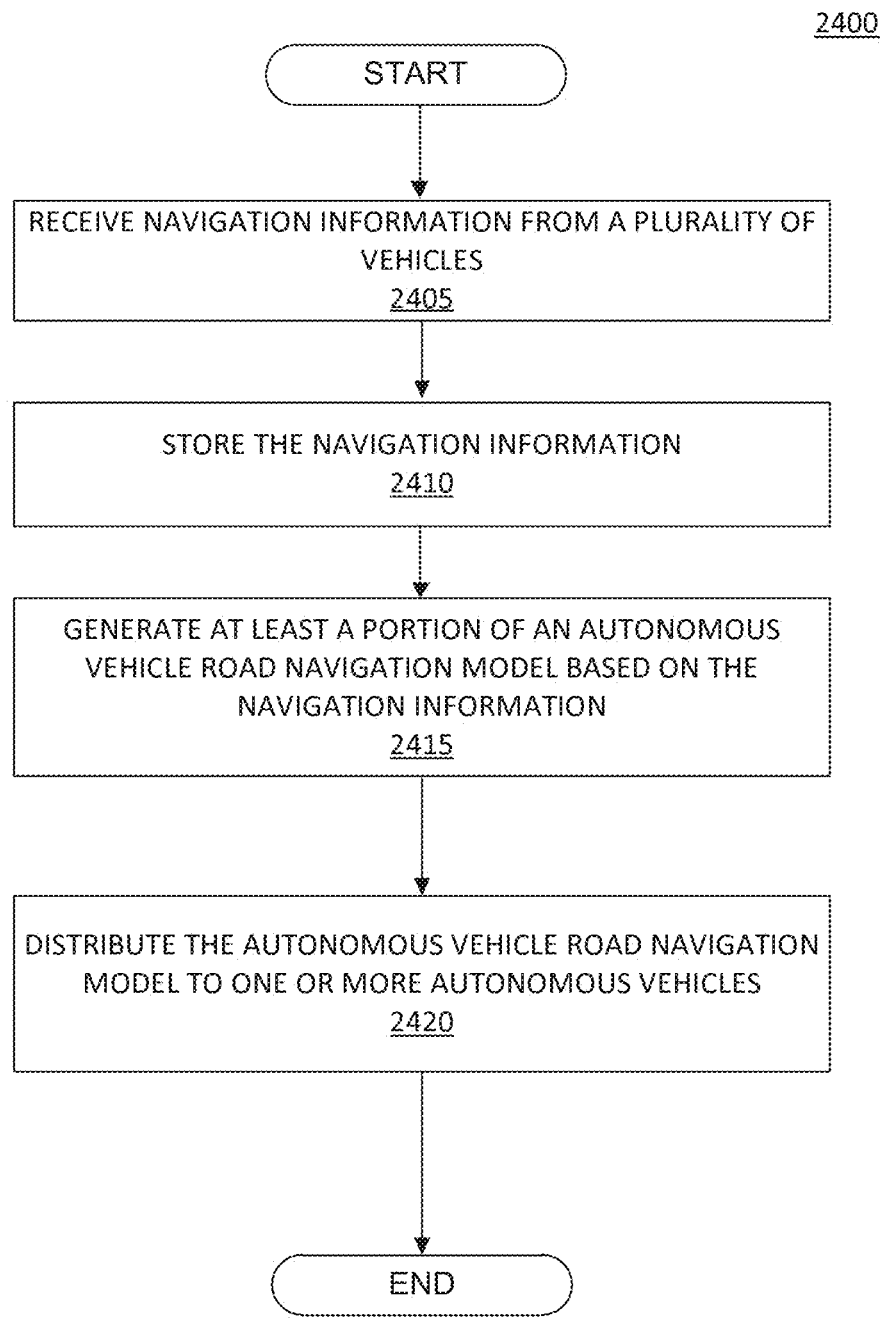
FIG. 24 is a flowchart showing an example process for generating a road navigation model for use in autonomous vehicle navigation, consistent with the disclosed embodiments.

FIG. 24 is a flowchart showing an exemplary process 2400 for generating a road navigation model for use in autonomous vehicle navigation. Process 2400 may be performed by server 1230 or processor 2315 included in a hub vehicle. In some embodiments, process 2400 may be used for aggregating vehicle navigation information to provide an autonomous vehicle road navigation model or to update the model.

Process 2400 may include receiving, by a server, navigation information from a plurality of vehicles (step 2405). For example, server 1230 may receive the navigation information from vehicles 1205, 1210, 1215, 1220, and 1225. The navigation information from the plurality of vehicles may be associated with a common road segment (e.g., road segment 1200) along which the plurality of vehicles, e.g., 1205, 1210, 1215, 1220, and 1225, travel.

Process 2400 may further include storing, by the server, the navigation information associated with the common road segment (step 2410). For example, server 1230 may store the navigation information in storage device 2010 and/or memory 2015.

Process 2400 may further include generating, by the server, at least a portion of an autonomous vehicle road navigation model for the common road segment based on the navigation information from the plurality of vehicles (step 2415). The autonomous vehicle road navigation model for the common road segment may include at least one line representation of a road surface feature extending along the common road segment, and each line representation may represent a path along the common road segment substantially corresponding with the road surface feature. For example, the road surface feature may include a road edge or a lane marking. Moreover, the road surface feature may be identified through image analysis of a plurality of images acquired as the plurality of vehicles traverse the common road segment. For example, server 1230 may generate at least a portion of the autonomous vehicle road navigation model for common road segment 1200 based on the navigation information received from vehicles 1205, 1210, 1215, 1220, and 1225 that travel on the common road segment 1200.

In some embodiments, the autonomous vehicle road navigation model may be configured to be superimposed over a map, an image, or a satellite image. For example, the model may be superimposed over a map or image provided by a conventional navigation service such as Google® Maps, Waze, or the like.

In some embodiments, generating at least a portion of the autonomous vehicle road navigation model may include identifying, based on image analysis of the plurality of images, a plurality of landmarks associated with the common road segment. In certain aspects, this analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold. For example, if a potential landmark appears in data from vehicle 1210 but not in data from vehicles 1205, 1215, 1220, and 1225, the system may determine that a ratio of 1:5 is below the threshold for accepting the potential landmark. By way of further example, if a potential landmark appears in data from vehicles 1205, 1215, 1220, and 1225 but not in data from vehicle 1210, the system may determine that a ratio of 4:5 is above the threshold for accepting the potential landmark.

Process 2400 may further include distributing, by the server, the autonomous vehicle road navigation model to one or more autonomous vehicles for use in autonomously navigating the one or more autonomous vehicles along the common road segment (step 2420). For example, server 1230 may distribute the autonomous vehicle road navigation model or a portion (e.g., an update) of the model to vehicles 1205, 1210, 1215, 1220, and 1225, or any other vehicles later travel on road segment 1200 for use in autonomously navigating the vehicles along road segment 1200.

Process 2400 may include additional operations or steps. For example, generating the autonomous vehicle road navigation model may include clustering vehicle trajectories received from vehicles 1205, 1210, 1215, 1220, and 1225 along road segment 1200 into a plurality of clusters and/or aligning data received from vehicles 1205, 1210, 1215, 1220, and 1225, as discussed in further detail below with respect to FIG. 29. Process 2400 may include determining a target trajectory along common road segment 1200 by averaging the clustered vehicle trajectories in each cluster. Process 2400 may also include associating the target trajectory with a single lane of common road segment 1200. Process 2400 may include determining a three dimensional spline to represent the target trajectory in the autonomous vehicle road navigation model.

Using Crowdsourced Sparse Maps for Navigation

As discussed above, server 1230 may distribute a generated road navigation model to one or more vehicles. The road navigation model may be included in a sparse map, as described in detail above. Consistent with embodiments of the present disclosure, one or more vehicles may be configured to use the distributed sparse map for autonomous navigation.

Figure 25:
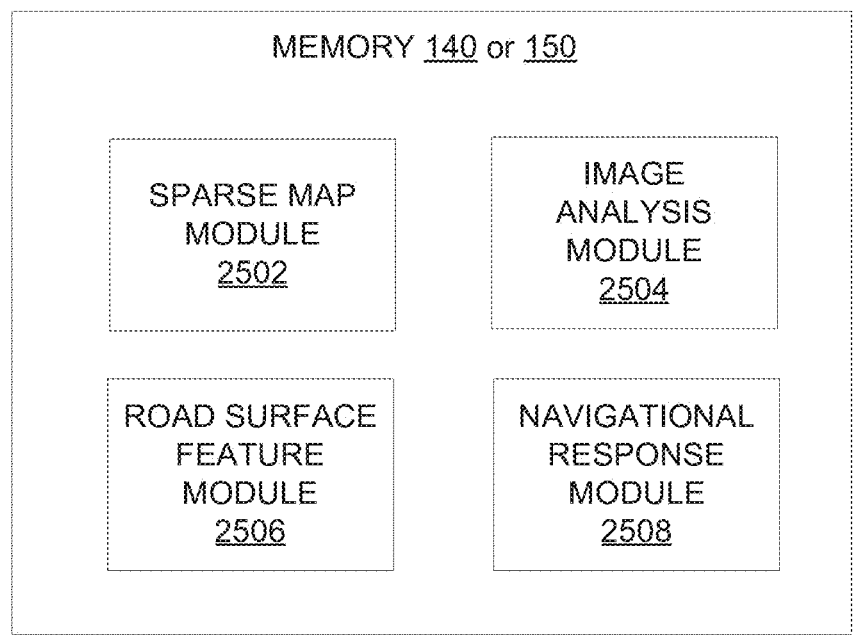
FIG. 25 illustrates a block diagram of a memory consistent with the disclosed embodiments.

FIG. 25 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 25, memory 140 may store a sparse map module 2502, an image analysis module 2504, a road surface feature module 2506, and a navigational response module 2508. The disclosed embodiments are not limited to any particular configuration of memory 140. Further, applications processor 180 and/or image processor 190 may execute the instructions stored in any of modules 2502, 2504, 2506, and 2508 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, sparse map module 2502 may store instructions which, when executed by processing unit 110, receive (and, in some embodiments, store) a sparse map distributed by server 1230. Sparse map module 2502 may receive an entire sparse map in one communication or may receive a sub-portion of a sparse map, the sub-portion corresponding to an area in which the vehicle is operating.

In one embodiment, image analysis module 2504 may store instructions (such as computer vision software) which, when executed by processing unit 110, performs analysis of one or more images acquired by one of image capture devices 122, 124, and 126. As described in further detail below, image analysis module 2504 may analyze the one or more images to determine a current position of the vehicle.

In one embodiment, road surface feature module 2506 may store instructions which, when executed by processing unit 110, identifies a road surface feature in the sparse map received by sparse map module 2502 and/or in the one or more images acquired by one of image capture devices 122, 124, and 126.

In one embodiment, navigational response module 2508 may store software executable by processing unit 110 to determine a desired navigational response based on data derived from execution of sparse map module 2502, image analysis module 2504, and/or road surface feature module 2506.

Figure 26:
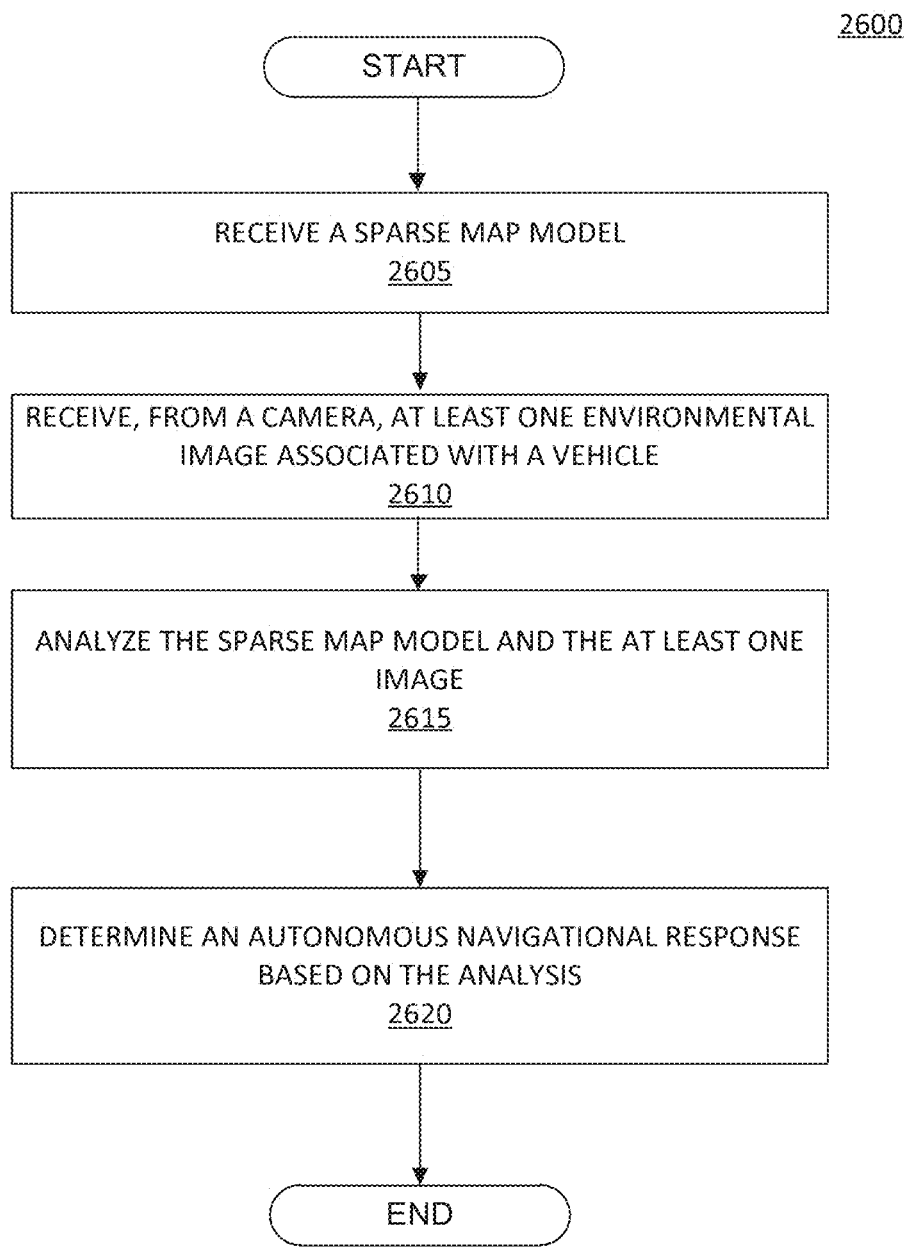
FIG. 26 is a flowchart showing an example process for autonomously navigating a vehicle along a road segment, consistent with the disclosed embodiments.

Furthermore, any of the modules (e.g., modules 2502, 2504, and 2506) disclosed herein may implement techniques associated with a trained system (such as a neural network or a deep neural network) or an untrained system FIG. 26 is a flowchart showing an exemplary process 2600 for autonomously navigating a vehicle along a road segment. Process 2600 may be performed by processor 2315 included in navigation system 2300.

Process 2600 may include receiving a sparse map model (step 2605). For example, processor 2315 may receive the sparse map from server 1230. In some embodiments, the sparse map model may include at least one line representation of a road surface feature extending along the road segment, and each line representation may represent a path along the road segment substantially corresponding with the road surface feature. For example, the road feature may include a road edge or a lane marking.

Process 2600 may further include receiving, from a camera, at least one image representative of an environment of the vehicle (step 2610). For example, processor 2315 may receive, from camera 122, the at least one image. Camera 122 may capture one or more images of the environment surrounding vehicle 1205 as vehicle 1205 travels along road segment 1200.

Process 2600 may also include analyzing the sparse map model and the at least one image received from the camera (step 2615). For example, analysis of the sparse map model and the at least one image received from the camera may include determining a current position of the vehicle relative to a longitudinal position along the at least one line representation of a road surface feature extending along the road segment. In some embodiments, this determination may be based on identification of at least one recognized landmark in the at least one image. In some embodiments, process 2600 may further include determining an estimated offset based on an expected position of the vehicle relative to the longitudinal position and the current position of the vehicle relative to the longitudinal position.

Process 2600 may further include determining an autonomous navigational response for the vehicle based on the analysis of the sparse map model and the at least one image received from the camera (step 2620). In embodiments in which processor 2315 determines an estimated offset, the autonomous navigational response may be further based on the estimated offset. For example, if processor 2315 determines that the vehicle is offset from the at least one line representation by 1 m to the left, processor 2315 may cause the vehicle to shift towards the right (e.g., by changing an orientation of the wheels). By way of further example, if processor 2315 determines that an identified landmark is offset from an expect position, processor 2315 may cause the vehicle to shift so as to move the identified landmark towards its expected position. Accordingly, in some embodiments, process 2600 may further include adjusting a steering system of the vehicle based on the autonomous navigational response.

Navigation on a Road Segment with Presence of a Road Covering Material

As illustrated in the previous section in relation to FIGS. 5A-7, one or more navigational responses may be taken based on an analysis of one or more sets of images. The sections that follow discuss autonomous driving along with systems and methods for navigating an autonomous vehicle, in the presence of a covering material (e.g., snow, ice, mud, water, leaves, sand, gravel, etc.) on a road segment. In the context of this disclosure, a road covering material of a road segment may refer to any material other than the road segment coating material (material composing the surface of the road by construction), that partially or fully covers a road segment. In other words, the covering material, when present, covers the road surfacing material, at least in part. When such material is present, tire friction coefficient values may decrease from the standard values measured on asphalt, concrete, or other surfacing materials. A lower coefficient of friction may result in a longer stopping distance or in wheels sliding instead of rolling (kinetic friction), situations in which the potential risk of an accident increases. In some situations, the presence of a covering material may be the result of weather-related events such as, for example, rainfall, snowfall, wind, or low temperature.

In some circumstances, detecting the presence of a covering material on a road segment may not be sufficient to take appropriate navigational action, and it may be desirable to determine characteristics of the covering material. Examples of characteristics may include a thickness profile, the nature of the covering material, consistency of the covering material, friction coefficient of the covering material, traction level associated with the covering material or any other measurable physical quantity related to the road covering material.

Figure 27:
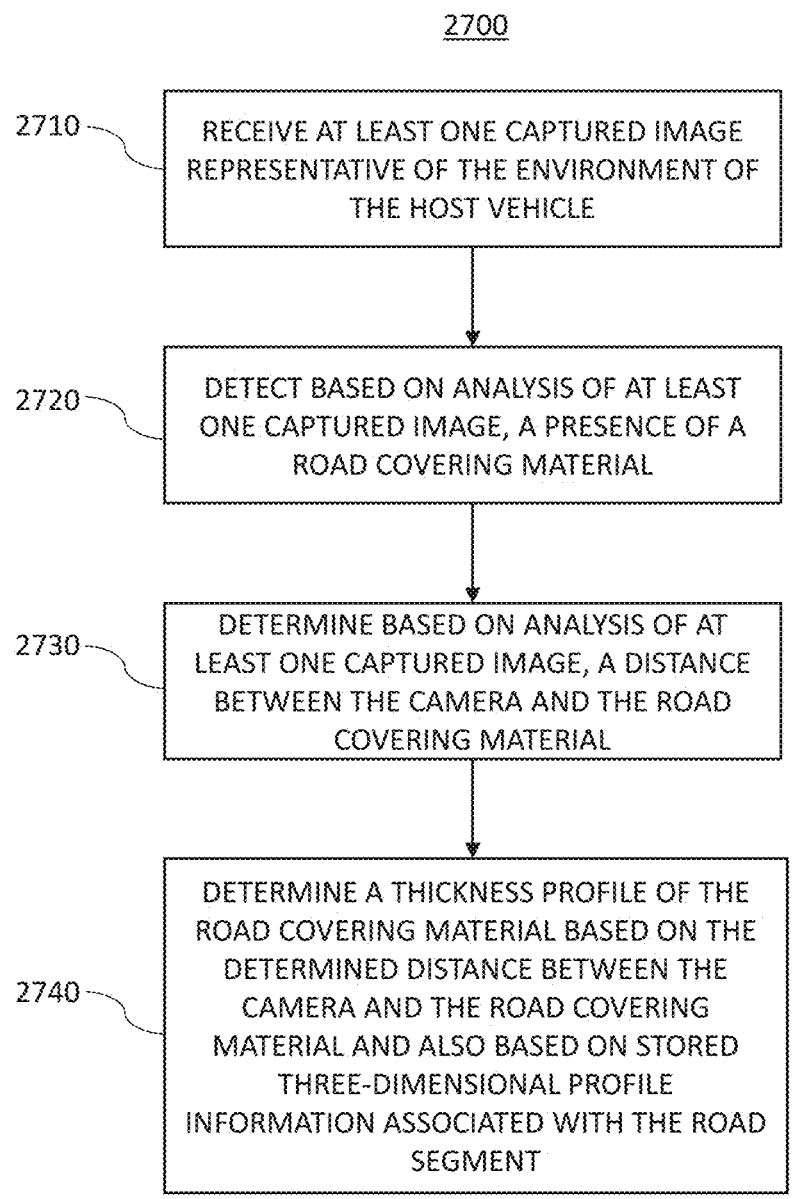
FIG. 27 is a flowchart showing an exemplary process for determining a thickness profile of a road covering material, consistent with disclosed embodiments.

FIG. 27 is a flowchart showing an exemplary process 2700 for determining a thickness profile of a road covering material. In accordance with the disclosed embodiments, such a process may be executed by a system embarked in a host vehicle such as system 100 comprising a processing unit such as processing unit 110. At step 2710, processing unit 110 may receive from a camera onboard the host vehicle at least one captured image representative of an environment of the host vehicle. For instance, a camera included in image acquisition unit 120 (such as image capture device 122, 124 or 126 having, respectively, fields of view 202, 204 and 206) may capture at least one image of an area forward of vehicle 200 (or to the sides or rear of a vehicle, for example) and transmit them over a data connection (e.g., digital, wired, USB, wireless, Bluetooth, etc.) to processing unit 110 via data interface 128. In some embodiments, processing unit 110 may receive a plurality of captured image from one or more cameras on board the host vehicle. For example, image capture devices 122, 124 and 126 having, respectively, fields of view 202, 204 and 206, comprised in image acquisition unit 120, may all send images representative of the environment of the host vehicle. In such a situation, the processing unit 110 may analyze the data contained in the plurality of captured images, may perform stereo image analysis (e.g., via execution of stereo image analysis module 404 and based on the steps described in connection with FIG. 6, above), or may perform a combination of monocular and stereo image analyses.

At step 2720, processing unit 110 may detect, based on analysis of the at least one captured image, a presence of a road covering material on a road segment. The analysis may be performed in a manner similar to the steps described in connection with FIG. 5A-F above. For instance, processing unit 110 may perform monocular image analysis (e.g., via execution of monocular image analysis module 402) to detect a set of features within the at least one image. Module 402 may implement techniques associated with a trained system (such as a neural network or a deep neural network) or an untrained system (e.g., a deterministic computer vision algorithm), to detect the presence of a road covering material based on one or more detected features. Examples of features indicative of the presence of a road covering material may include a color, a texture, a reflection, or any other features related to the presence of a road covering material.

Further, in some embodiments, the detection of a presence of road covering material on a road segment based on analysis of the at least one captured image may be supplemented by measurements from at least one sensor on board the host vehicle. Examples of such sensor may include a RADAR or a LIDAR system. Such systems may provide outputs based on which range information to certain points (e.g., to a point on an edge of surface water) may be determined. It should be appreciated that the analysis of the at least one captured image, supplemented by the analysis of RADAR and LIDAR reflections, may enable the detection of different road covering materials or substances featuring unique behaviors, notably by cross-correlating the results of these different types of sensors.

At step 2730, processing unit 110 may determine, based on analysis of the at least one captured image, a distance between the camera onboard the host vehicle and the road covering material. Determining the distance or size of an object in an image may be performed using various techniques. Example techniques may include camera calibration using a reference object, stereo vision or any other method resulting in the determination of a distance inside an image. Other techniques may include structure in motion determinations based on multiple images, or may include the use of one or more trained networks configured to output a distance (e.g., camera height) based on a received image.

At step 2740, processing unit 110 may determine a thickness profile of the road covering material based on the determined distance between the camera onboard the host vehicle and the road covering material, and also based on stored three-dimensional profile information associated with the road segment surface. In the context of this disclosure, a thickness profile may refer to a two or three-dimensional representation of the road covering material on the road segment. Such a thickness profile may include information such as, for example, a maximum thickness and/or local maximums associated with a thickness of the road covering material. The thickness profile may be provided as a set of points in 3D space or as a polynomial representing the profile. The set of points may be provided in the reference frame of an AV map (such as REM) used by the host vehicle or in the local reference frame of the environmental model used by the host vehicle, such as the environmental model used by the driving policy function implemented by the AV/ADAS system onboard the host vehicle.

In some embodiments, processing unit 110 may be capable of extracting a plurality of two-dimensional thickness profiles by cutting the three-dimensional representation along a plurality of corresponding predetermined directions. Additionally, in some embodiments processing unit 110 may identify different patterns in the thickness profile. For example, the processing unit 110 may identify the presence of tire tracks in the road covering material, as the thickness of the road covering material at the tire tracks is less than the thickness of the surrounding areas.

Figure 28:
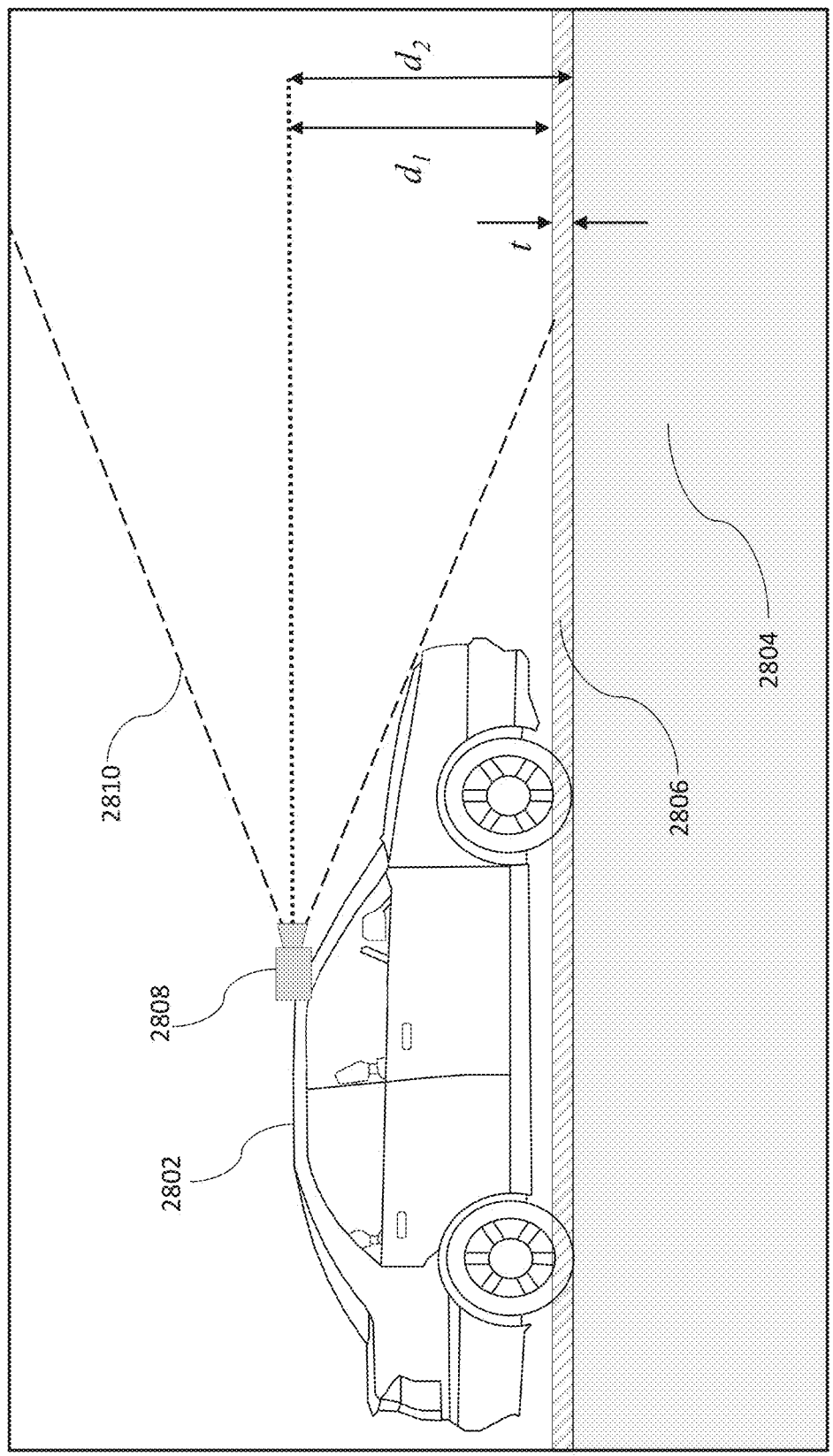
FIG. 28 is a cross-sectional illustration of an exemplary road segment with the presence of a road surfacing material, consistent with the disclosed embodiments.

FIG. 28 is a cross-sectional illustration of an exemplary road segment with the presence of a road covering material, in accordance with the disclosed embodiments. As illustrated, a vehicle 2802 travels on a road segment 2804 with the presence of a road covering material 2806. Vehicle 2802 may host system 100. A camera 2808 present in the vehicle 2802 with a field of view 2810 may capture at least one image, and based on analysis of the at least one captured image, a processing unit, such as processing unit 110, may detect the presence of the road covering material 2806. In accordance with the disclosed embodiments, a distance d1 between camera 2808 and road covering material 2806 may be determined. Additionally, a thickness profile of road covering material 2806 may be determined, based on the determined distance between camera 2808 and road covering material 2806, and also based on stored three-dimensional profile information associated with the road segment surface 2804. The thickness profile, for example, may represent a thickness, t, of the road covering material 2806 over a distance range associated with road segment 2804.

Although FIG. 28 illustrates a road covering material 2806 having a homogeneous thickness profile with a constant thickness t, a thickness profile may be inhomogeneous, i.e., with the presence of local thickness extrema. Accordingly in some embodiments, processing unit 110 may determine multiple distances between the camera and the road covering material at different portions of the road segment. Further, use of a single camera 2808 is only one example, and vehicle 2802 may include one or more cameras, each of which may be located at different positions from that shown in FIG. 28, for example, cameras 122, 124, and 126 as shown in FIGS. 2B-2E, and may be used to determine distances between the respective camera and, for example, the road covering material.

In some embodiments, the road covering material may include at least one of snow, ice, mud, water, leaves, or sand. For example, road covering material 2806 shown in FIG. 28 may correspond to a layer of snow (e.g., a homogeneous layer) present on road segment 2804 following a snowfall. In some embodiments, the at least one processor may be further programmed to identify the road covering material based on analysis of the at least one captured image. Recognition of a type of road covering material may be performed in a manner similar to the steps described in connection with FIG. 5 above. For instance, processing unit 110 may perform monocular image analysis (e.g., via execution of monocular image analysis module 402) to detect a set of characteristic features within the at least one image. Module 402 may implement techniques associated with a trained system (such as a neural network or a deep neural network) or an untrained system, to identify the road covering material based on characteristic features detected. Examples of characteristic features for a road covering material may include a color, a texture, a shape, or any other characteristics useful to identify the road covering material. For example, where the road is asphalt and generally of a black color, a white colored covering material may be indicating the presence of snow while a brown to dark brown color, especially in the presence of surface features not consistent with asphalt, may include a road covering of mud is present.

Further, in some embodiments, the road covering material may include a plurality of different road covering materials and the at least one processor may identify each of the different road covering materials based on the analysis of the at least one captured image. For example, a road segment may be covered by both water and mud, or by snow and ice, and the at least one processor may be configured to recognize the different types of road covering material and their respective coverage zone on the road segment.

Additionally, in some embodiments the at least one processor may determine a thickness profile of each of the different road covering materials based on, for example, determined distances between the camera onboard the host vehicle and each of the different road covering materials and also based on stored three-dimensional profile information associated with the road segment surface. For example, in a situation where a road segment is covered with both water (e.g., in the form of puddles) and mud, processing unit 110 may determine a thickness profile for the water and mud layers.

In some embodiments, the identification of the road covering material on a road segment based on analysis of the at least one captured image may be supplemented by measurements from at least one sensor on board the host vehicle. For example, different road covering materials have different physical properties (e.g., reflectivity) in the electromagnetic spectrum. Measurements from various sensors such as lidar, radar, thermal camera and/or ultrasonic sensors can help to distinguish between different types of road covering materials. Some sensors may provide measurements that indicate a certain probability of the presence of a given type of road covering material. For example, a temperature sensor may indicate that the outside and/or ground temperature is below 0° C., in such a situation the probability of finding an ice patch on a road segment is increased. In another example, GPS data may indicate that the vehicle is on a road segment extending through a forest, so the probability of finding leaves on the road may be higher than in an urban area.

In some embodiments, the stored three-dimensional profile information may indicate an expected distance between the camera onboard the host vehicle and the road surface without any road covering material. For example, as illustrated in FIG. 28, the stored three-dimensional profile information may include the distance d2 between camera 2808 and road segment 2804 without any road-covering material. In this situation, determination of the thickness t of covering 2806 at any given point along the road segment (thickness profile) may be determined by subtracting the distance d1 from the distance d2. In other situations, the stored three-dimensional profile information includes one or more three-dimensional splines representative of locations in space of road features (e.g., lane markings, road edges, etc.). The spline(s) may define a three-dimensional profile of a road surface, which can be used in combination with a determined camera height, d1, to determine a depth profile of a road covering material 2806, In some embodiments, the stored three-dimensional profile information may be located in a memory associated with a processing unit. For example, the three-dimensional profile may be located in memory 140 or in memory 150 illustrated in FIG. 1 or in a memory included in the processing unit 110. In other embodiments, the stored three-dimensional profile information may be remotely located relative to the host vehicle. For example, the three-dimensional profile may be stored in an external server such as server 1230, and a wireless transceiver 172 may be used to communicate with the external server and collect information relative to the three-dimensional profile information.

Additionally, in some further embodiments, a stored three-dimensional profile information may include a three-dimensional spline. For example, a three-dimensional spline as illustrated in FIG. 13, may refer to any type of curve in a three-dimensional space. Examples of three-dimensional splines may include a Bezier curve, a cubic curve, a Bezier surface, or a non-uniform mesh.

In some embodiments, process 2700 may further comprise a step of causing the host vehicle to take at least one navigational action based on a determined thickness profile for a road covering material. For instance, processing unit 110 may execute navigational response module 408 to cause one or more navigational responses in vehicle 200 based on the thickness profile determined in step 2740 and the techniques described above in connection with FIG. 4.

In some embodiments, the at least one navigational action may include braking of the host vehicle. For example, according to the thickness profile determined in step 2740, navigational response module 408 may transmit electronic signals to braking system 230, in order to reduce the speed of the host vehicle. Since the coefficient of friction value of the tires relative to the contact surface may decrease in the presence of road covering material and the braking distance may increase, reducing the vehicle speed may reduce the risk of potential accidents. For example, for a relatively shallow puddle, reducing speed before driving through the puddle may be sufficient to avoid hydroplaning or fishtailing (drifting of the rear of the vehicle from side to side) as the tires adhere less to the road surface at high speeds. In other cases, a vehicle may be caused to brake to a full stop where a depth of water, for example, is determined to exceed a level consistent with safe navigation. In some embodiments, the host vehicle may detect the reaction of the vehicle to various patches of different materials of varying thicknesses and may adapt future reactions to similar materials of similar thicknesses accordingly.

Further in some embodiments, the at least one processor may be further programmed to adapt a braking level in accordance with the road covering material. Tires rely on a constant average speed to effectively adapt to the terrain and maintain traction on a slippery section of road surface (i.e., a section of road surface having a reduced frictional coefficient value relative to the tires). For example, excessive braking when tires of the vehicle are moving on a patch of ice may cause the vehicle to skid and increase the risk of a potential accident. In such a situation, it may be safer for the vehicle to continue traveling at the current speed and monitor possible rear-end drift, or even applying a reduced braking force.

In some embodiments, the at least one navigational action may include changing gears of the host vehicle. For example, while traveling on a segment of road covered with a road covering material, navigation response module 408 may transmit electronic signals to a gear system to change gears. For example, when moving through mud, high gears may not be effective, and the wheels may need to work harder, so a low gear (e.g., second or third) may be more suitable. Although the terminology "gears" is traditionally reserved for ICE-powered vehicles, it should be understood that in the context of the present disclosure, gear shifting may refer more broadly to any modification in the way in which an engine's or motor's power is applied to the vehicle's wheels (or other vehicle drive component). For example, for EVs, gear shifting may include switching of a powertrain activation mode (e.g., forward, reverse, sport, eco, off-road mode, snow-winter mode, etc.). Further, as noted above, driving at high speed over a road covering material may lead to control issues, and processing unit 110 may issue a navigation action corresponding to a speed reduction. In such a situation, the reduction in vehicle speed may be achieved by shifting to a lower gear in combination or independently of applying a braking force. For example, if the vehicle is driven in heavy rain, braking before reaching a puddle may be as dangerous as driving at high speed through the puddle, as braking on a wet surface may cause the vehicle to lose traction with the road surface. In such a situation, a more appropriate action might be use of engine braking or coasting to reduce vehicle speed and prevent the vehicle from losing traction. Thus, is such a system, the navigational response module 408 may transmit electronic signals to the throttling system 220 to reduce the current throttling level of the vehicle.

In some embodiments, the at least one navigational action may include altering a trajectory of the host vehicle. For example, if the determined thickness profile of the road covering material indicates that the road covering material only partially covers a surface of the road segment, the navigation response module can transmit an electronic signal to the steering systems 240 to initiate a lane change or shift and avoid driving on the covering material. For example, a vehicle can avoid driving on icy patches by driving around them. Note that in this situation, the navigation response module checks and confirms that there are no other vehicles, pedestrians or other road objects in the path of the vehicle during the trajectory change and that sufficient road surface exists to allow for the change. If the road covering material extends over all available paths, the processing unit may analyze the thickness profile and determine a path where the thickness is minimal or is determined to be within safe operating limits. For example, if a puddle extends across the width of the road segment, processing unit 110 may determine a path where the thickness of the puddle is minimal, thereby limiting the risk of hydroplaning.

In some embodiments, the at least one processor may identify a presence of tire tracks in the road covering material and may alter the trajectory of the vehicle to follow (e.g., by causing the wheels of the vehicle to stay within the tire tracks) or avoid the tire tracks (e.g., by causing the wheels of the vehicle to stay outside of the tire tracks). For example, in the case of a snow-covered road, following tire tracks can be safer and limit the risk of traction loss since other vehicles that have already traversed the road segment may have compacted or even removed some or all of the snow. On the other hand, in the case of a muddy road, following tire tracks or, more precisely, ruts may be undesirable, because the deeper the rut, for example, the greater the risk of getting stuck, especially if the depth of the rut is greater than the ground clearance of the vehicle. Further, in some embodiments, the road covering material may include a plurality of different road covering materials and the at least one navigational action may include altering a trajectory of the host vehicle to avoid one of the road covering materials. For example, in the case of an icy, snow-covered road, the host vehicle may avoid icy patches (associated with a higher risk of skidding) and opt to drive on the snow-covered portions of the road.

In some embodiments, the at least one navigational action may include re-routing the host vehicle. For example, if a large muddy or icy area that poses a high potential risk to the integrity of the vehicle or the safety of its passengers is detected along the vehicle's path, but before reaching the area, a junction offers the possibility of an alternative route, the navigation response module may transmit an electronic signal to the steering system 240 to redirect the vehicle to the alternative route. In another example, if no junction is present prior to reaching the zone, the navigation response module may transmit an electronic signal to the steering system 240 to make a U-turn and find an alternative route avoiding the road segment including the potentially problematic zone. In these situations, processing unit 100 may collaboratively use, for example, a GPS module, a position sensor 130, crowdsourced road covering condition information as discussed below, etc. to find alternative routes that avoid higher risk road segments.

In some embodiments, the at least one navigational action may include stopping the host vehicle. For example, if the vehicle is traveling on a single lane road where a covering material has been identified as sand and a large sand dune with an excessive thickness profile (e.g., a sand dune where the risk of the vehicle getting stuck in the sand is not negligible) blocks the road, the navigation response module can transmit an electronic signal to the braking system 230 to stop the vehicle. In some other embodiments, the at least one navigational action includes exiting an automated driving mode for the host vehicle and giving control to at least one passenger of the host vehicle.

In some embodiments, the at least one navigational action may include a combination of different navigational actions, such as those described above. For example, the navigation response module may transmit an electronic signal to braking system 230 and steering system 240, to reduce the speed of the vehicle before changing lanes or altering the trajectory of the vehicle. In another example, the processing unit 110 may cause a reduction in the current acceleration level of the vehicle, before applying the braking system and stopping the vehicle. In yet another example, control of the vehicle can be returned to at least one passenger after the vehicle is stopped. Further, in some other embodiments, the at least one navigational action may differ based on a position of a maximum thickness value of the determined thickness profile relative to one or more predetermined thickness thresholds. For example, in the case of a road segment covered with snow, if a maximum thickness value is below a first predetermined threshold (e.g. 1 or 2 centimeters), the navigational action caused by processor 110 may correspond to braking and reducing the speed of the vehicle. If a maximum thickness value is above a second predetermined threshold (e.g. 20 or 30 centimeters), the navigational action caused by processor 110 may correspond to stopping the vehicle.

In some embodiments, process 2700 may further comprise a step of causing at least one communication action based on the determined thickness profile of the road covering material. A communication action may refer to any type of information (e.g., a message) issued by the system to any user or entity. In some embodiments, the at least one communication action may include issuing an audible or visual warning message to a passenger of the host vehicle. For example, processing unit 110 may communicate with the user interface 170, and may cause a written message to be displayed on the touch screen 320, or an audio message to be transmitted to the speakers 360, or a combination thereof.

In some embodiments, the at least one communication action may include issuing an alert to a road maintenance authority. For example, the processing unit 110 may communicate with the wireless transceiver 172 to cause a message to be sent to the local road maintenance authority assigned to the road segment on which the vehicle is traveling. According to some embodiments, contact details (e.g., email address, IP address, telephone number, etc.) related to a local road maintenance authority may be stored in the memory for each road segment within the map. The message may take the form of an alert and may include the location (e.g., within a determinable standard, e.g., 5 meters, using available localization equipment) of the road segment covered by the road covering material, the determined thickness profile, and possibly an image of road segment, and/or the type of road covering material. For instance, if a road segment is covered with ice, a message can be sent to the local maintenance authority who may then take appropriate action, such as organizing an alternate route, posting warning signs, or treating the road segment to eliminate the ice.

In some embodiments, the at least one communication action may include uploading determined thickness profile information to a remotely located server. Thickness profile information may include the exact location the road segment with the road covering material, an image of the road segment, the type of road covering material, or any combination thereof. For example, processing unit 110 may communicate with wireless transceiver 172 and upload the thickness profile information to a remotely located server such as server 1230. Additionally, in some embodiments, the remotely located server may be configured to aggregate uploaded thickness profile information received from a first plurality of vehicles and distribute the aggregated information to a second plurality of vehicles, which may be referred to as "crowdsourced data," and is also discussed in greater detail below. For example, a first plurality of vehicles may travel along different road segments, where a road covering material is present, or along the same road segment where a road covering material is present, each vehicle of the first plurality may determine a thickness profile and send corresponding information to the remotely located server. At this point, the remotely located server can aggregate, compile, and cross-reference the various information and distribute this aggregated information to the second plurality of vehicles. In some embodiments, the first plurality of vehicles may be identical to the second plurality of vehicles (e.g., the same group of vehicles that collects the drive information also receive aggregated information from the server). In other cases, the first plurality of vehicles may overlap with the second plurality of vehicles or may be completely distinct from the second plurality of vehicles. For example, the aggregated information can be distributed to vehicles that will encounter a road covering material, i.e., where the road segments with the road covering material are included in their presently navigated routes.

In some embodiments, the at least one communication action may include a combination of different communication actions, such as those described above. For example, upon encountering a road covering material on a road segment and determining its thickness profile, a processing unit may issue a message to a vehicle passenger via the user interface 172, issue an alert to the local road maintenance authority, and upload the thickness profile to a remotely located server. Additionally, in some embodiments, the at least one communication action may differ based on a position of a maximum thickness value of the determined thickness profile relative to one or more predetermined thickness thresholds. For example, if a maximum thickness value is below a first predetermined threshold (e.g. 1 or 2 centimeters), the communication action caused by processor 110 may correspond to issuing an audible or visual warning message to a passenger of the host vehicle. If a maximum thickness value is above a second predetermined threshold (e.g. 20 or 30 centimeters), i.e., a situation in which travel along the road segment is unsafe, or in which the road segment is impassable, the communication action caused by the processor 110 may correspond to alerting a road maintenance authority associated with the road segment.

Although the foregoing paragraphs describe embodiments in which the presence of road cover material is due to weather conditions, it will be understood by those skilled in the art that any of the systems and methods described herein may be applied to covering material that is not weather related, such as an oil puddle caused by a vehicle leak.

Navigation Action on Detection of Accumulated Water on a Road Segment.

The sections that follow discuss autonomous driving with systems and methods for navigating an autonomous vehicle, in the presence of accumulated water on a road segment. In this situation, hydroplaning should be avoided to ensure a safe and comfortable navigation experience for the autonomous vehicle passenger. Hydroplaning occurs when a vehicle's tires encounter a layer of water and cannot properly adhere to the road surface due to buildup of the water between the tire and the road surface. In addition to the potential risk to vehicle occupants, damage to the vehicle may also occur if in the presence of deeper water. For example, water of sufficient depth may enter the intake and/or exhaust system, the engine may stall, the engine may be drowned, a component of the engine system may leak, or the vehicle may become trapped in water and drift away. In the context of this disclosure, accumulated water may refer to any type of area in the environment of an autonomous vehicle where water gathers and remains for a longer period of time than desirable (e.g., greater than a period of time required to traverse the accumulated water). Examples of accumulated water may include a puddle on a road surface, a pothole filled with water, a local depression on the road surface filled with water, an overflowing culvert, an overflowing stream on the road surface, an overflowing manhole cover or any other area that may cause localized water accumulation. In some situations, the accumulated water may be the result of, for example, heavy rainfall, in other situations, the accumulated water may not be the result of weather-related events, e.g., a broken pipe near a road that may flood the road. Simply detecting the presence of accumulated water on a road segment may not be sufficient to take appropriate navigational action. It may be desirable to determine some of the characteristics of this accumulated water to assist a host vehicle navigation system, for example, in determining how to navigate relative to the accumulated water. Examples of characteristics of interest may include a water depth profile, an extent of an area or region covered by accumulated water, fill/drain rate, flow rate, or any other measurable physical quantity related to the accumulated water.

Figure 29:
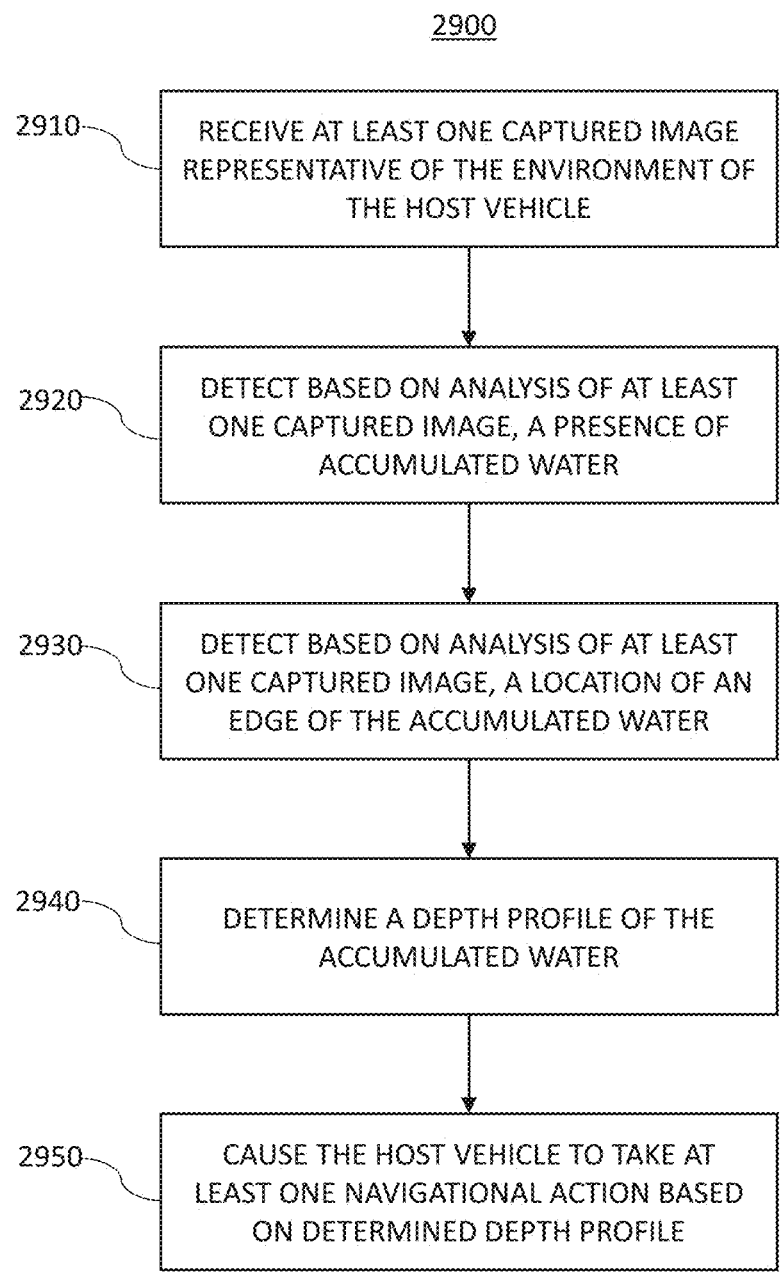
FIG. 29 is a flowchart showing an exemplary process for causing at least one navigational action based on detection of accumulated water on a road segment, consistent with disclosed embodiments.

FIG. 29 is a flowchart showing an exemplary process 2900 for causing at least one navigational action based on the detection of accumulated water on a road segment. In accordance with the disclosed embodiments, such a process may be executed by a system included in a host vehicle such as system 100 including a processing device such as processing unit 110. At step 2910, processing unit 110 may receive from a camera onboard the host vehicle at least one captured image representative of an environment of the host vehicle. For instance, a camera included in image acquisition unit 120 (such as image capture device 122, 124 or 126 having respectively fields of view 202, 204 and 206) may capture at least one image of an area forward of vehicle 200 (or to the sides or rear of a vehicle, for example) and transmit them over a data connection (e.g., digital, wired, USB, wireless, Bluetooth, etc.) to processing unit 110 via data interface 128. In some embodiments, processing unit 110 may receive a plurality of captured images from one or more cameras on board the host vehicle. For example, image capture devices 122, 124 and 126 having respectively fields of view 202, 204 and 206, comprised in image acquisition unit 120, may all send images representative of the environment of the host vehicle. In such a situation processing unit may analyze the image data contained in the plurality of captured images, may perform stereo image analysis (e.g., via execution of stereo image analysis module 404 and based on the steps described in connection with FIG. 6, above), or may perform a combination of monocular and stereo image analyses.

At step 2920, processing unit 110 may detect, based on analysis of the at least one captured image, a presence of accumulated water on a road segment. The analysis may be performed in a manner similar to the steps described in connection with FIG. 5 above. For instance, processing unit 110 may perform monocular image analysis (e.g., via execution of monocular image analysis module 402) to detect a set of features within the at least one image. Module 402 may implement techniques associated with a trained system (such as a neural network or a deep neural network) or an untrained system, to detect the presence of accumulated water based on one or more detected features. Examples of features indicative of the presence of accumulated water may include a color, a texture, a reflection, a closed curvilinear shape, and/or any other characteristics related to the presence of accumulated water. Further, in some embodiments, the detection of a presence of accumulated water on a road segment based on analysis of the at least one captured image may be supplemented by measurements from at least one sensor (RADAR or LIDAR system) on board the host vehicle. For example, processing unit 110 may provide the at least one captured image along with information delivered by the at least one sensor to an Artificial Neural Network (ANN) which produces a three-dimensional structure of a road ahead of the host vehicle. Processing unit 110 may then utilize the three-dimensional structure to identify the presence of accumulated water by considering both moving and fixed object on the scene.

At step 2930, processing unit 110 may detect, based on analysis of the at least one captured image, a location of an edge of the accumulated water relative to at least one road feature. Some of the features detected in step 2920 may be indicative of road features. The processing unit 110, via execution of the monocular image analysis module 402 or the image processor 190, may detect an intersection between at least one road feature and accumulated water, thereby locating an edge of the accumulated water. In some embodiments, locations of a plurality of edges of accumulated water relative to a plurality of road features may be detected.

At step 2940, processing unit 110 may determine a depth profile for the accumulated water, based on the detected location of the edge of the accumulated water relative to the at least one road feature and also based on stored three-dimensional profile information associated with the at least one road feature. In the context of this description, a depth profile may refer to a two or three-dimensional representation of the accumulated water. Such a profile may include information such as the extent of region covered by accumulated water, maximum depth, local maximums or total volume of water. In some embodiments, the processing unit 110 may be capable of extracting a plurality of two-dimensional depth profiles by cutting the three-dimensional representation along a plurality of corresponding predetermined directions.

At step 2950, processing unit 110 may cause the host vehicle to take at least one navigational action based on the determined depth profile. For instance, processing unit 110 may execute navigational response module 408 to cause one or more navigational responses in vehicle 200 based on the analysis performed in step 2940 and the techniques as described above in connection with FIG. 4. Navigational actions may include, among others, causing application of vehicle brakes (e.g., via one or more actuators), changing a heading of the vehicle (e.g., by activating steering actuators) to follow a course avoiding water greater than a certain threshold depth, etc.

Figure 30A:
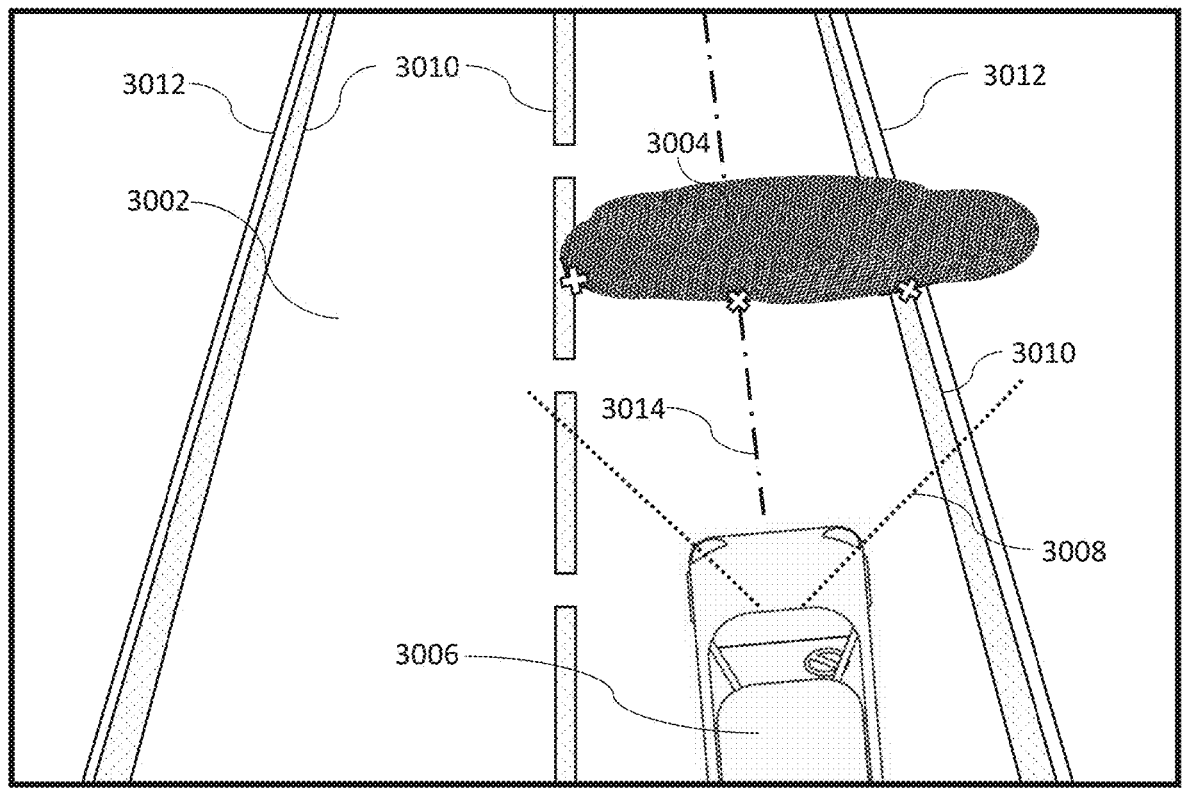
FIG. 30A is an illustration of an exemplary road segment with a presence of accumulated water, consistent with disclosed embodiments.

FIG. 30A is an illustration of an exemplary road segment with a presence of accumulated water, consistent with the disclosed embodiments. In some embodiments, the at least one road feature may include at least one of a lane marking, a road edge, or a target trajectory associated with the road segment. For example, as illustrated in FIG. 30A, road segment 3002, comprises a plurality of road features such as different lane markings 3010 (unbroken continuous lines on each side of the road and broken dividing line in the middle of the road segment), road edges 3012, and a target trajectory (as described in the sections above) of vehicle 3006 represented by the dotted-dashed line 3014. Vehicle 3006 may host system 100. A camera present in vehicle 3006 with field of view 3008 may capture at least one image, and based on analysis of the at least one captured image a processing unit, such as processing unit 110 may detect the above-mentioned road features as well as the presence of accumulated water 3004. In accordance with the disclosed embodiments, a location of an edge of accumulated water 3004 relative to at least one road feature (3010, 3012, 3014) may be determined, by identifying the intersection between accumulated water 3004 and the at least one road feature. Additionally, in some embodiments, locations of a plurality of edges of accumulated water 3004 relative to a plurality of road features may be detected, these locations are illustrated by crosses in FIG. 30A.

Figure 30B:
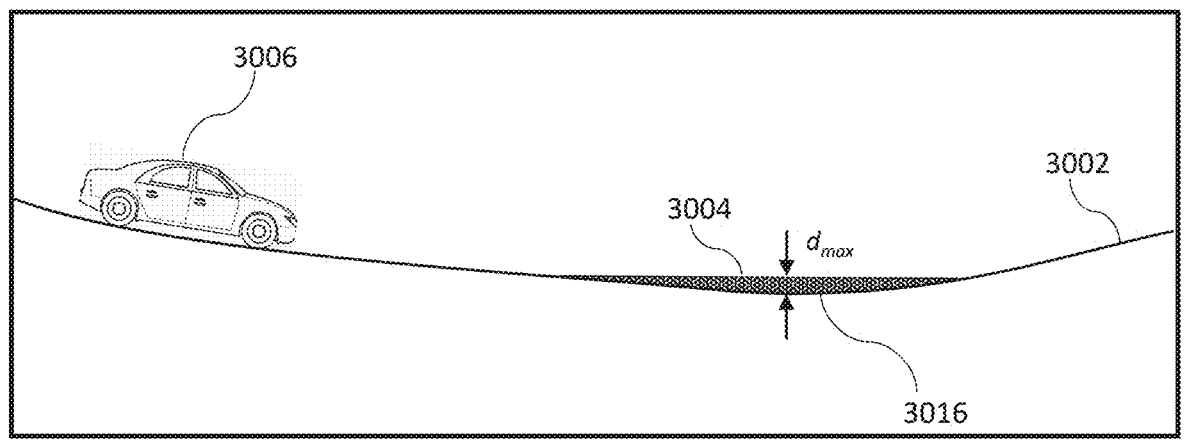
FIG. 30B is a two-dimensional profile of an exemplary road segment with a presence of accumulated water, consistent with disclosed embodiments.
Figure 30C:
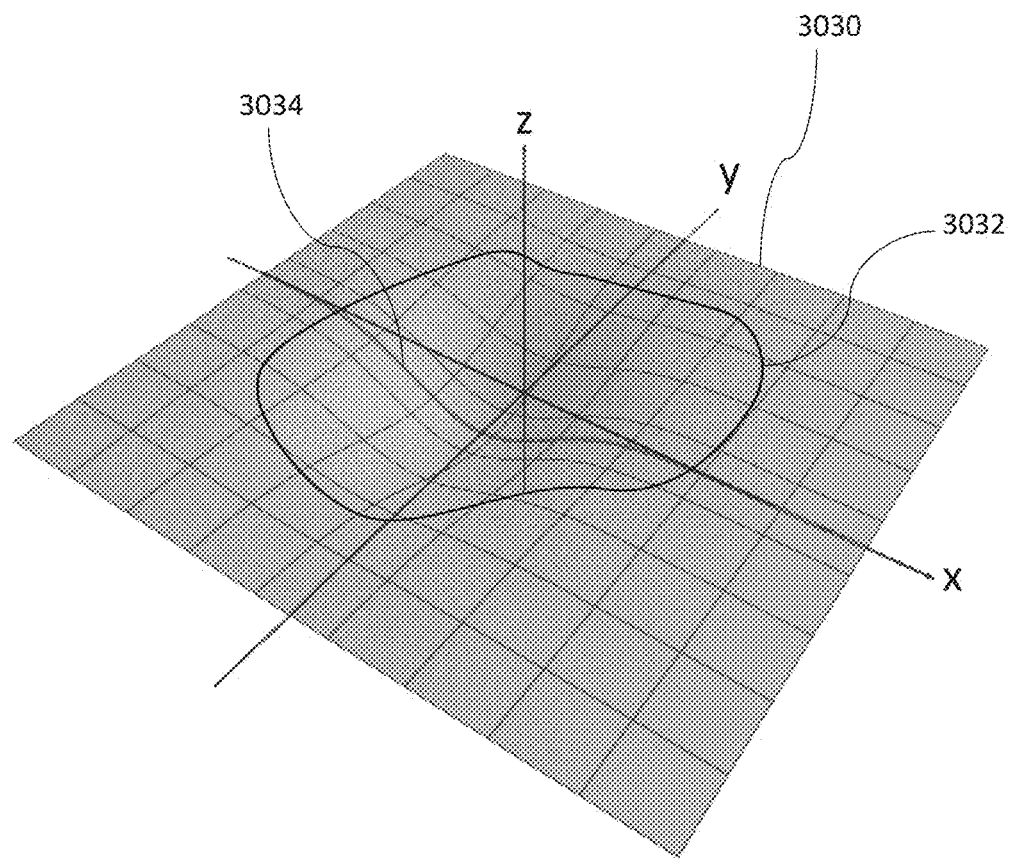
FIG. 30C is a three-dimensional profile of exemplary accumulated water, consistent with disclosed embodiments.

FIG. 30B is a two-dimensional profile representation of an exemplary road segment with a presence of accumulated water, consistent with disclosed embodiments. As mentioned above, a depth profile for the accumulated water, based on the detected location of the edge of the accumulated water relative to the at least one road feature and also based on stored three-dimensional profile information associated with the at least one road feature may be determined. Such a depth profile is illustrated in FIG. 30B which corresponds to a two-dimensional cut of road segment 3002 illustrated in FIG. 30A, along target trajectory 3014 of vehicle 3006. A two-dimensional depth profile 3016 of accumulated water 3004, along target trajectory 3014, comprises a maximum depth $d_{max}$ emphasized by two arrows in FIG. 30B. As mentioned above, the depth profile may include a three-dimensional profile, for example, as illustrated in FIG. 30C, a three-dimensional depth profile 3030 may be determined for accumulated water 3004, this profile may include a contour 3032. Consistent with the disclosed embodiments, a plurality of two-dimensional depth profiles may be extracted from the depth profile of accumulated water 3004, according to the direction upon which the cut is performed, each of these profiles may comprise a different maximum depth $d_{max}$. An example of a such two-dimensional depth profile is illustrated in FIG. 30C, with profile 3034), which corresponds to a cut along the x-axis.

Although FIGS. 30A-C illustrate accumulated water with a depth profile comprising a single global maximum, it should be understood that accumulated water may comprise a plurality of local maxima (as illustrated on FIG. 30D for instance) and that a depth profile may adopt a shape substantially different from that illustrated in these figures.

While road segment 3002 is illustrated as a straight roadway in FIGS. 30A-B, the same or similar techniques may be used for any form of drivable path. For example, a depth profile may be generated for any other drivable paths, such as intersections, curved roadways, roundabouts, entrance or exit ramps, acceleration or deceleration lanes, bridges, parking lots, or access roads.

In some embodiments, the at least one processor may be configured to perform steps 2910-2940 of process 2900 multiple times before the distance between the host vehicle and the accumulated water reaches a value below a predetermined distance threshold. For example, processing unit 110 may perform steps 2910-2940 until the distance between host vehicle 3006 and accumulated water is below 5 m, 10 m, 20 m, or any other suitable distance. In some embodiments, a suitable predetermined distance threshold may be based on the current speed of the host vehicle, so that any type of navigational action may be performed as the host vehicle approaches the accumulated water. Accordingly, a plurality of a depth profiles may be determined based on the distance between the host vehicle and the accumulated water.

In some embodiments, processing unit 110 may analyze the plurality of determined depth profiles and generate a robust depth profile. For example, a depth profile determined when the host vehicle is 100 m from the accumulated water may be different from a profile determined when the vehicle is 20 m away. Discrepancies may exist between the various depth profiles determined and an actual depth profile may correspond to an intermediate profile. Processing unit 110 may perform various statistical analyses to generate a robust depth profile, i.e., a depth profile that may include data from multiple determinations and be closer to the actual depth profile. For example, calculating the average depth profile of the different determined depth profiles may reduce the effect of random errors in the individual determination and lead to a more robust depth profile. A more accurate and reliable determination of the depth profile may be beneficial in selecting the most appropriate navigation action.

Figure 30D:
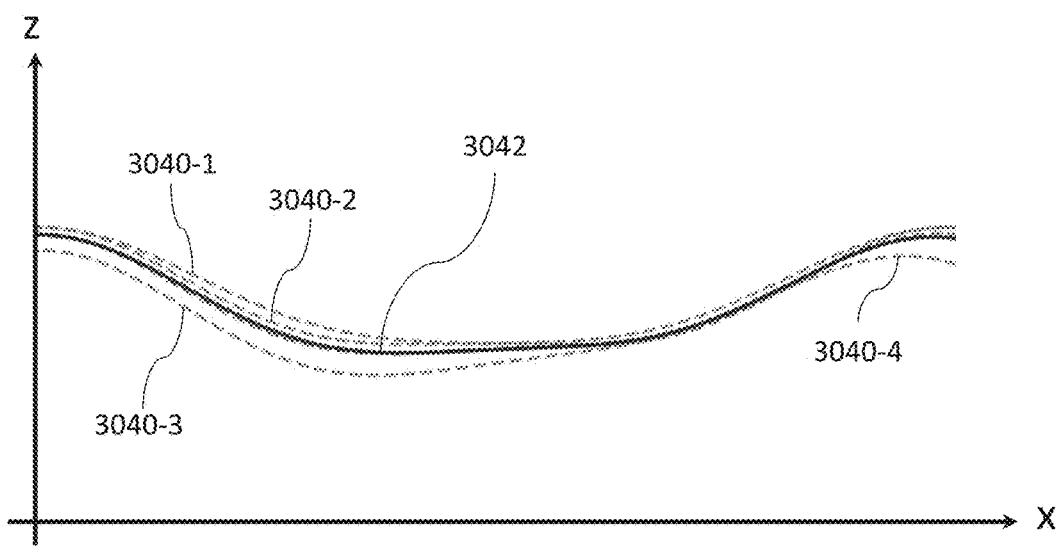
FIG. 30D is an average two-dimensional profile of exemplary accumulated water, consistent with disclosed embodiments.

FIG. 30D is an exemplary illustration of an average two-dimensional depth profile in accordance with the disclosed embodiments. Different depth profiles (3040-1 through 3040-4, shown as gray dashed lines) may have been determined by a vehicle including the system 100 at different distances from an accumulated water. Due to variability in the measurement process, these depth profiles are slightly different, so the processing unit 110 may calculate an average depth profile 3042, thereby providing a more reliable estimate of the actual depth profile of the accumulated water. Note that in the situation shown in FIG. 30D, the depth profile 3042 includes two local minima. In some embodiments, the depth profile determined in step 2940 may include an observational error indicator to represent a level of uncertainty in the process. For example, referring to FIG. 30B, the maximum depth $d_{max}$ may be associated with an incertitude to account for systematic or random errors in the system.

In some embodiments, the stored three-dimensional profile information may be located in a memory associated with the processing unit. For example, the three-dimensional profile information may be located in memory 140 or in memory 150 illustrated in FIG. 1 or in a memory included in processing unit 110. In other embodiments, the stored three-dimensional profile information may be remotely located relative to the host vehicle. For example, the three-dimensional profile information may be stored in an external server such as server 1230, in such a situation wireless transceiver 172 may be used to communicate with the external server and collect information relative to the three-dimensional profile. Additionally, in some further embodiments, the stored three-dimensional profile information may include a three-dimensional spline. A three-dimensional spline, as illustrated in FIG. 13, may refer to any type of curve in a three-dimensional space. Examples of three-dimensional splines may include a Bezier curve, a cubic curve, a Bezier surface, or a non-uniform mesh.

In some embodiments, the at least one navigational action may include braking to reduce speed of the host vehicle. For example, according to the depth profile determined in step 2940, navigational response module 408 may transmit electronic signals to braking system 230, in order to reduce the speed of the host vehicle. For relatively shallow water accumulations, reducing speed before driving along the water accumulation may be enough to avoid hydroplaning or fishtailing (vehicle's rear drifting from side to side) as the tires adhere less to the road surface at high speed due to presence of the accumulated water.

In some embodiments, the at least one navigational action may include changing gears of the host vehicle, switching to a different engine/motor management setting for an EV (e.g., regenerative braking level, etc.). Before reaching the accumulated water, navigation response module 408 may transmit electronic signals to a gear system to change gear. As noted above, driving at high speed over accumulated water is dangerous, and processing unit 110 may be susceptible to issuing a navigation action corresponding to a speed reduction. In such a situation, the reduction in vehicle speed may be achieved by shifting to a lower gear. Alternatively, or additionally, the at least one navigation action may include reducing speed of the vehicle without braking. For example, if the vehicle is driven in heavy rain, braking before reaching the accumulated water can be as dangerous as driving at high speed through accumulated water, as braking on a wet surface can cause the vehicle to drift. In such a situation, a more appropriate action might be engine braking or coasting to reduce vehicle speed and prevent the vehicle from drifting. Navigational response module 408 may transmit electronic signals to throttling system 220 to reduce the current throttle level of the vehicle to cause a reduction in speed of the vehicle.

In some embodiments, the at least one navigational action may include altering a trajectory of the host vehicle. For example, referring to FIG. 30A, if the determined depth profile of the accumulated water 3004 indicates a depth that is too great (e.g., water with a depth of more than 10 cm), or a depth such that crossing the accumulated water 3004 at the current vehicle speed involves a non-negligible risk of an accident, the navigation response module may transmit an electronic signal to the steering systems 240 to initiate a lane change, and temporary driving in the left lane. Note that in this situation, the navigation response module checks and confirms that there are no other obstacles, e.g., vehicles, pedestrians or other road objects in the path of the vehicle during the lane change that would result in collision of the vehicle with the obstacle(s). In another example, if the accumulated water extends over all available paths, the processing unit may analyze the depth profile and determine a path through a portion of the accumulated water where the depth is minimal or does not correspond to a high accident risk.

In some embodiments, the at least one navigational action may include re-routing the host vehicle. For example, if accumulated water is detected in the vehicle's lane, but before reaching the accumulated water, a junction offers the opportunity to take an alternative route, the navigation response module may transmit an electronic signal to the steering system 240 to reroute the vehicle to an alternative course via the junction. In another example, if no junction is present before reaching the accumulated water, the navigation response module may transmit an electronic signal to the steering system 240 to make a U-turn and find an alternate route avoiding the road segment including the accumulated water. In these situations, processing unit 100 may collaboratively use a GPS module or position sensor 130 to find alternative routes that avoid road segments with accumulated water. In an alternative example, the response module may transmit an electronic signal to the steering system 240 to reroute the host vehicle on the shoulder of the road segment, including crossing a barrier (soft shoulder). In this case, a safety setting may be adapted to ensure that the vehicle takes extra care.

In some embodiments, the at least one navigational action may include stopping the host vehicle. For example, if the vehicle is travelling in a single lane and the accumulated water detected in the lane has too great a depth profile (e.g., the maximum depth is more than 10 cm; greater than the radius of the vehicle's wheels; etc.), the navigation response module may transmit an electronic signal to braking system 230 to stop the vehicle. In some other embodiments, the at least one navigational action may include exiting an automated driving mode for the host vehicle and giving control to at least one passenger of the host vehicle, also known as a "handoff."

In some embodiments, the at least one navigational action may include a combination of different navigational actions, such as those described above. For example, the navigation response module may transmit an electronic signal to braking system 230 and steering system 240, to reduce the speed of the vehicle before changing of lanes. In another example, the processing unit 110 may cause a reduction in the current acceleration level of the vehicle, before applying the braking system and stopping the vehicle. In yet another example, control of the vehicle can be returned to at least one passenger after the vehicle has been stopped. Further, in some other embodiments, the at least one navigational action may differ based on a position of a maximum depth value of the determined depth profile relative to one or more predetermined depth thresholds. For example, if a maximum depth value is below a first predetermined threshold (e.g. 1 or 2 centimeters), the navigational action caused by processor 110 may correspond to braking and reducing the speed of the vehicle, if a maximum depth value is above a second predetermined threshold (e.g. 20 or 30 centimeters), the navigational action caused by processor 110 may correspond to stopping the vehicle.

In some embodiments, process 2900 may comprise additional steps of: detecting, based on analysis of the at least one captured image, a presence of at least one local depression in the road segment surface; determining a depression depth profile for the at least one local depression in the road segment surface based on stored three-dimensional profile information associated with the road segment; detecting, based on analysis of the at least one captured image, a water surface height of the accumulated water within the at least one local depression; and determining a water depth profile for the accumulated water within the at least one local depression based on the depression depth profile and the detected water surface height. In the context of this description, a local depression may refer to any road surface areas having elevations slightly lower than those of the surrounding areas. Examples of local depressions may include, a pothole, a gutter, a level crossing, or a rut. The local depression may be caused by settlement of the foundation soil, frost heave, may be built up during construction, may be the result of repeated vehicle traffic, or may be the result of a heavy object striking the road surface, for example. In accordance with the disclosed embodiments, a depth profile of these local depressions may be determined based on the stored three-dimensional profile information associated with the road surface, which can be acquired under optimal conditions, i.e., with dry roads and empty local depressions. For example, in the sections above describing drive information harvesting and subsequent mapping techniques, road features such as potholes and other types of depressions may be identified based on images collected by cameras of passing vehicles. The potholes may be localized, and characteristics of the potholes (e.g., perimeter location, depth, bottom contour, inner contour, etc.) may be determined based on image analysis and transmitted to a mapping server as part of the harvesting process. The server may aggregate the information and store in the map a representation of potholes and other depressions associated with a mapped road segment. This mapped information can be used to determine the three-dimensional profile information for the road surface useful in determining a depth profile associated with accumulated water (e.g., over regions of the road surface, within potholes, etc.).

Further, in some embodiments, the detection of presence of accumulated water and determination of water surface height within the one or more local depressions based on analysis of the at least one captured image may be supplemented by measurements from at least one sensor on board the host vehicle. Example of sensor may include a RADAR or a LIDAR system.

Figure 30E:
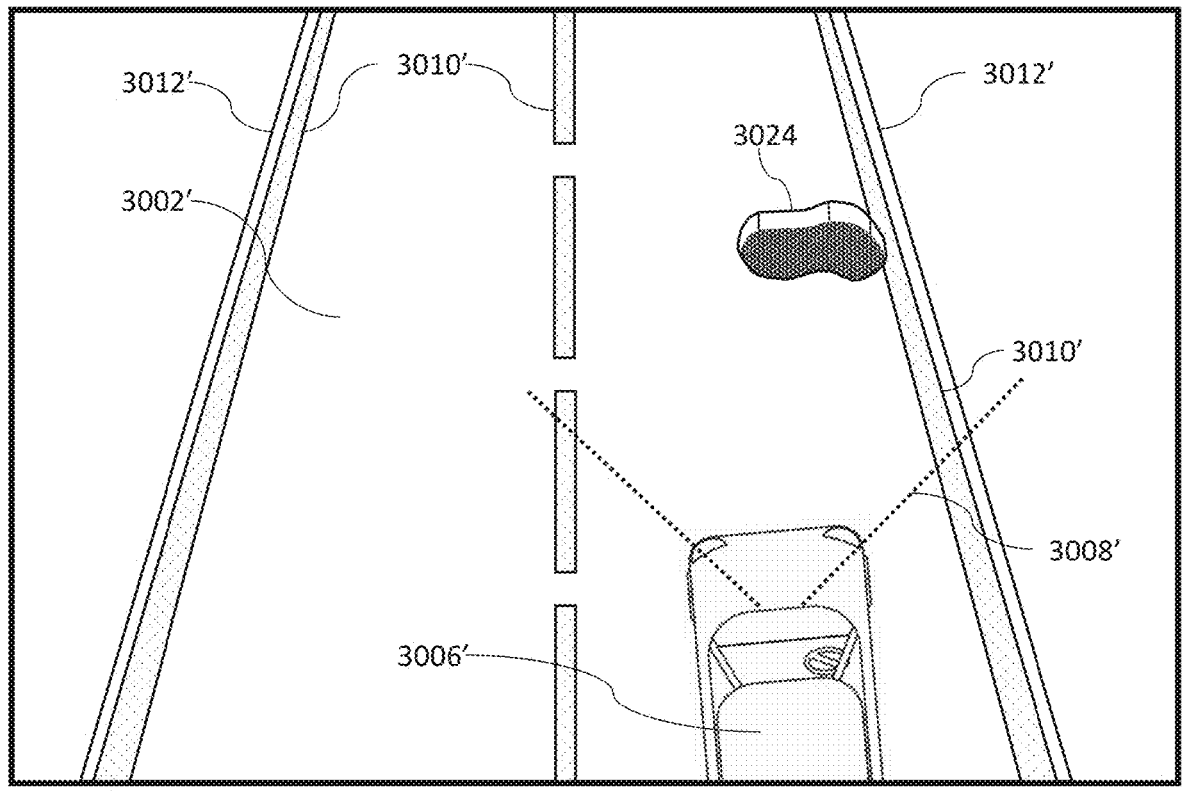
FIG. 30E is an illustration of an exemplary road segment with a local depression filled with water, consistent with disclosed embodiments.

FIG. 30E is an illustration of an exemplary road segment with a local depression filled with water, consistent with disclosed embodiments. As illustrated in FIG. 30D, vehicle 3006' may host system 100, a camera present in vehicle 3006' with field of view 3008' may capture at least one image and based on analysis of the at least one captured image a processing unit may detect the presence of local depression 3024 illustrated here as a pothole and detect the presence of accumulated water within pothole 3024. In some embodiments, the presence of one or more local depressions in the road segment surface may be detected relative to at least one road feature. In FIG. 30D, road segment 3002', comprises a plurality of road features such as different lane markings 3010' (unbroken continuous lines on each side of the road and broken dividing line in the middle of the road segment) and road edges 3012', the presence of pothole 3024 may be detected relative to lane marking 3010'. Additionally, based on the analysis of the at least one captured image, processing unit 110 may detect water surface height and determine a depth profile for the accumulated water. In some embodiments, water surface height may be determined following calibration of the camera onboard the vehicle, wherein the calibration may include intrinsic or extrinsic calibration.

In some embodiments, process 2900 may further comprise a step of causing at least one communication action based on the determined depth profile. A communication action may refer to any type of message issued by the system to any user or entity. In some embodiments, the at least one communication action may include issuing an audible and/or visual warning message to a passenger of the host vehicle. For example, the processing unit 110 may communicate with the user interface 170, and may cause a written message to be displayed on the touch screen 320, or an audio message to be transmitted to the speakers 360, or a combination thereof.

In some embodiments, the at least one communication action may include issuing an alert to a road maintenance authority. For example, the processing unit 110 may communicate with the wireless transceiver 172, and may cause a message to be sent to the local road maintenance authority. The message may take the form of an alert and may include the location of the accumulated water to within a reasonable level or precision, the determined depth profile, and possibly an image of the accumulated water. For instance, if the accumulated water is on a road that passes under a bridge, and the road is completely flooded, a message may be sent to a local maintenance authority assigned to maintain the affected road segment who can then take appropriate action, such as organizing an alternate route and/or posting warning signs.

In some embodiments, the at least one communication action may include uploading determined accumulated water depth profile information to a remotely located server. Accumulated water depth profile information may include the exact location of accumulated water, the maximum depth value, a image of the accumulated water or a combination thereof. For example, processing unit 110 may communicate with wireless transceiver 172 and upload accumulated water depth profile information to a remotely located server.

Additionally, in some embodiments, the remotely located server may be configured to aggregate uploaded accumulated water depth profile information received from a first plurality of vehicles and distribute the aggregated information to a second plurality of vehicles. These embodiments will be further detailed in following sections of this disclosure.

In some embodiments, the at least one communication action may include a combination of different communication actions, such as the ones described above. For example, upon encountering accumulated water on a road segment and determining its depth profile, a processing unit may issue a message to a vehicle passenger via the user interface 172, issue an alert to the local road maintenance authority, and upload the determined depth profile to a remotely located server. Additionally, in some embodiments, the at least one communication action may differ based on a position of a maximum depth value of the determined depth profile relative to one or more predetermined depth thresholds. For example, if a maximum depth value is below a first predetermined threshold (e.g. 1 or 2 centimeters), the communication action caused by processor 110 may correspond to issuing an audible or visual warning message to a passenger of the host vehicle. If a maximum depth value is above a second predetermined threshold (e.g. 20 or 30 centimeters), i.e., a situation in which travel along the road segment is unsafe, or in which the road segment is impassable, the communication action caused by the processor 110 may correspond to alerting a road maintenance authority.

Crowdsourced Mapping and Location of Accumulated Water on a Road Segment.

As described above, it is desirable for an autonomous vehicle to be able to detect the presence of accumulated water on a road surface and to implement appropriate navigational operations. In addition, it is also desirable for an autonomous vehicle to receive real-time information about the presence of accumulated water on a road segment. A road navigation model may be generated based on navigation information collected by vehicles traversing a road segment. The road navigation model may store information relating to various features or characteristics associated with a particular road segment. For example, a road segment map may include information related to the presence of accumulated water. It may be desirable to determine some of the characteristics of this accumulated water. Examples of characteristics may include a depth profile, extent, fill/drain rate, or any other measurable physical quantity related to the accumulated water. This valuable information can be useful to the vehicle travelling the road segment but also to other vehicles that may encounter the same road segment, so the distribution of this information could provide the ability to aid other vehicles in taking action in view of known locations of accumulated water. In addition, since the condition of the accumulated water is likely to change rapidly, effective updating of the information represents another challenging task.

To address these and other issues, the disclosed embodiments may provide for the collection and distribution of information relative to the presence of accumulated water on a road segment, which may then be used by autonomous or semi-autonomous vehicles for navigating the road segment. The common information may be generated based on crowdsourcing of vehicle drive information from multiple drives of multiple vehicles. This accumulated water data may then be used to generate or update a map, which can contain real-time information about the status of the road segment. This may allow vehicles navigating or planning to navigate the road segment to make more informed and adaptive decisions based on the current conditions encountered by the vehicle.

Figure 31:
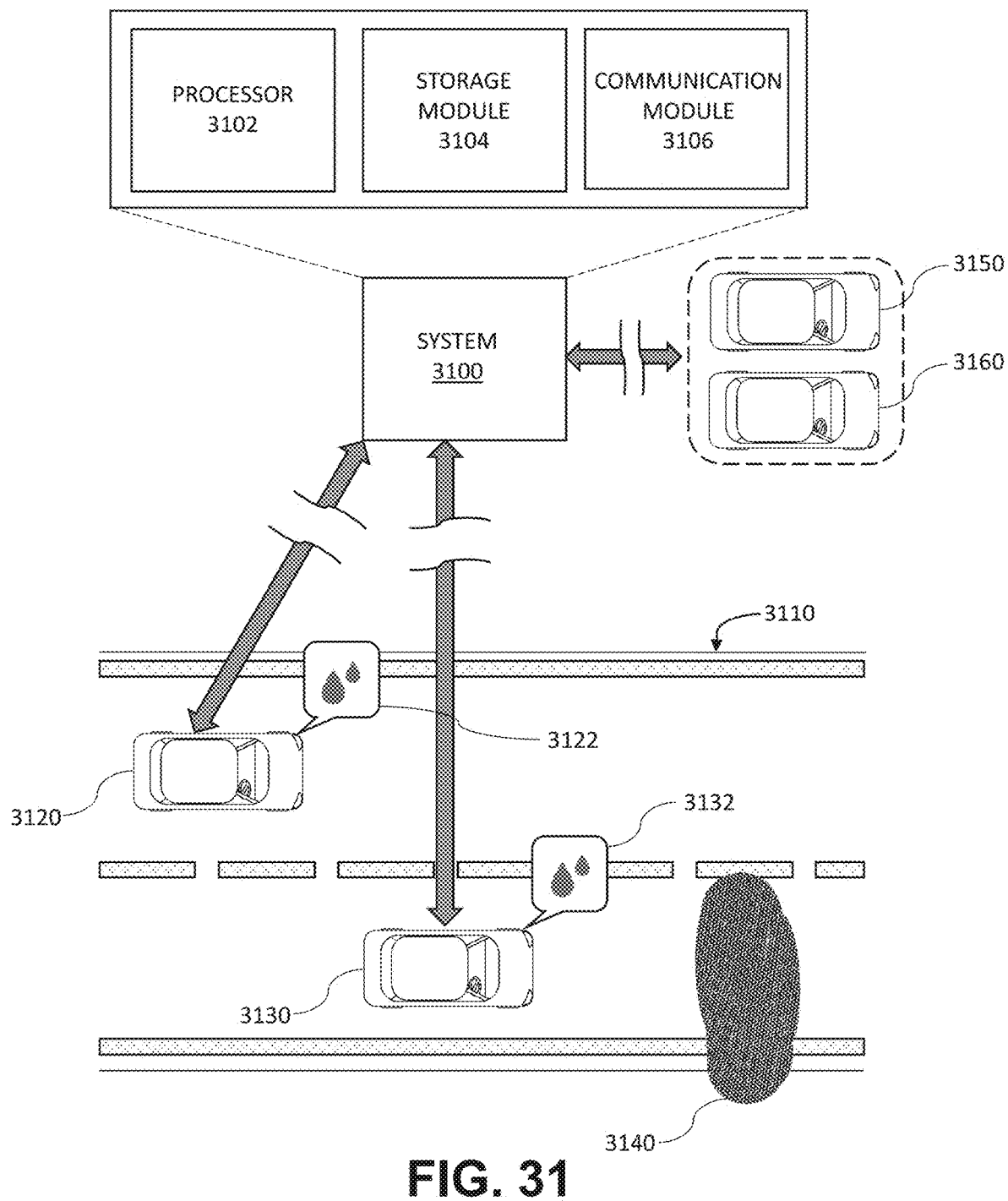
FIG. 31 illustrates an example system for collecting and distributing information relative to the presence of accumulated water on a road segment for use in navigation by a host vehicle, consistent with the disclosed embodiments.

FIG. 31 illustrates an example system 3100 for collecting and distributing information relative to the presence of accumulated water on a road segment, consistent with disclosed embodiments. System 3100 may include at least one processor 3102, as shown. In addition to processor 3102, system 3100 may include in some embodiments, a storage module 3104 and a communication module 3106, both able to communicate with processor 3102 and follow instructions of processor 3102. Processor 3102 may include various types of processing devices. For example, a microprocessor, preprocessors, a central processing unit (CPU), support circuits, digital signal processors, integrated circuits, memory, or any other types of devices suitable for running applications. Wireless transceiver 3106 may include one or more devices configured to exchange transmissions over an air interface to one or more networks (e.g., cellular, the Internet, etc.) by use of a radio frequency, infrared frequency, magnetic field, or an electric field. Storage module 3104 may include random access memory (RAM), read-only memory (ROM), flash memory, disk drives, optical storage, tape storage, removable storage and/or any other types of storage. Communication module 3106 may use any known standard to transmit and/or receive data (e.g., Wi-Fi, Bluetooth®, Bluetooth Smart, 3102.15.4, ZigBee, etc.). Such transmissions may include communications from system 3100 to a plurality of remotely located vehicles.

System 3100 may generate at least a portion of an autonomous vehicle road navigation model for a road segment 3110 characterized by a presence of accumulated water 3140. For example, system 3100 (e.g., through processor 3102) may receive drive information collected from each of a first plurality of vehicles that traversed the road segment, wherein the drive information received from each of the first plurality of vehicles indicates one or more characteristics of the accumulated water. For example, system 3100 may collect drive information from vehicles 3120 and 3130 as they traverse road segment 3110. Processor 3102 may receive the information in any suitable way. For example, processor 3102 may receive drive information via communication module 3106. In the context of the present disclosure, driving information may refer to data collected by any type of sensor embedded in a vehicle. For example, driving information may include location data measured by a locating device (e.g., GPS), image data acquired by a camera, detected objects or distances measured by lidar or radar, or any other type of data that a vehicle may acquire using a sensor as it travels along a road segment. Accordingly, the vehicles of the first plurality of vehicles may be equipped with one or more sensors. Further, such vehicles may be capable of detecting the presence of accumulated water on a road segment and determining one or more characteristics of the accumulated water. In some embodiments, one or more vehicles from the first plurality of vehicles may include a navigation system. Examples of navigation systems may include system 100, as a result, vehicles from the first plurality of vehicles may be autonomous or semiautonomous vehicles.

Consistent with the present disclosure, the drive information of vehicles 3120 and 3130 may include an indicator associated with one or more characteristics of the accumulated water 3140. For example, this may include one or more indicators 3122 and 3132, as shown in FIG. 31. As discussed above, the characteristics of the accumulated water may include any measurable physical quantity related to the accumulated water. In some embodiments, the one or more characteristics of the accumulated water may include a depth profile. In the context of this description, a depth profile may refer to a two or three-dimensional representation of the accumulated water. Such a profile may include essential pieces of information such as the extent of accumulated water, maximum depth, local maximums or total volume of water. In some embodiments, the one or more characteristics of the accumulated water may include an indicator of a water edge location of the accumulated water relative to a road surface or a road feature associated with the road segment. Examples of road features may include at least one of a lane marking, a road edge, or a target trajectory associated with the road segment. In some embodiments, the one or more characteristics of the accumulated water include an indicator of an area associated with the accumulated water (e.g., an area covered by accumulated water). For example, the first plurality of vehicles may include a position sensor, such as the position sensor 130 of the system 100 to determine a location of the vehicle, and then a position or distance of the accumulated water from the vehicle may be determined using, for example, image analysis, thereby indicating an area associated with the accumulated water. As described in the sections above, a vehicle may also localize its position relative to a map (e.g., relative to a target trajectory of a REM map). Based on this localization information as well as one or more images captured by a camera onboard the host vehicle, positions of accumulated water (e.g., borders of accumulated water) may be determined relative to certain road features (e.g., road edges, lane markings, target trajectories, etc.). The intersections between such road features and edges of accumulated water may correspond to point locations that can be determined by navigation systems of host vehicles (e.g., using structure in motion calculations, triangulation, trained networks, etc.) in view of captured images and/or LIDAR information.

In some embodiments, different techniques may be used by vehicles from the first plurality of vehicles to detect accumulated water and determine the one or more characteristics of the accumulated water. For example, one such technique may correspond to the one mentioned above with respect to FIGS. 29-30E, using image analysis to detect accumulated water, the location of an edge thereof, and simultaneously using stored three-dimensional profile information associated with the at least one road feature to determine a depth profile. In another situation, vehicles may use techniques using image analysis alone, or image analysis supplemented with measurements from at least one sensor (lidar, radar, etc.), or a combination of multiple techniques. In some embodiments, the first plurality of vehicles may use identical or different techniques to detect accumulated water and determine one or more characteristics of the accumulated water.

Once the information collected from the first plurality of vehicles that traversed or are traversing the road segment is received, system 3100, via processor 3102 may generate aggregated accumulated water information by aggregating the drive information received from the first plurality of vehicles. For example, as illustrated in FIG. 31, processor 3102 may process the drive information collected from vehicles 3120 and 3130 and generate aggregated accumulated water information for road segment 3110. Aggregated accumulated water information may include the location of accumulated water (e.g., detected point locations associated with edges of accumulated water), the maximum depth value, a depth profile, an image of the accumulated water, one or more different characteristics or a combination thereof. Because this information may be aggregated from multiple drives, refined (e.g., average) locations, profiles, etc. may be generated based on the aggregated information. The aggregation process can be based on any known method, such as the methods used for creating REM map segments, and may include iterative assignment of landmarks (determining which landmarks across different drives are the same) and alignment, in other examples. Such refined locations, profiles, etc. may have much greater accuracy than any of the measurements or observations harvesting by a single harvesting vehicle navigation system. In some cases, point positions of accumulated water edges may have accuracies in the sub-centimeter range. In some embodiments, system 3100 may process the drive information in different ways to generate the aggregated accumulated water information. For example, the system 3100 may be configured to analyze, format, adapt, augment, supplement, redact, or otherwise modify drive information data for optimization purposes. It may perform various statistical analyses, such as averaging, standard deviation calculation, use of robust statistical methods, or any other appropriate statistical method to generate aggregated accumulated water information.

Upon completion of generating the aggregated accumulated water information, system 3100, via processor 3102 may distribute the aggregated accumulated water information to a second plurality of vehicles. For example, processor 3102 via communication module 3106 may distribute aggregated accumulated water information obtained as a result of the collection of the drive information of vehicles 3120 and 3130 to a second plurality of vehicles including vehicles 3150 or 3160. The second plurality of vehicles may then use the aggregated accumulated water information to take appropriate navigational actions and navigate the road segment. Therefore, the second plurality of vehicles may include autonomous or semi-autonomous vehicles. The second plurality of vehicles may include vehicles that are currently travelling on the road segment or vehicles that will navigate the road segment, i.e., vehicles that will encounter the road segment after a certain period of time or after a certain distance, or vehicles that have the road segment on their route.

Figure 32A:
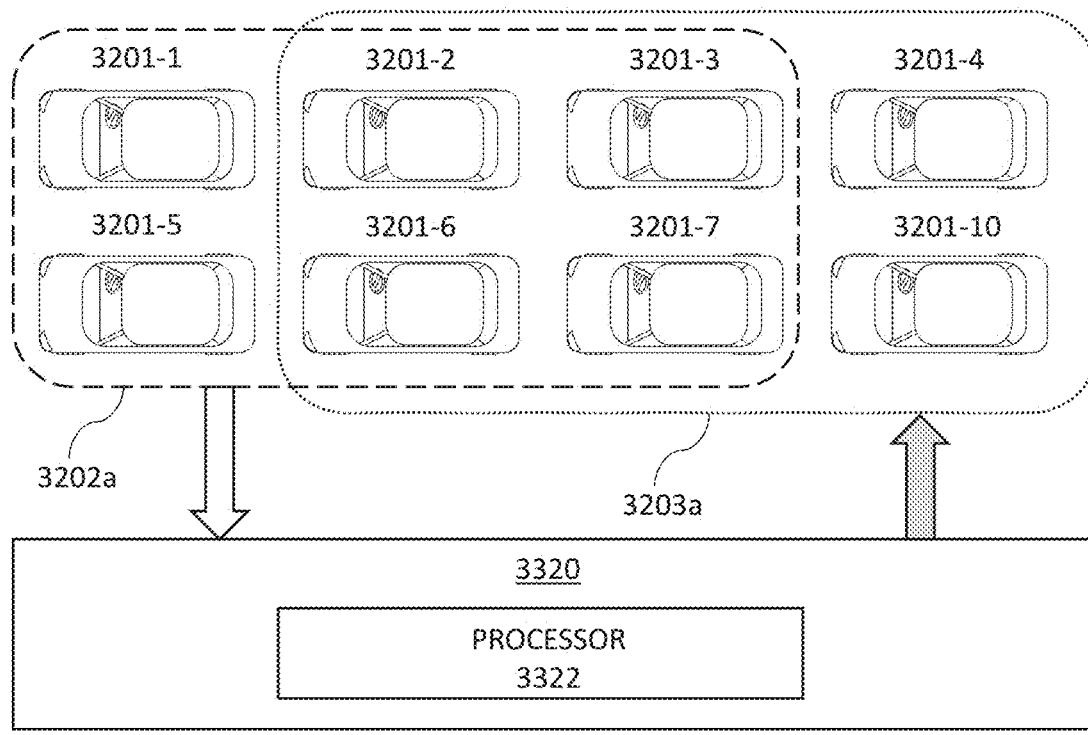
FIG. 32A illustrates an example of first and second pluralities of vehicles in interaction with the system of FIG. 31, consistent with the disclosed embodiments.
Figure 32B:
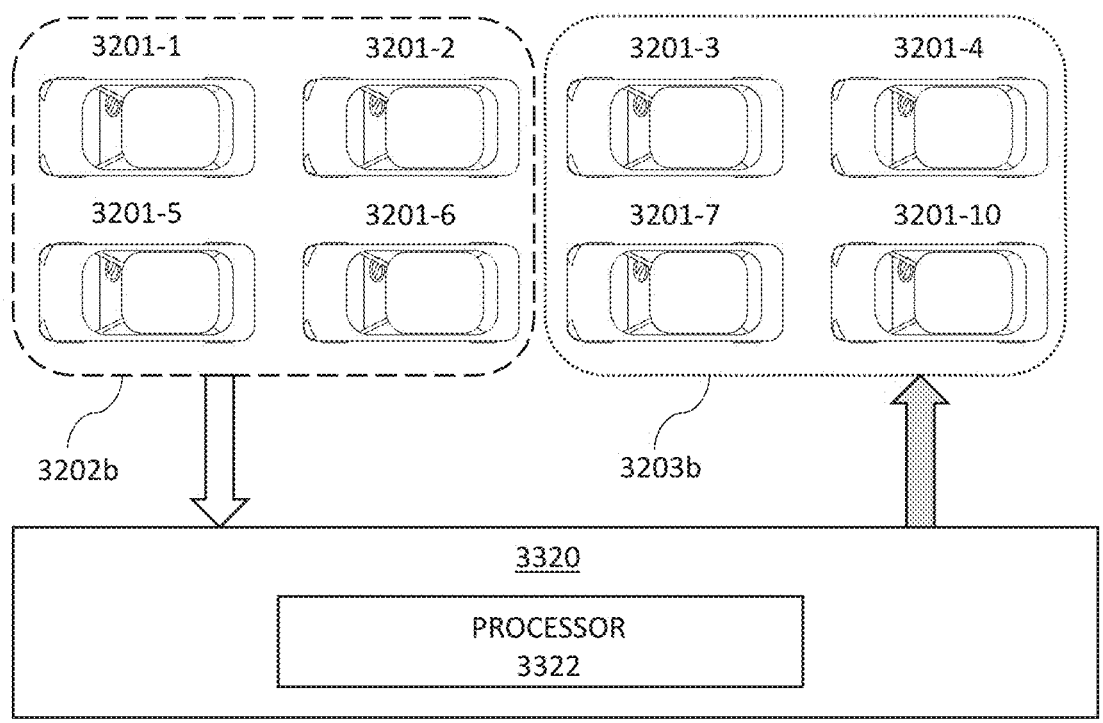
FIG. 32B illustrates another example of first and second pluralities of vehicles in interaction with the system of FIG. 31, consistent with the disclosed embodiments.

In some embodiments, the first plurality of vehicles and the second plurality of vehicles may share at least one vehicle in common. This is illustrated in FIG. 32A, where the first plurality of vehicles 3202*a* includes vehicles 3201-1, 3201-2, 3201-3, 3201-5, 3201-6, and 3201-7, and the second plurality of vehicles 3203*a* includes vehicles 3201-2, 3201-3, 3201-4, 3201-6, 3201-7 and 3201-8. Accordingly, vehicles 3201-2, 3201-3, 3201-6, and 3201-7 are common to the first plurality of vehicles 3202*a* and the second plurality of vehicles 3203*a*. In some embodiments, the first plurality of vehicles is different from the second plurality of vehicles and no common vehicles are shared by the first plurality of vehicles and the second plurality of vehicles. This is illustrated in FIG. 32B, where the first plurality of vehicles 3202*b* includes vehicles 3201-1, 3201-2, 3201-5, and 3201-6, and the second plurality of vehicles 3203*b* includes vehicles 3201-3, 3201-4, 3201-7 and 3201-8. Therefore, no vehicle is common to the first plurality of vehicles 3202*b* and the second plurality of vehicles 3203*b*. Although FIGS. 32A-B illustrate a first and second plurality of vehicles comprising the same number of vehicles, it is to be understood that the first and second plurality of vehicles may comprise a different number of vehicles.

In some embodiments, the drive information received from each of the first plurality of vehicles may further include a timestamp. A timestamp may refer to a piece of data indicating when an event occurred including the date and time of day. The level of precision of such a timestamp may be in minutes, seconds, or even small fractions of a second. The event in question may correspond in this situation to the moment of determination of one or more characteristics of the accumulated water. Each vehicle of the first plurality of vehicles may therefore communicate its driving information, indicate precisely when it has encountered the accumulated water on the road segment and determined the one or more characteristics associated.

In some embodiments, all of the timestamps included in the drive information received from each of the first plurality of vehicles may be different. Indeed, it is likely that each vehicle of the first plurality of vehicles sends its driving information at different times, as all vehicles in the first plurality of vehicles may not encounter the accumulated water and determine its one or more associated characteristics at the same exact time. Accordingly, processor 3102 may receive multiple driving information from multiple vehicles at different times. For example, referring to FIG. 31, a few seconds may have elapsed between the reception of the drive information of vehicles 3120 and 3130.

In some embodiments, the first plurality of vehicles may include a variable number of vehicles based on a predetermined amount of time elapsed since receipt of drive information from two vehicles. The processor 3102 should receive drive information from at least two vehicles to generate aggregated water information. Upon receiving these two pieces of drive information, processor 3102 may wait for a predetermined amount of time, to potentially receive drive information from one or more other vehicles. For example, during the predetermined amount of time, processor 3102 may receive drive information from zero, two, five, ten or any other appropriate number of additional vehicles. Therefore, the final number of vehicles included in the first plurality of vehicles is variable and depends on the predetermined amount of time and circumstances. This predetermined amount of time may correspond to a few minutes (e.g. two, five or ten minutes), a few hours (e.g. one or two hours) or any other appropriate time. For example, the predetermined time may depend on the weather conditions in the area being considered. According to such an example, where heavy rain is presently falling, the predetermined time may be set as 1 minute, while in a sunny weather situation the time may be set as 1 hour or 1 day.

In some embodiments, the first plurality of vehicles may include a predetermined fixed number of vehicles, wherein the predetermined fixed number of vehicles is greater than or equal to two. For example, processor 3102 may begin generating aggregate accumulated water information only after receiving trip information from four, ten, or even twenty vehicles. Processor 3102 is therefore configured to wait a certain time which may vary as a function of the circumstances, to receive drive information from a predetermined fixed number of vehicles. Further, in some embodiments, the first plurality of vehicles may be equal to or less than the predetermined fixed number of vehicles depending on whether a time required to collect drive information from the predetermined fixed number of vehicles is less than the predetermined amount of time. For example, in a situation where the predetermined fixed number of vehicles equals ten vehicles, and the predetermined amount of time equals fifteen minutes, the processor 3102 may wait fifteen minutes after receiving drive information from two vehicles. If during those fifteen minutes, only five additional vehicles have sent their drive information, the final number of vehicles in the first plurality of vehicles is equal to seven vehicles. If before those fifteen minutes end, eight additional vehicles have sent their drive information, the final number of vehicles in the first plurality of vehicles equals ten vehicles. Thus, the predetermined fixed number of vehicles having been obtained, processor 3102 may stop waiting and begin generating aggregated accumulated water information with the collected drive information form the ten vehicles.

Figure 33:
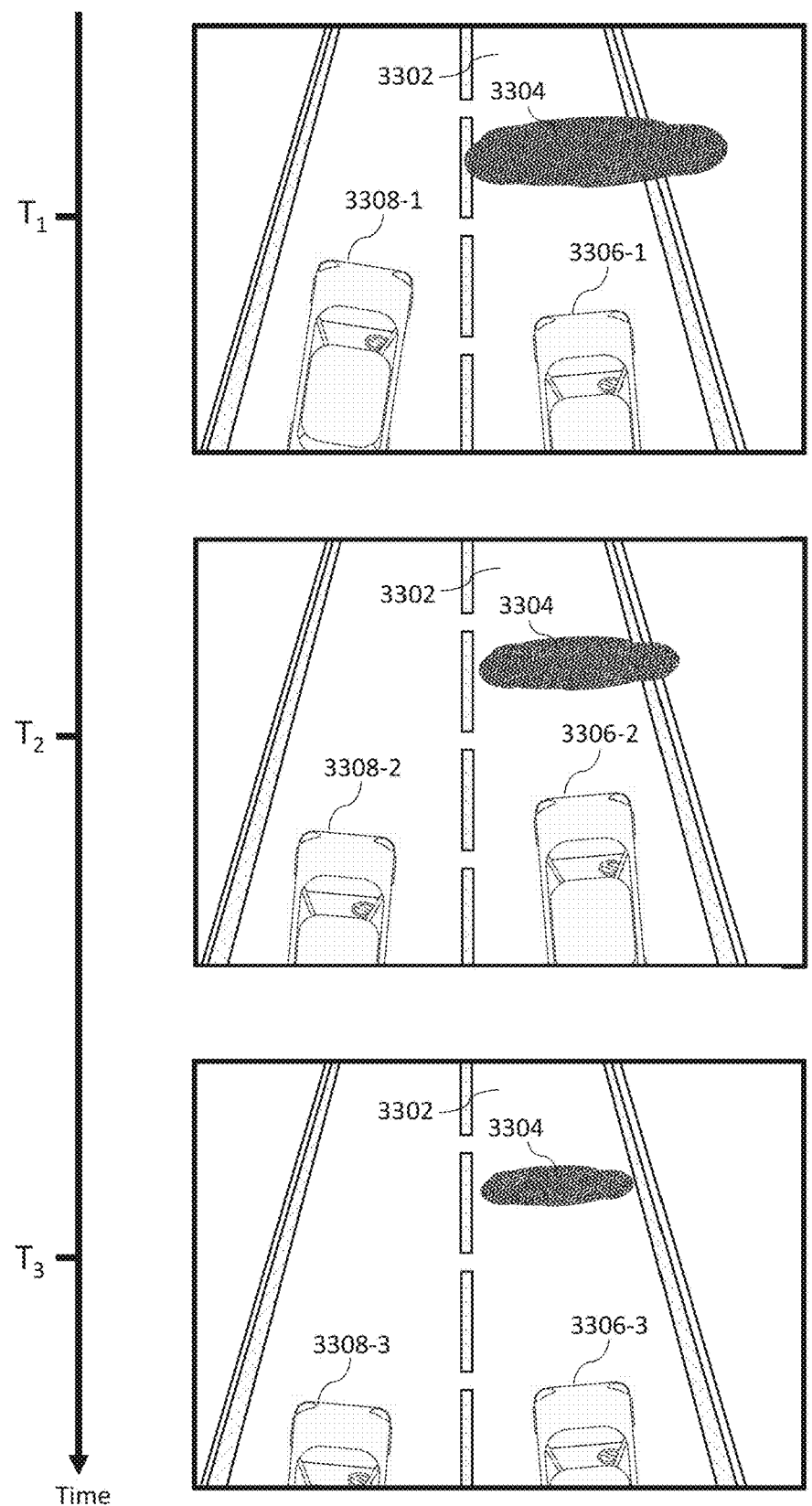
FIG. 33 illustrates snapshots of a road segment with accumulated water, taken at different times, consistent with the disclosed embodiments.

FIG. 33 shows snapshots of a road segment with accumulated water, taken at different times. As shown, three situations are represented, having occurred on road segment 3302, at three different times T1 to T3, T1 being the earliest time. For each of these situations, a plurality of vehicles ((3306-1, 3308-1); (3306-2, 3308-2); (3306-3, 3308-3)) travels along road segment 3302 and encounters accumulated water 3304. Each of these vehicles (3306-1, 3308-1, 3306-2, 3308-2, 3306-3, 3308-3) may host a navigation system such as the system 100 and may be therefore capable of determining one or more characteristics associated to accumulated water 3304. In accordance with the disclosed embodiments, each of these vehicles (3306-1, 3308-1, 3306-2, 3308-2, 3306-3, 3308-3) may send its driving information comprising one or more characteristics of the accumulated water 3304, along with a timestamp, the driving information may be received by system 3100. Thus, the driving information from these vehicles may reflect the state of the accumulated water 3304 for each time point illustrated in FIG. 33. For example, driving information of vehicles (3306-1; 3308-1) reflects the state of the accumulated water at time T1.

However, as noted above, it may be plausible that each of a plurality of vehicles would determine one or more associated characteristics of accumulated water 3304 at a slightly different time, hence the timestamps are susceptible to differ. Accordingly, the times T1, T2, and T3 may refer to time slots starting at a precise initial instant and ending at a precise final instant. The duration of these time slots may be seconds, minutes, or any other appropriate duration. For example, a time slot may start at 10 AM and end at 10:30 AM. The duration may be defined by the difference between the most recent timestamp and the oldest timestamp of the driving information of a plurality of vehicles. For example, the time stamps of the first plurality of vehicles (3306-1; 3308-1) may differ by a given time (e.g., 10 seconds), so that the driving information of the first plurality of vehicles (3306-1; 3308-1) reflects the state of the accumulated water during the time slot T1 with a duration equal to the given time. Time slots are arranged chronologically but may be non-consecutive, i.e., a time gap may exist between two time slots, and time slots may have different durations. For example, time slot T1 may start at 10:00 and end at 10:30 and time slot T2 may start at 11:00 and end at 11:15.

In the situations illustrated in FIG. 33, the definitions of the first plurality of vehicles and the second plurality of vehicles may differ. For example, in a particular implementation, the first plurality of vehicles may include vehicles (3306-1, 3308-1, 3306-2, 3308-2, 3306-3, 3308-3) and the second plurality of vehicles may include vehicles not shown that may, without further navigational action, encounter the road segment 3302 at a later time. In another implementation, the first plurality of vehicles may include vehicles (3306-1, 3308-1) and the second plurality of vehicles may include vehicles (3306-2, 3308-2, 3306-3, 3308-3). In addition, the first plurality of vehicles and the second plurality of vehicles may include vehicles that are not shown in FIG. 33.

Increasing the number of samples for a measurement can be an effective way of reducing the impact of measurement errors, as a minimum number of samples may reduce the average value of random errors. In some embodiments, if the time stamps of two or more vehicles of the first plurality of vehicles fall within a predetermined time range, processor 3302 may generate one or more averaged characteristics of the accumulated water based on the driving information of the two or more vehicles. A predetermined time range may be seconds, minutes, or any other suitable duration. The averages may be weighted to give greater weight to more recent measurements, for example, in case a trend is detected (water level increasing or decreasing). For example, referring to FIG. 33, the time stamps of vehicles 3306-1 and 3308-1, vehicles 3306-2 and 3308-2, and vehicles 3306-3 and 3308-3 may differ by only a few seconds, and the state of accumulated water 3304 is not likely to change drastically over the course of a few seconds. Therefore, the processor 3302 may average one or more characteristics associated with the accumulated water 3304 included in the drive information of vehicles 3306-1 and 3308-1, vehicles 3306-2 and 3308-2, and vehicles 3306-3 and 3308-3. An example of averaged characteristics may correspond to an average depth profile. Referring to FIG. 30D, the system 3100 may be capable of calculating an average depth profile such as depth profile 3042, except that depth profiles 3040-1 through 3040-4 are not determined by a single vehicle but by different vehicles of the first plurality of vehicles, all of whose timestamps fall within a predetermined time range. In some embodiments, when the averaged one or more characteristics of the accumulated water are generated, a dispersion indicator may be determined to represent an existing variability in the determination of one or more characteristics associated with the accumulated water. This dispersion indicator may account for the variability of the one or more characteristics associated with the accumulated water determined, and may take the form of a confidence interval, a standard deviation, a range or any other relevant statistical indicator of the dispersion.

Figure 34A:
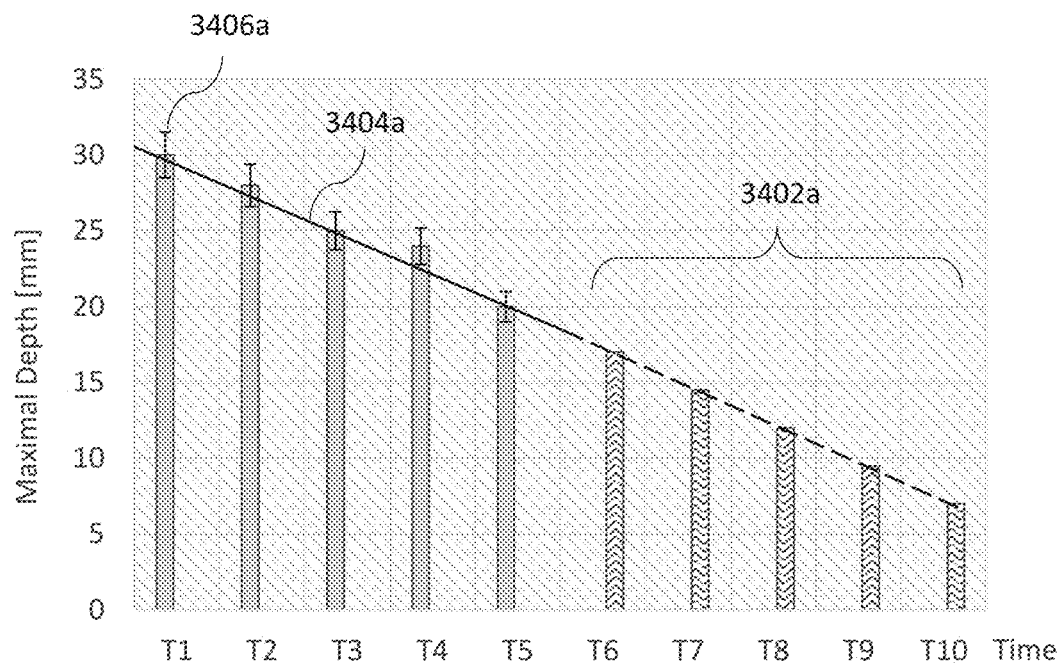
FIG. 34A is a bar graph illustrating the evolution of an exemplary characteristic associated with accumulated water of FIG. 33, consistent with the disclosed embodiments.
Figure 34B:
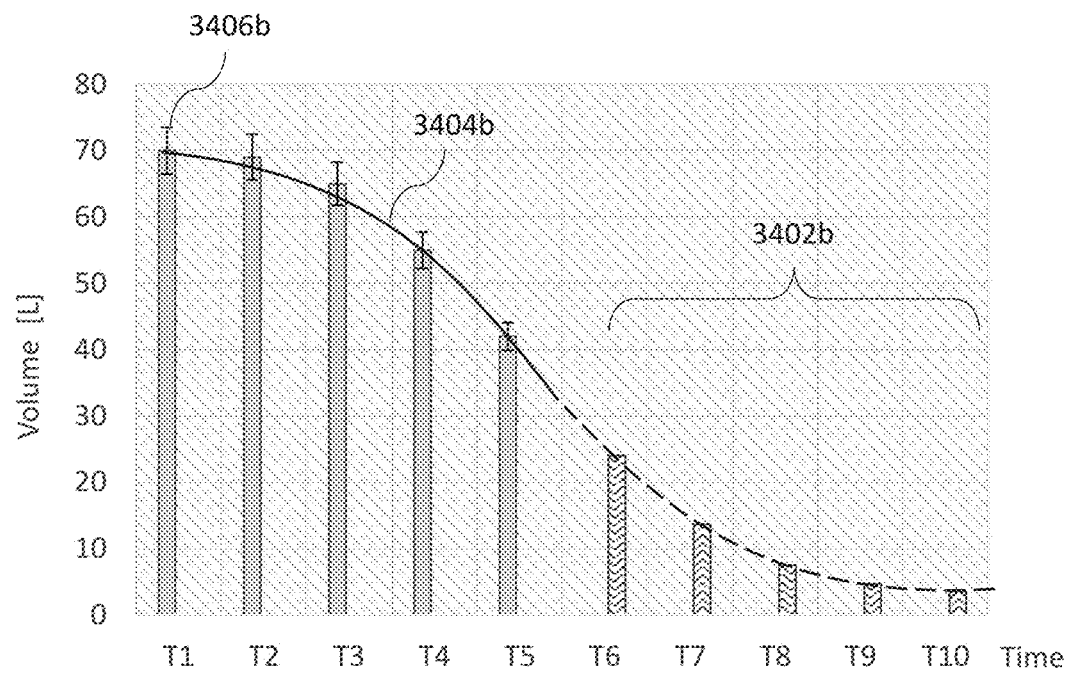
FIG. 34B is a bar graph illustrating the evolution of another exemplary characteristic associated with accumulated water of FIG. 33, consistent with the disclosed embodiments.

FIGS. 34A-B are bar graphs illustrating the evolution of two characteristics associated with accumulated water 3304, consistent with the disclosed embodiments. FIG. 34A represents the evolution of the maximal depth and FIG. 34B represents the evolution of the volume of accumulated water 3304. FIGS. 34A-B include the characteristics of the accumulated water measured at two subsequent times or during two subsequent time slots T4 and T5 not shown in FIG. 33. Error bars 3406a and 3406b illustrated in FIGS. 34A-B, represent an exemplary dispersion indicator determined during the generation of the averaged one or more characteristics of the accumulated water as described above. These error bars represent standard deviations of the distributions of the one or more characteristics associated with the accumulated water.

In some embodiments, the processor 3102 may be further programmed to filter outliers from the drive information received from the first plurality of vehicles prior to generating aggregated accumulated water information. Some vehicles of the first plurality of vehicles may determine one or more erroneous characteristics associated with the accumulated water, which characteristics represent outliers in the overall distribution of the one or more characteristics determined by all vehicles of the first plurality of vehicles. Outliers may affect the aggregated accumulated water information. Processor 3102 may therefore filter these outliers. For example, in a situation where the first plurality of vehicles comprises ten vehicles, nine vehicles have determined that the volume of the accumulated water is around 60 L, and one vehicle has determined that the volume of the accumulated water is around 1 L, the last vehicle is likely to have made an error and its determination of the volume of the accumulated water would be an outlier in the distribution of the volume determined by the ten vehicles. In another example, measurements taken while another vehicle is crossing the puddle may be affected by the motion of the target vehicle through the puddle and may produce outlier results which need to be filtered out or suppressed. Processor 3102 may use different methods to filter outliers. For example, in some embodiments, processor 3102 may use the interquartile range, Z-scores, Grubb's test, Dixon'S Q test, Chauvenet's test, or Pierce's criterion.

Conditions experienced by a vehicle from the first plurality of vehicles, may also be considered to identify and eliminate some outliers. For example, if traffic is heavy on the road segment, an autonomous vehicle may have some difficulty correctly determining one or more characteristics associated with accumulated water, as some vehicles may obstruct the field of view of a camera in the autonomous vehicle, or move over the accumulated water. In another example, the light conditions encountered by a vehicle may not be sufficient for determining the characteristic(s) associated with accumulated water, either because the weather conditions are not optimal (fog, heavy rain . . . ), or because it is nighttime and the vehicle's headlights are obstructed or defective.

In some embodiments, processor 3102 may be further programmed to: track an evolution in time of the one or more characteristics of the accumulated water based, at least on part, on the timestamp associated with the received drive information from the first plurality of vehicles; update the accumulated water information; and distribute the updated accumulated water information to the second plurality of vehicles. For example, processor 3102 may track an evolution in time of one or more characteristics associated with accumulated water 3304. As illustrated in FIGS. 34A-B, processor 3102 may store, for example via storage module 3104, the one or more characteristics of accumulated water 3304 determined at different times or during different time slots (T1-T5). At each time instant or time slot (T1-T5) the accumulated water information may be updated with the latest aggregated accumulated water information generated and this updated information distributed. For example, after the time or time slot T1 elapses, processor 3102 may update the accumulation information with the aggregated accumulated water information generated with the driving information of vehicles 3306-1 and 3308-1 and distribute the updated information to vehicles 3306-2, 3308-2, 3306-3, and 3308-3, as these vehicles may travel later on the road segment 3302 and encounter the accumulated water 3304, absent navigational action; after the time or time slot T2 has elapsed, the processor 3102 may update the accumulation information with the aggregated accumulated water information generated with the driving information of the vehicles 3306-2 and 3308-2 and distribute the updated information to the vehicles 3306-3 and 3308-3 because these vehicles have not yet travelled the road segment 3302; and the process may continue in this manner after another time or time slot has elapsed and with the following vehicles. In some embodiments, the updated accumulated water information distributed to the second plurality of vehicles may include a time indication. For example, when distributing updated accumulated water information to vehicles 3306-2, 3308-2, 3306-3, and 3308-3, processor 3102 may add a time indication mentioning that the accumulated water information corresponds to the state of the accumulated water at time T1 or during time slot T1.

In some embodiments processor 3102 may be further programmed to: determine a rate of change of at least one characteristic associated with the accumulated water; generate a forecast associated with the accumulated water based on the determined rate of change of the at least one characteristic; and distribute the generated forecast to the second plurality of vehicles. Referring to FIGS. 34A-B, the processor 3102 may have received drive information, generated aggregated accumulated water information, and updated accumulated water information at each time or slot T1, T2, T3, T4 and T5, by means of which information the processor 3102 may determine a rate of change of at least one characteristic associated with the accumulated water and generate a forecast for subsequent times or time slots (T6, T7, T8. T9, T10 . . . ) based on the determined rate of change. These forecasts (3402a, 3402b) are represented by bars in a wavy pattern in FIGS. 34A-B. In some embodiments, the at least one characteristic may include a depth profile associated with the accumulated water. A depth profile may include different information, such as a maximal depth, FIG. 34A shows the evolution and prediction of the maximal depth of the accumulated water 3304. In some embodiments, the at least one characteristic may include an area associated with the accumulated water. In the situations shown in FIG. 33, the area of accumulated water 3304 decreases, processor 3102 may monitor its evolution and generate a forecast. In some embodiment, the at least one characteristic may include a volume associated with the accumulated water. For example, FIG. 34B shows the evolution and prediction of the volume of the accumulated water 3304. In some embodiments, the rate of change may be constant or non-uniform over time. For example, referring to FIG. 34A, the rate of change in maximal depth across time instants or time slots T1 through T5 is relatively constant, whereas the rate of change in volume shown in FIG. 34B is non-uniform. In accordance with the disclosed embodiments, processor 3102 may distribute the generated forecast associated with the accumulated water based on the determined rate of change the second plurality of vehicles.

In some embodiments, the processor 3102 may use a fitting procedure on a plurality of previously aggregated accumulated water information to generate the forecast associated with the accumulated water. Examples of fitting procedures may include a linear fit, as illustrated by line 3404a in FIG. 34A, a polynomial fit, as illustrated by curved line 3404b in FIG. 34B, an exponential fit, a logarithmic fit, a power curve fit, or any other suitable functional fit. In some embodiments, a goodness of fit indicator may be determined to account for the discrepancies between the fitting procedure and the aggregated accumulated water information. For example, the goodness of fit indicator may take the form of a confidence interval, referring to FIG. 34A, vehicles from the second plurality of vehicles may receive the information that at time or during time slot T9, the maximal depth of accumulated water 3304 will be comprised within a certain range corresponding to a confidence interval determined by the fitting procedure. In some embodiments, processor 3102 may be further programmed to update the forecast associated with the accumulated water. For example, referring to FIG. 34B, if at times or during time slots T6 and T7, the volume of accumulated water suddenly increases due to the resumption of rainfall, processor 3102 may update the forecast and predict for time or time slot T8 a volume greater than that recorded for time or time slot T7.

In some embodiments, aggregated accumulated water information may include at least one navigational action taken by each vehicle of the first plurality of vehicles. The second plurality of vehicles may then use the aggregated accumulated water information, taking into account the navigational action taken by the first plurality of vehicles, to take appropriate navigational actions and navigate the road segment. In some embodiments, the at least one navigational action may include braking, changing gears, altering a trajectory, re-routing, stopping, exiting an automated driving mode or a combination thereof. For example, if all vehicles in the first plurality of vehicles had braked before encountering the accumulated water, the vehicles in the second plurality of vehicles may have known and anticipated that they should brake before reaching the accumulated water. In another example, if all vehicles in the first plurality of vehicles had made a U-turn before encountering the accumulated water, the vehicles in the second plurality of vehicles may have altered their route to avoid the segment of road where the water had accumulated.

Figure 35:
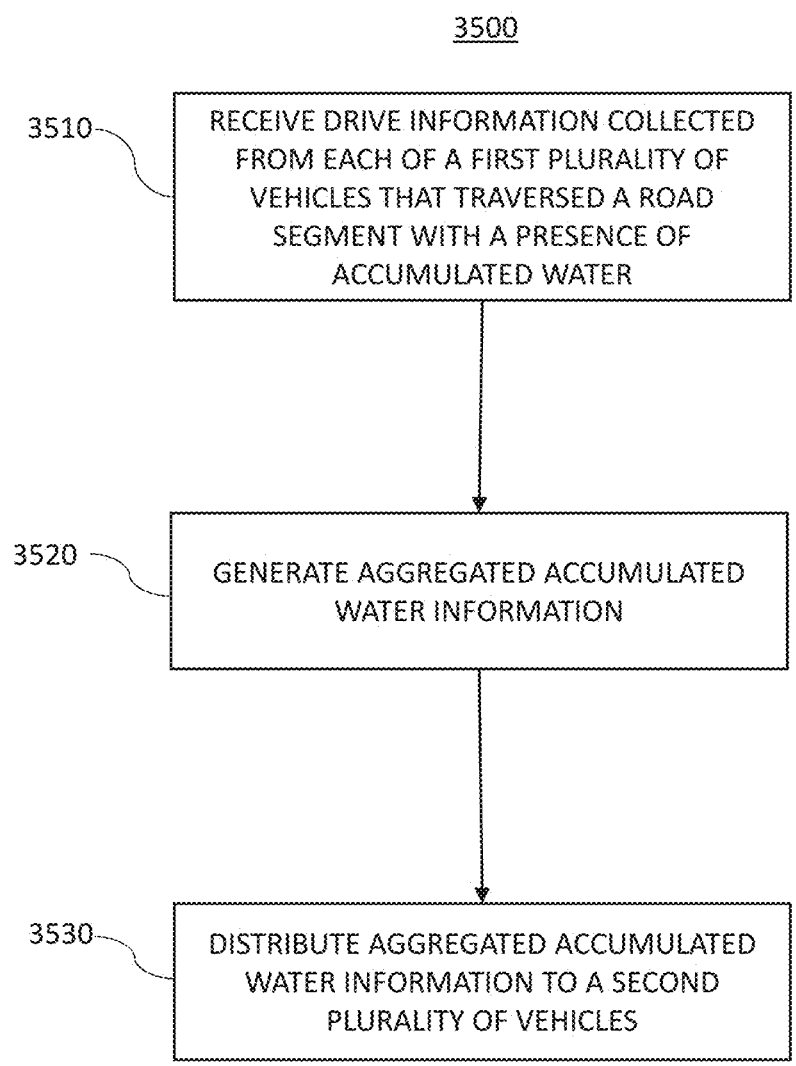
FIG. 35 is a flowchart showing an exemplary process for collecting and distributing information relative to the presence of accumulated water on a road segment for use in navigation by a host vehicle, consistent with disclosed embodiments.

FIG. 35 is a flowchart showing an example process 3500 for collecting and distributing information relative to the presence of accumulated water on a road segment, consistent with the disclosed embodiments. Process 3500 may be performed by at least one processing device, such as processor 3102 included in system 3100, or various other devices described herein. It is to be understood that throughout the present disclosure, the term "processor" is used as a shorthand for "at least one processor." In other words, a processor may include one or more structures (e.g., circuitry) that perform logic operations whether such structures are collocated, connected, or disbursed. In some embodiments, a non-transitory computer-readable medium may contain instructions that when executed by a processor cause the processor to perform process 3500. Further, process 3500 is not limited to the steps shown in FIG. 35, and any steps or processes of the various embodiments described throughout the present disclosure may also be included in process 3500, including those described above with respect to, for example, FIGS. 33-34B.

In step 3510, process 3500 may include receiving drive information collected from each of the first plurality of vehicles that traversed the road segment, wherein the drive information received from each of the first plurality of vehicles indicates (e.g., conveys, specifies, implies, etc.) one or more characteristics of the accumulated water. For example, this may include collecting drive information from vehicles 3120 and 3130, as described above. Accordingly, the drive information received from each of the plurality of vehicles may include an indicator associated with one or more characteristics of the accumulated water on the road segment. For example, this may include indicators 3122 and 3132. The characteristics of the accumulated water may include any measurable physical quantity related to the accumulated water such a depth profile, an indicator of a water edge location of the accumulated water relative to a road surface or a road feature associated with the road segment or an indicator of an area associated with the accumulated water. The first plurality of vehicles may be equipped with one or more sensors and may be capable of detecting the presence of accumulated water on a road segment and determining one or more characteristics of the accumulated water. For example, vehicles from the first plurality of vehicles may include a navigation system such as system 100.

In step 3520, process 3500 may include generating aggregated accumulated water information by aggregating the drive information received from the first plurality of vehicles. For example, this may include processing the drive information collected from vehicles 3120 and 3130 and generate aggregated accumulated water information for road segment 3110. Aggregated accumulated water information may include the exact location of accumulated water, the maximum depth value, a depth profile, an image of the accumulated water, one or more different characteristics or a combination thereof. In some embodiments, different ways may be used to generate the aggregated accumulated water information. For example, a processor may be configured to analyze, format, adapt, augment, supplement, redact, or otherwise modify drive information data for optimization purposes. It may perform various statistical analyses, such as averaging, standard deviation calculation, use of robust statistical methods, or any other appropriate statistical method to generate aggregated accumulated water information.

In some embodiments, when the aggregated accumulated water information is generated, a dispersion indicator may be appended to represent an existing variability in the determination of one or more characteristics associated with the accumulated water. For example, this may include error bars 3406a and 3406b. In some embodiments, the at least one processor may be further programmed to filter outliers from the drive information received from the first plurality of vehicles prior to generating aggregated accumulated water information. Different methods may be applied to identify and filter the outliers. For example, different statistical methods and criteria may be employed, or the outlier may be identified by considering some of the conditions experienced by a vehicle from the first plurality of vehicles.

The number of vehicles comprised in the first plurality of vehicles may differ. For example, in some embodiments, the first plurality of vehicles may include a variable number of vehicles based on a predetermined amount of time elapsed since receipt of driving information from two vehicles. This variable number of vehicles may depend on the predetermined amount of time and circumstances, e.g., traffic conditions on the road segment or time of day. In some other embodiments, the first plurality of vehicles may include a predetermined number of vehicles, wherein the predetermined number of vehicles is greater than or equal to two. Alternatively, in some further embodiments, the first plurality of vehicles may be equal to or less than the predetermined number of vehicles depending on whether a time required to collect driving information from the predetermined number of vehicles is less than the predetermined amount of time.

In step 3530, process 3500 may include distributing the aggregated accumulated water information to a second plurality of vehicles. For example, this may include distributing aggregated accumulated water information obtained as a result of the collection of the drive information of vehicles 3120 and 3130 to a second plurality of vehicles including vehicles 3150 and 3160. The second plurality of vehicles may include vehicles that are currently travelling on the road segment or vehicles that will navigate the road segment, i.e., vehicles that will encounter the road segment after a certain period of time or after a certain distance, or vehicles that have the road segment on their route. In some embodiments, the first and second plurality of vehicles may share at least one vehicle in common, as illustrated in FIG. 32A. In some other embodiments, the first plurality of vehicles is different from the second plurality of vehicles and no common vehicles are shared by the first plurality of vehicles and the second plurality of vehicles, as illustrated in FIG. 32B.

In some embodiments, the drive information received from each of the first plurality of vehicles may further include a timestamp. Each vehicle of the first plurality of vehicles may therefore communicate its driving information and indicate precisely when it has encountered the accumulated water on the road segment and determined the one or more characteristics associated with the accumulated water. In some embodiments, process 3500 may further include a step of tracking an evolution in time of the one or more characteristics of the accumulated water based, at least on part, on the timestamp associated with the received drive information from the first plurality of vehicles; updating the accumulated water information; and distributing the updated accumulated water information to the second plurality of vehicles. For example, this may include tracking the evolution of the maximal depth of accumulated 3304 water or its volume as illustrated in FIGS. 33 and 34A-B and distributing this information to a second plurality of vehicles.

In some embodiments, process 3500 may further include a step of determining a rate of change of at least one characteristic associated with the accumulated water; generating a forecast associated with the accumulated water based on the determined rate of change of the at least one characteristic; and distributing the generated forecast to the second plurality of vehicles. Additionally, in some embodiments, the at least one characteristic may include a depth profile, an area, or a volume associated with the accumulated water. Example of forecasts may include forecast 3402a where the rate of change is constant and forecast 3402b where the rate of change is non-uniform. In some embodiments, a fitting procedure on a plurality of previous aggregated accumulated water information may be used to generate the forecast associated with the accumulated water and optionally a goodness of fit indicator may be determined to account for the discrepancies between the fitting procedure and the aggregated accumulated water information. In accordance with the disclosed embodiments, the forecast may be distributed to the second plurality of vehicles. In some embodiments, the at least one processor may be further programmed to update the forecast associated with the accumulated water.

Although the foregoing paragraphs describe embodiments relative to a single road segment, it will be understood by those skilled in the art that any of the systems and methods described herein may be applied to several road segments. The system 3100 may simultaneously receive driving information from multiple first pluralities of vehicles including an indicator associated with one or more characteristics of multiple accumulated waters located on different road segments. The system 3100 may generate the aggregated accumulated water information for any of the accumulated waters located on the different road segments and distribute the aggregated information to different second pluralities of vehicles. In some embodiments, the multiple pluralities of vehicles are not mutually exclusive, a vehicle may belong to one or more pluralities of vehicles.

Furthermore, systems and methods described herein may be applied in the case of a road segment with the presence of a road covering material, in connection with FIGS. 27 and 28. In some embodiments, system 3100 may receive drive information collected from each of a first plurality of vehicles that traversed the road segment, wherein the drive information received from each of the first plurality of vehicles includes an indicator associated with one or more characteristics of a road covering material located on a road segment; generate aggregated road covering material information by aggregating the drive information received from the first plurality of vehicles; and distribute the aggregated accumulated water information to a second plurality of vehicles. For example, one or more characteristics of the road covering material may include a thickness profile or a type of road covering material (e.g., snow, ice, mud).

The embodiments disclosed herein are illustrative and any other means for predicting one or more aspects of host vehicle motion and for causing a navigation response based on the prediction may be consistent with this disclosure.

In an embodiment, a system for navigating a host vehicle comprises at least one processor comprising circuitry and a memory, wherein the memory includes instructions that when executed by the circuitry cause the at least one processor to perform operations comprising: receiving from a camera onboard the host vehicle at least one captured image representative of an environment of the host vehicle; detecting, based on analysis of the at least one captured image, a presence of accumulated water on a road segment; detecting, based on analysis of the at least one captured image, a location of an edge of the accumulated water relative to at least one road feature associated with the road segment; determining a depth profile for the accumulated water, based on the detected location of the edge of the accumulated water relative to the at least one road feature and also based on stored three-dimensional profile information associated with the at least one road feature; and causing the host vehicle to take at least one navigational action based on the determined depth profile for the accumulated water.

In some embodiments, the at least one road feature includes at least one of a lane marking, a road edge, or a target trajectory associated with the road segment. In some embodiments, the stored three-dimensional profile information is located in the memory. In some embodiments, the stored three-dimensional profile information is remotely located relative to the host vehicle. In some embodiments, the stored three-dimensional profile information includes a three-dimensional spline. In some embodiments, the at least one navigational action comprises braking to reduce speed of the host vehicle. In some embodiments, the at least one navigational action comprises changing gears of the host vehicle. In some embodiments, the at least one navigational action comprises altering a trajectory of the host vehicle. In some embodiments, the at least one navigational action comprises re-routing the host vehicle. In some embodiments, the at least one navigational action comprises stopping the host vehicle. In some embodiments, the at least one navigational action comprises exiting an automated driving mode for the host vehicle and giving control to at least one passenger of the host vehicle. In some embodiments, the operations further comprise: detecting, based on analysis of the at least one captured image, a presence of at least one local depression in the road segment surface; determining a depression depth profile for the at least one local depression in the road segment surface based on stored three-dimensional profile information associated with the road segment; detecting, based on analysis of the at least one captured image, a water surface height of the accumulated water within the at least one local depression; and determining a water depth profile for the accumulated water within the at least one local depression based on the depression depth profile and the detected water surface height. In some embodiments, the operations further comprise causing at least one communication action based on the determined water depth profile. In some embodiments, the at least one communication action includes issuing one or more of an audible warning message and a visual warning message to a passenger of the host vehicle. In some embodiments, the at least one communication action comprises issuing an alert to a road maintenance authority. In some embodiments, the at least one communication action comprises uploading the determined water depth profile to a remotely located server. In some embodiments, the remotely located server is configured to aggregate uploaded accumulated water depth profile information received from a first plurality of vehicles and distribute the aggregated information to a second plurality of vehicles.

In an embodiment, a method for navigating a host vehicle comprises: receiving from a camera onboard the host vehicle at least one captured image representative of an environment of the host vehicle; detecting, based on analysis of the at least one captured image, a presence of accumulated water on a road segment; detecting, based on analysis of the at least one captured image, a location of an edge of the accumulated water relative to at least one road feature associated with the road segment; determining a depth profile for the accumulated water, based on the detected location of the edge of the accumulated water relative to the at least one road feature and also based on stored three-dimensional profile information associated with the at least one road feature; and causing the host vehicle to take at least one navigational action based on the determined depth profile for the accumulated water.

In some embodiments, the method further comprises detecting, based on analysis of the at least one captured image, a presence of one or more local depressions in the road segment surface; determining a depth profile for the one or more local depressions in the road segment surface based on stored three-dimensional profile information associated with the road surface; detecting, based on analysis of the at least one captured image, a presence of accumulated water and water surface height within the one or more local depressions on the road segment; and determining a depth profile for the accumulated water within the one or more local depressions on the road segment.

In an embodiment, a non-transitory computer-readable medium containing instructions that when executed by at least one processor causes the at least one processor to perform navigation of a host vehicle, the operations comprising: receiving from a camera onboard the host vehicle at least one captured image representative of an environment of the host vehicle; detecting, based on analysis of the at least one captured image, a presence of accumulated water on a road segment; detecting, based on analysis of the at least one captured image, a location of an edge of the accumulated water relative to at least one road feature associated with the road segment; determining a depth profile for the accumulated water, based on the detected location of the edge of the accumulated water relative to the at least one road feature and also based on stored three-dimensional profile information associated with the at least one road feature; and causing the host vehicle to take at least one navigational action based on the determined depth profile for the accumulated water.

In an embodiment, a system for collecting and distributing information related to the presence of accumulated water on a road segment comprises: at least one processor comprising circuitry and a memory, wherein the memory includes instructions that when executed by the circuitry cause the at least one processor to perform operations comprising: receiving drive information collected from each of a first plurality of vehicles that traversed the road segment, wherein the drive information indicates one or more characteristics of the accumulated water; generating aggregated accumulated water information by aggregating the drive information received from the first plurality of vehicles; and distributing the aggregated accumulated water information to a second plurality of vehicles.

In some embodiments, the first plurality of vehicles and the second plurality of vehicles share at least one vehicle in common. In some embodiments, the first plurality of vehicles is different from the second plurality of vehicles and no common vehicles are shared by the first plurality of vehicles and the second plurality of vehicles. In some embodiments, the one or more characteristics of the accumulated water comprise a depth profile. In some embodiments, the one or more characteristics of the accumulated water comprise an indicator of a water edge location of the accumulated water relative to a road surface or a road feature associated with the road segment. In some embodiments, the one or more characteristics of the accumulated water indicate an area associated with the accumulated water. In some embodiments, the drive information received from each of the first plurality of vehicles further comprises a timestamp. In some embodiments, the operations further comprise: tracking an evolution in time of the one or more characteristics of the accumulated water based, at least on part, on the timestamp associated with the received drive information from the first plurality of vehicles; updating the aggregated accumulated water information; and distributing the updated aggregated accumulated water information to the second plurality of vehicles. In some embodiments, the operations further comprise: determining a rate of change of at least one characteristic of the one or more characteristics associated with the accumulated water; generating a forecast associated with the accumulated water based on the determined rate of change of the at least one characteristic; and distributing the forecast to the second plurality of vehicles. In some embodiments, the at least one characteristic comprises a depth profile associated with the accumulated water. In some embodiments, the at least one characteristic indicates an area associated with the accumulated water. In some embodiments, the at least one characteristic indicates a volume associated with the accumulated water.

In an embodiment, a method for collecting and distributing information related to the presence of accumulated water on a road segment comprises: receiving drive information collected from each of a first plurality of vehicles that traversed the road segment, wherein the drive information indicates one or more characteristics of the accumulated water; generating aggregated accumulated water information by aggregating the drive information received from the first plurality of vehicles; and distributing the aggregated accumulated water information to a second plurality of vehicles.

In some embodiments, the drive information received from each of the first plurality of vehicles further includes a timestamp. In some embodiments, the method further comprises: tracking an evolution in time of the one or more characteristics of the accumulated water based, at least on part, on the timestamp associated with the received drive information from the first plurality of vehicles; updating the accumulated water information; and distributing the updated accumulated water information to the second plurality of vehicles. In some embodiments, the method further comprises: determining a rate of change of at least one characteristic associated with the accumulated water; generating a forecast associated with the accumulated water based on the determined rate of change of the at least one characteristic; and distributing the generated forecast to the second plurality of vehicles.

In an embodiment, a non-transitory computer-readable medium containing instructions that when executed by at least one processor causes the at least one processor to perform collecting and distributing information related to the presence of accumulated water on a road segment, the operations comprising: receiving drive information collected from each of a first plurality of vehicles that traversed the road segment, wherein the drive information indicates one or more characteristics of the accumulated water; generating aggregated accumulated water information by aggregating the drive information received from the first plurality of vehicles; and distributing the aggregated accumulated water information to a second plurality of vehicles.

In some embodiments, the drive information received from each of the first plurality of vehicles further includes a timestamp. In some embodiments, the operations further comprise: tracking an evolution in time of the one or more characteristics of the accumulated water based, at least on part, on the timestamp associated with the received drive information from the first plurality of vehicles; updating the accumulated water information; and distributing the updated accumulated water information to the second plurality of vehicles. In some embodiments, the operations further comprise: determining a rate of change of at least one characteristic associated with the accumulated water; generating a forecast associated with the accumulated water based on the determined rate of change of the at least one characteristic; and distributing the generated forecast to the second plurality of vehicles.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps.

What is claimed is:

1. A system for navigating a host vehicle, the system comprising:
   at least one processor comprising circuitry and a memory, wherein the memory includes instructions that when executed by the circuitry cause the at least one processor to perform operations comprising:
      receiving from a camera onboard the host vehicle at least one captured image representative of an environment of the host vehicle;
      detecting, based on analysis of the at least one captured image, a presence of a road covering material on a road segment surface;
      determining, based on analysis of the at least one captured image, a distance between the camera onboard the host vehicle and the road covering material;
      determining a thickness profile of the road covering material based on the determined distance between the camera onboard the host vehicle and the road covering material, and also based on stored three-dimensional profile information associated with the road segment surface, wherein the thickness profile of the road covering material represents a thickness of the road covering material at different locations of the road segment; and
      causing the host vehicle to take at least one navigational action based on the determined thickness profile of the road covering material.

2. The system of claim 1, wherein the road covering material includes at least one of snow, ice, mud, water, leaves, or sand.

3. The system of claim 1, wherein the operations further comprise identifying the road covering material based on the analysis of the at least one captured image.

4. The system of claim 1, wherein the stored three-dimensional profile information indicates an expected distance between the camera onboard the host vehicle and the road segment surface without any road covering material.

5. The system of claim 1, wherein the stored three-dimensional profile information is located in the memory.

6. The system of claim 1, wherein the stored three-dimensional profile information is remotely located relative to the host vehicle.

7. The system of claim 1, wherein the stored three-dimensional profile information includes a three-dimensional spline.

8. The system of claim 1, wherein the at least one navigational action includes causing braking of the host vehicle.

9. The system of claim 1, wherein the at least one navigational action includes changing gears of the host vehicle.

10. The system of claim 1, wherein the at least one navigational action includes altering a trajectory of the host vehicle.

11. The system of claim 1, wherein the at least one navigational action includes re-routing the host vehicle.

12. The system of claim 1, wherein the at least one navigational action comprises stopping the host vehicle.

13. The system of claim 1, wherein the operations further comprise causing at least one communication action based on the determined thickness profile of the road covering material.

14. The system of claim 13, wherein the at least one communication action comprises issuing one or more of an audible warning message and a visual warning message to a passenger of the host vehicle.

15. The system of claim 13, wherein the at least one communication action comprises alerting a road maintenance authority.

16. A method for navigating a host vehicle, the method comprising:
receiving from a camera onboard the host vehicle at least one captured image representative of an environment of the host vehicle;
detecting, based on analysis of the at least one captured image, a presence of a road covering material on a road segment;
determining, based on analysis of the at least one captured image, a distance between the camera onboard the host vehicle and the road covering material;
determining a thickness profile of the road covering material based on the determined distance between the camera onboard the host vehicle and the road covering material and also based on stored three-dimensional profile information associated with the road segment surface, wherein the thickness profile of the road covering material represents a thickness of the road covering material at different locations of the road segment; and
causing the host vehicle to take at least one navigational action based on the determined thickness profile of the road covering material.

17. The method of claim 16, further comprising causing at least one communication action based on the determined thickness profile of the road covering material.

18. The method of claim 16, further comprising identifying the road covering material based on the analysis of the at least one captured image.

19. The method of claim 16, wherein the stored three-dimensional profile information indicates an expected distance between the camera onboard the host vehicle and the road segment surface without any road covering material.

20. A non-transitory computer-readable medium containing instructions that when executed by at least one processor causes the at least one processor to perform navigation of a host vehicle, the operations comprising:
receiving from a camera onboard the host vehicle at least one captured image representative of an environment of the host vehicle;
detecting, based on analysis of the at least one captured image, a presence of a road covering material on a road segment surface;
determining, based on analysis of the at least one captured image, a distance between the camera onboard the host vehicle and the road covering material;
determining a thickness profile of the road covering material based on the determined distance between the camera onboard the host vehicle and the road covering material and also based on stored three-dimensional profile information associated with the road segment surface, wherein the thickness profile of the road covering material represents a thickness of the road covering material at different locations of the road segment; and
causing the host vehicle to take at least one navigational action based on the determined thickness profile of the road covering material.

21. The non-transitory computer-readable medium of claim 20, wherein the operations further comprise identifying the road covering material based on the analysis of the at least one captured image.

22. The non-transitory computer-readable medium of claim 20, wherein the operations further comprise causing at least one communication action based on the determined thickness profile of the road covering material.

* * * * *